(12) United States Patent
Sugimoto et al.

(10) Patent No.: US 9,357,107 B2
(45) Date of Patent: May 31, 2016

(54) IMAGE-PROCESSING DEVICE, IMAGE-CAPTURING DEVICE, IMAGE-PROCESSING METHOD, AND RECORDING MEDIUM

(71) Applicant: FUJIFILM Corporation, Tokyo (JP)

(72) Inventors: Masahiko Sugimoto, Saitama (JP); Kenkichi Hayashi, Saitama (JP); Yousuke Naruse, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/672,877

(22) Filed: Mar. 30, 2015

(65) Prior Publication Data
US 2015/0207962 A1 Jul. 23, 2015

Related U.S. Application Data

(63) Continuation of application No. PCT/JP2013/062468, filed on Apr. 26, 2013.

(30) Foreign Application Priority Data

Mar. 28, 2013 (JP) ................. 2013-069688

(51) Int. Cl.
*G06K 9/40* (2006.01)
*H04N 5/217* (2011.01)
(Continued)

(52) U.S. Cl.
CPC .............. *H04N 5/217* (2013.01); *G06T 3/4023* (2013.01); *G06T 5/002* (2013.01); *G06T 5/009* (2013.01);
(Continued)

(58) Field of Classification Search
CPC ........... G06T 2207/20024; G06T 2207/20182; G06T 2207/20192; G06T 3/4023; G06T 5/002; G06T 5/009; G06T 5/10; G06T 5/20; H04N 19/117; H04N 19/136; H04N 19/86; H04N 1/6027; H04N 5/217; H04N 5/3572
See application file for complete search history.

(56) References Cited

U.S. PATENT DOCUMENTS

2003/0184663 A1* 10/2003 Nakano ................ H04N 1/4092
348/241
2011/0285879 A1* 11/2011 Hatakeyama ........... G06T 5/003
348/241
(Continued)

FOREIGN PATENT DOCUMENTS

JP 2008-160547 A 7/2008
JP 2011-59813 A 3/2011
(Continued)

OTHER PUBLICATIONS

International Search Report, issued in PCT/JP2013/062468, dated Jun. 11, 2013.
(Continued)

*Primary Examiner* — Phuoc Tran
(74) *Attorney, Agent, or Firm* — Birch, Stewart, Kolasch & Birch, LLP

(57) ABSTRACT

According to an aspect of the present invention, for which of the original image data before the gradation correction and the original image data after the gradation correction the restoration process is performed is determined depending on whether or not the image information meets the condition under which the ringing appears in the recovery image data due to the restoration process. When the gradation correction is performed after the restoration process, there is a probability that the side effect (the ringing or the like) of the restoration process is emphasized by the gradation correction. Therefore, in the case where the image information meets the condition under which the ringing appears, it is possible to prevent such a side effect (the ringing or the like) of the restoration process from being emphasized by the gradation correction, by performing the restoration process for the original image data after the gradation correction.

35 Claims, 33 Drawing Sheets

(51) Int. Cl.
    *H04N 19/117*     (2014.01)
    *H04N 19/136*     (2014.01)
    *H04N 19/86*     (2014.01)
    *G06T 3/40*     (2006.01)
    *G06T 5/00*     (2006.01)
    *G06T 5/10*     (2006.01)
    *G06T 5/20*     (2006.01)
    *H04N 1/60*     (2006.01)
    *H04N 5/357*     (2011.01)

(52) U.S. Cl.
    CPC ... *G06T 5/10* (2013.01); *G06T 5/20* (2013.01); *H04N 1/6027* (2013.01); *H04N 5/3572* (2013.01); *H04N 19/117* (2014.11); *H04N 19/136* (2014.11); *H04N 19/86* (2014.11); *G06T 2207/20024* (2013.01); *G06T 2207/20182* (2013.01); *G06T 2207/20192* (2013.01)

(56) References Cited

U.S. PATENT DOCUMENTS

2012/0320240 A1   12/2012   Kano
2013/0050544 A1    2/2013   Kano

FOREIGN PATENT DOCUMENTS

| JP | 2011-151627 A | 8/2011 |
| JP | 2012-49759 A | 3/2012 |
| JP | 2013-20610 A | 1/2013 |
| JP | 2013-51599 A | 3/2013 |

OTHER PUBLICATIONS

Written Opinion of the International Searching Authority, issued in PCT/JP2013/062468, dated Jun. 11, 2013.

\* cited by examiner

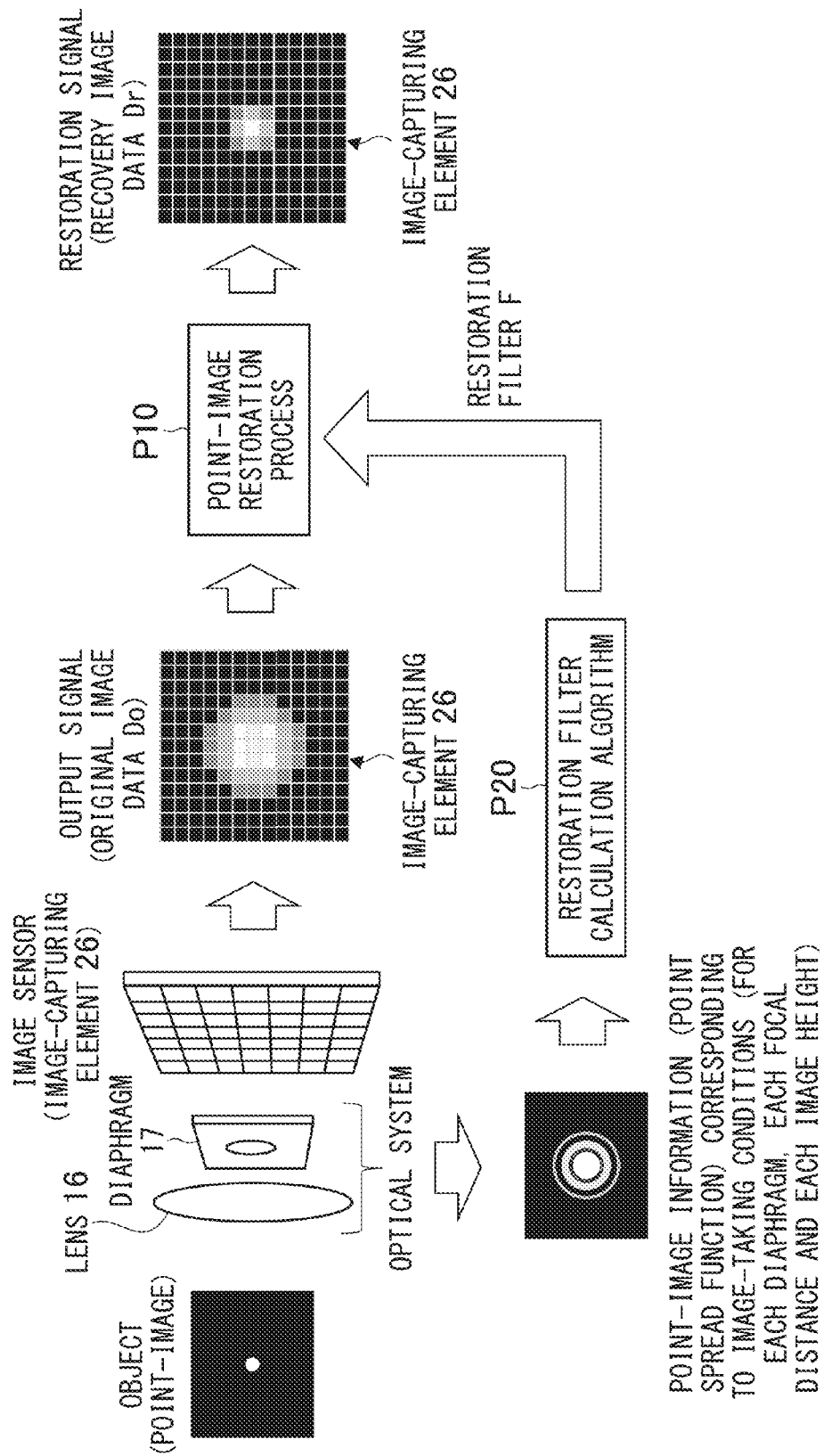

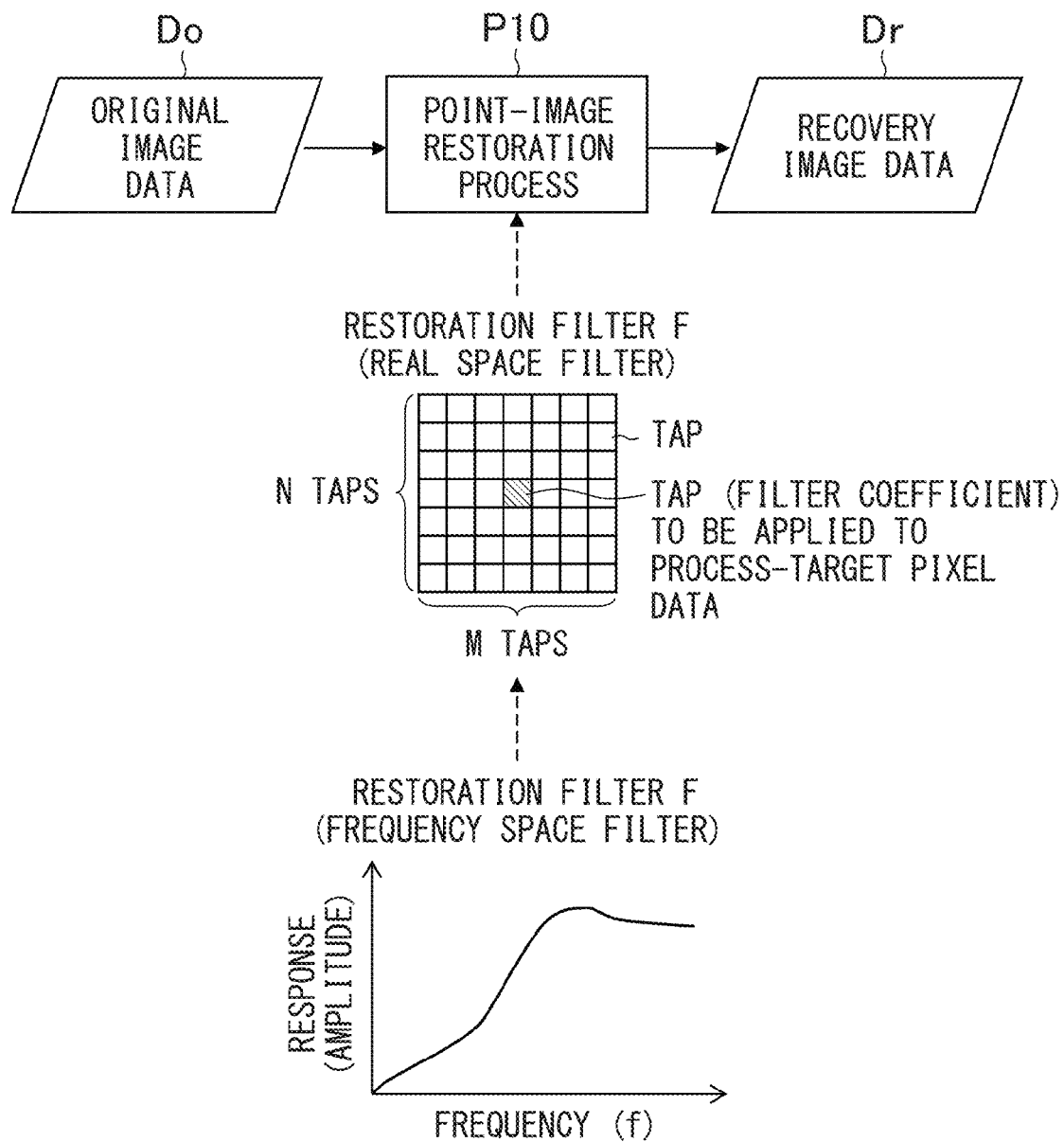

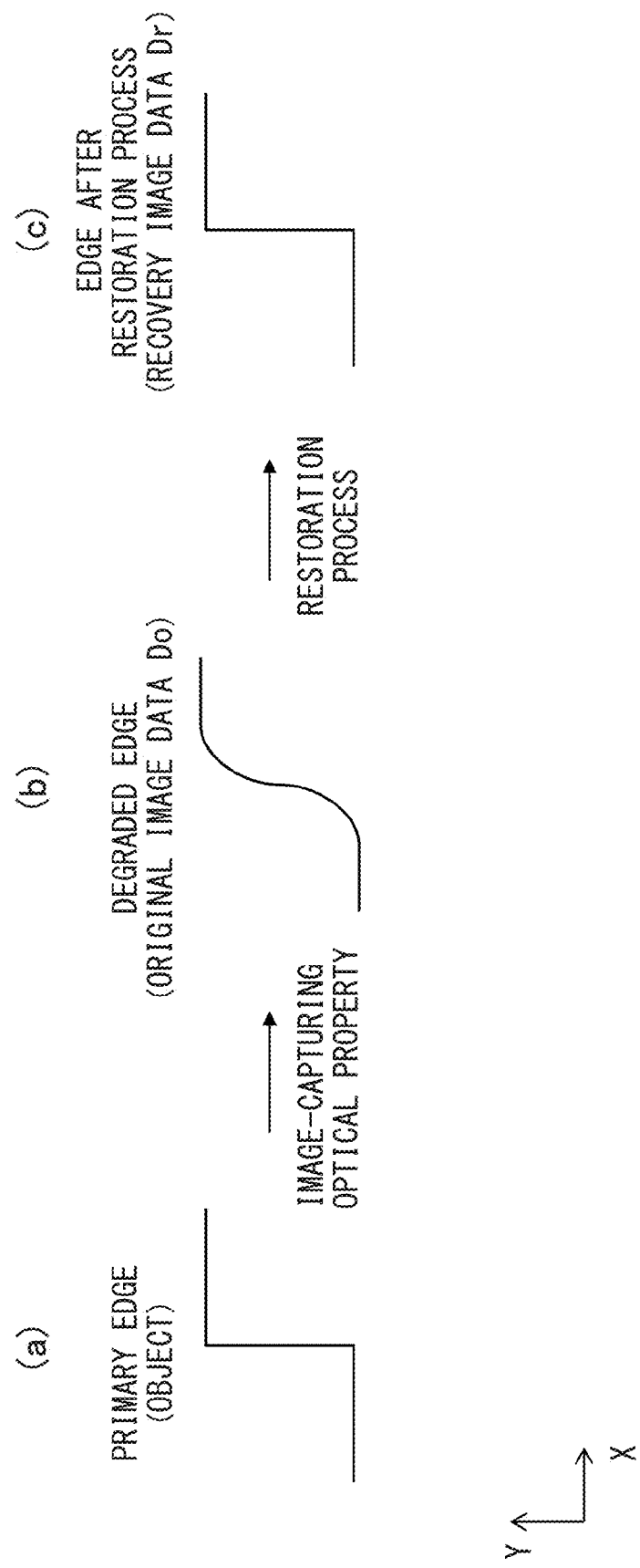

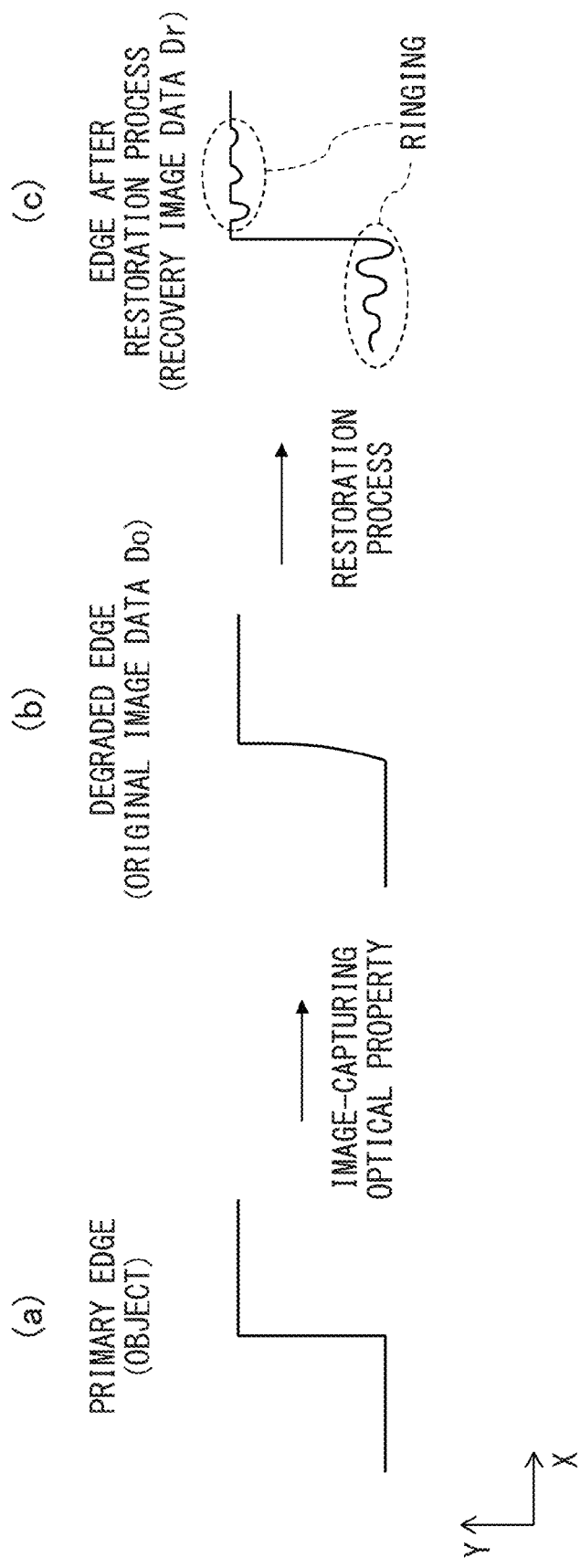

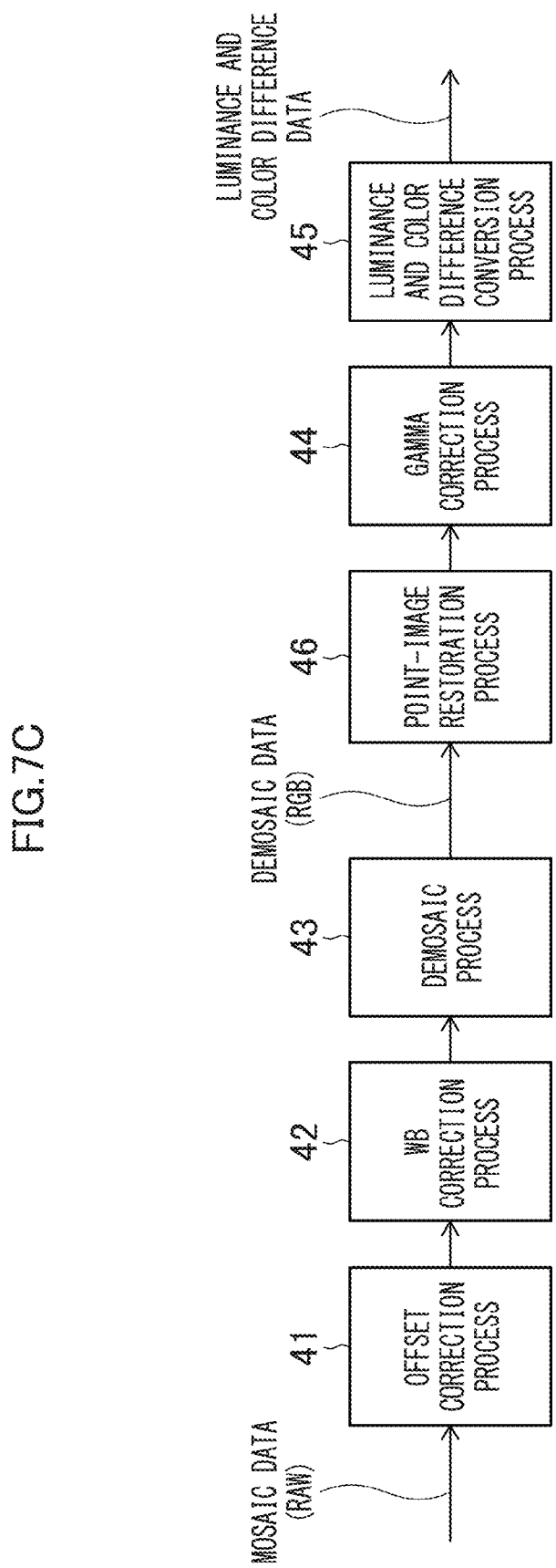

FIG.8

| | Before/After Gradation Correction | | Color Data/Luminance Data | |
|---|---|---|---|---|
| | Antilogarithm (Before Gradation Correction) | Logarithm (After Gradation Correction) | Color Data (RGB) | Luminance Data (Y) |
| Restorability in Ideal System | ○ | △ | ○ | △ |
| Luminance System Toughness in System Deviated from Ideal System (Ringing Degree, and the Like) | △ | ○ | — | — |
| Color System Correction Capability | — | — | ○ | — |
| Color System Toughness in System Deviated from Ideal System (Coloring Degree, Bleeding Degree, and the Like) | — | — | △ Conspicuous | — As-is |
| Processing Scale | △ 2-Byte System | ○ 8bit | △ 3ch | ○ 1ch |

○: Effective Greatly
△: Effective Slightly or Moderately
—: Not Applicable or Not Changed

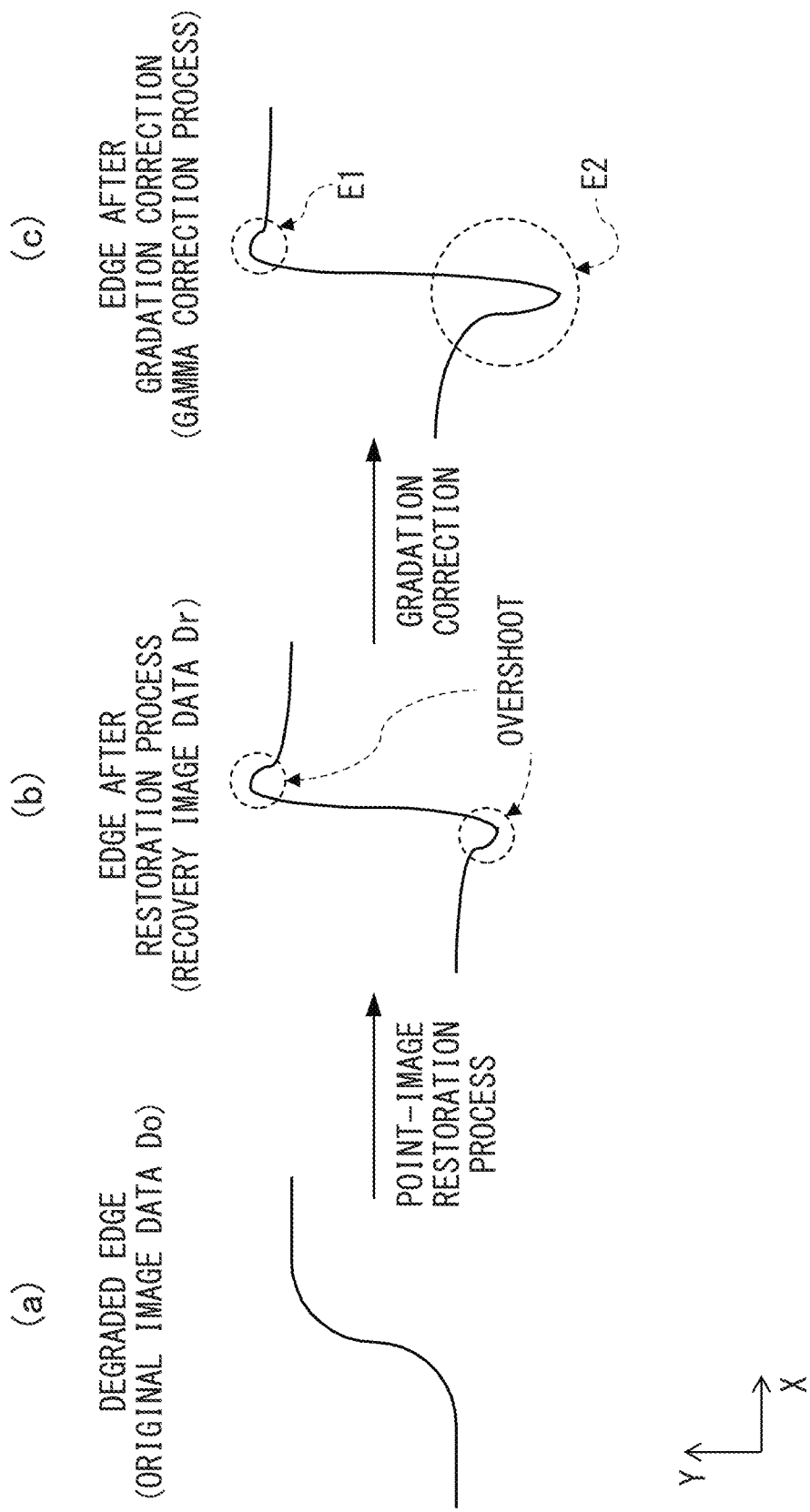

FILTER A
AMPLITUDE PROPERTY OF FILTER

FILTER B
AMPLITUDE PROPERTY OF FILTER

IMAGE-PROCESSING DEVICE, IMAGE-CAPTURING DEVICE, IMAGE-PROCESSING METHOD, AND RECORDING MEDIUM

CROSS-REFERENCE TO RELATED APPLICATIONS

This application is a Continuation of PCT International Application No. PCT/JP2013/062468 filed on Apr. 26, 2013, which claims priority under 35 U.S.C. §119(a) to Japanese Patent Application No. 2013-069688 filed on Mar. 28, 2013. Each of the above application(s) is hereby expressly incorporated by reference, in its entirety, into the present application.

BACKGROUND OF THE INVENTION

1. Field of the Invention

The present invention relates to an image-processing device, an image-capturing device, an image-processing method, and a recording medium that involve a restoration process based on a point spread function.

2. Description of the Related Art

In an object image to be taken through an image-capturing optical system, a so-called point spread phenomenon, in which a point object has a slight spread by the influence of the diffraction, aberration and others due to the image-capturing optical system, sometimes appears. A function indicating the response to a point light source of the optical system is referred to as a point spread function (PSF), and is known as a parameter that affects the resolution degradation (blur) of a taken image.

A taken image in which the image quality has been degraded because of the point spread phenomenon can recover the image quality by being subjected to a point-image restoration process based on the PSF. The point-image restoration process is a process in which the degradation property (point-image property) due to the aberration of a lens (optical system) and the like is determined in advance and the point spread of the taken image is cancelled by an image process using a restoration filter (recovery filter) corresponding to the point-image property.

For the point-image restoration process, various techniques have been proposed. For example, PTL 1 (Japanese Patent Application Laid-Open No. 2011-151627) discloses an image-processing device that can alter the power of the restoration process after the restoration process for an image is performed once. In the image-processing device, a correction filter is applied to a taken image, and thereby, a corrected image is generated. Then, a difference image between the taken image and the corrected image is generated, and the taken image, the corrected image and the difference image are saved.

Further, PTL 2 (Japanese Patent Application Laid-Open No. 2011-059813) discloses an image-processing device that performs an image recovery for an image after a non-linear correction, using a blind deconvolution. The image-processing device includes a correction section to perform a correction for reducing a non-linear gradation correction, for a taken image in which the non-linear gradation correction has been performed, and an image recovery section to perform the image recovery by applying the blind deconvolution to the taken image in which the gradation correction has been reduced.

Further, PTL 3 (Japanese Patent Application Laid-Open No. 2013-020610) discloses an image-processing device that reduces the excessive recovery of image data due to an image recovery process. In the image-processing device, an image recovery process is performed for an RGB-format color image data before a gamma process, the difference in the amplification and attenuation of a pixel signal value due to the gamma correction is absorbed, and the limiting value of the variation in the pixel signal value is calculated such that the maximum value of the variation is constant even after the gamma correction. This leads to the solution of technical problems such as "an occurrence of a situation in which because of saturated pixels, the degradation state of image data to be actually obtained does not coincide with the degradation state of image data to be intended as a recovery target of an image recovery filter", and "an occurrence of an image quality degradation such as an undershoot or overshoot at an edge portion, particularly, the amplification of an undershoot at a low-luminance portion due to the gamma process after the image recovery process".

Further, the point spread function for an optical system is used also in a restoration technology for an image in which the focal depth has been extended. For example, PTL 4 (Japanese Patent Application Laid-Open No. 2012-049759) discloses an image-capturing module that accurately executes an image restoration in a short time. In the image-capturing module, a restoration process is applied to a luminance signal after a demosaic process (synchronization process). Therefore, it is unnecessary to have a parameter of the restoration process, for each of RGB, resulting in the speeding up of the restoration process. Further, adjacent pixels are arranged as a predetermined unit, a common restoration process parameter is applied to the unit, and a deconvolution process is performed. Thereby, the improvement of the restoration process accuracy is achieved.

SUMMARY OF THE INVENTION

The above-described point-image restoration process is a process of restoring an image blurred due to the point spread phenomenon (image-capturing optical property) by an optical system, to a primary sharp image, and is a technology of applying a restoration filter based on a point spread function, to original image data in which the image quality has been degraded and thereby acquiring a recovery image in which the image quality degradation has been eliminated.

Therefore, for obtaining a recovery image to which an object image has been faithfully reproduced, it is necessary that the "property of the restoration filter" to be used in the point-image restoration process and the "image quality degradation of the original image data" properly match.

That is, in principle, it is possible to obtain an "image with a high image quality to which an object image has been faithfully reproduced" from a "taken image in which the image quality has been degraded", if an image degradation caused by the optical system is exactly grasped, a restoration filter capable of strictly eliminating such an image quality is designed and the image quality degradation (the point spread phenomenon) by the optical system is precisely reflected in the original image data.

However, depending on the property of the object image and the image-taking apparatuses, the "property of the restoration filter" and the "image quality degradation of the original image data" do not properly match in some cases.

For example, in the original image data, the image quality varies depending on the image-capturing capability of the image-capturing element, and when the object image is very bright, the pixel saturation phenomenon sometimes occurs in the image-capturing element. When such a pixel saturation occurs, the original image data to be obtained does not necessarily reproduce the object image faithfully, because the clipping of the saturated pixel data (saturated pixel value) and the like are performed.

Thus, the original image data, which are the target of the restoration process, are subjected to not only the influence of the degradation property derived from the optical system, but also the influence of the degradation property derived from the image-capturing element, and particularly when the object image has a great contrast, an unexpected image quality degradation occurs in some cases.

Therefore, even when the property of the optical system is sufficiently analyzed and a restoration filter capable of suppressing the influence of the point spread phenomenon is designed, the "property of the restoration film" and the "image quality degradation of the original image data" do not properly match depending on the object image, in some cases.

When the restoration process is performed under the condition that the "property of the restoration film" and the "image quality degradation of the original image data" do not properly match, the image quality degradation is not sufficiently eliminated, and a good-quality recovery image is not obtained. In some cases, the image quality degradation is promoted so that a ringing or the like becomes conspicuous in the recovery image.

In the above-described PTLs 1 to 4, these problems are not mentioned at all, and a proposal from the standpoint of the "process changing that corresponds to the property (characteristic) of the image, by focusing attention on the image toughness in the restoration process utilizing the point spread function", or the like is not made.

The present invention, which has been made in view of the above-described circumstances, has an object to provide a technology that suppresses the image quality degradation such as the ringing in the recovery image, by performing a point-image restoration process corresponding to the property of an object image.

An aspect of the present invention relates to an image-processing device including: an image information acquisition section to acquire image information that contains at least any one of image analysis data and image acquisition condition data, the image analysis data being acquired by an analysis of original image data that are acquired from an image-capturing element by an image taking using an optical system, the image acquisition condition data indicating an acquisition condition of the original image data; a restoration processing section to obtain recovery image data by performing a restoration process for the original image data, the restoration process using a restoration filter that is based on a point spread function for the optical system; a ringing decision section to decide whether or not the image information meets a condition under which a ringing appears in the recovery image data due to the restoration process; and a process control section to control an image process, based on a decision result by the ringing decision section, in which the restoration process is performed for the original image data after a gradation correction.

According to this aspect, the restoration process based on the point spread function for the optical system is performed for the original image data after the gradation correction, and the image process is controlled depending on whether or not the image information meets the condition under which the ringing appears in the recovery image data due to the restoration process. Therefore, it is possible to flexibly control the image process depending on the appearance situation of the ringing in the recovery image data, and it is possible to effectively prevent the appearance/emphasis of the ringing. By controlling the restoration process in this way, it is possible to achieve both of the "improvement of the resolution feeling of an image (image data) that is provided to a user" and the "suppression of the ringing that can appear in the image (image data) due to the restoration process".

Another aspect of the present invention relates to an image-processing device including: an image information acquisition section to acquire image information that contains at least any one of image analysis data and image acquisition condition data, the image analysis data being acquired by an analysis of original image data that are acquired from an image-capturing element by an image taking using an optical system, the image acquisition condition data indicating an acquisition condition of the original image data; a restoration processing section to obtain recovery image data by performing a restoration process for the original image data, the restoration process using a restoration filter that is based on a point spread function for the optical system; a gradation correction section to perform a gradation correction of the original image data; a ringing decision section to decide whether or not the image information meets a condition under which a ringing appears in the recovery image data due to the restoration process; and a process control section to control the restoration process, based on a decision result by the ringing decision section, in which the process control section determines for which of the original image data before the gradation process and the original image data after the gradation process the restoration process is performed, based on the decision result by the ringing decision section.

According to this aspect, for which of the original image data before the gradation correction and the original image data after the gradation correction the restoration process is performed is determined depending on whether or not the image information meets the condition under which the ringing appears in the recovery image data due to the restoration process. When the gradation correction is performed after the restoration process, there is a probability that the side effect (the ringing or the like) of the restoration process is emphasized by the gradation correction. Therefore, in the case where the image information meets the condition under which the ringing appears, it is possible to prevent such a side effect (the ringing or the like) of the restoration process from being emphasized by the gradation correction, by performing the restoration process for the original image data after the gradation correction.

Preferably, the gradation correction should be a gradation correction by a logarithmic process, and the restoration filter should have a filter coefficient corresponding to image data before the logarithmic process.

According to this aspect, by performing the restoration process for the original image data after the logarithmic process purposely using the restoration filter that has the filter coefficient corresponding to the image data before the logarithmic process, it is possible to improve the toughness against the image quality degradation by the ringing that appears due to the restoration process, and to make the influence of the ringing inconspicuous in the image (image data).

Preferably, the gradation correction should be a gradation correction by a logarithmic process, and the restoration filter should have a filter coefficient corresponding to image data after the logarithmic process.

According to this aspect, by performing the restoration process for the original image data after the logarithmic process using the restoration filter that has the filter coefficient corresponding to the image data after the logarithmic process, it is possible to improve the toughness against the image quality degradation by the ringing that appears due to the restoration process, and to make the influence of the ringing inconspicuous in the image. Further, it is possible to improve the restoration accuracy.

Preferably, the restoration process should be a process of obtaining the recovery image data by restoring only an amplitude component of the original image data.

According to this aspect, even when the restoration process does not involve the restoration of the phase component and the ringing easily appears, the restoration process is performed for the original image data after the gradation correction, allowing for a flexible image process control depending on whether or not to be in a situation in which the ringing appears.

Preferably, the restoration process should be a process of obtaining the recovery image data by restoring an amplitude component and a phase component of the original image data.

According to this aspect, even when the restoration process involves the restoration of the phase component and the ringing can be reduced, the restoration process is performed for the original image data after the gradation correction, and it is possible to further improve the image toughness (image non-breakdown property), allowing for a flexible image process control depending on whether or not to be in a situation in which the ringing appears.

Preferably, the image-processing device should further include a restoration process information acquisition section to acquire restoration process information about whether the restoration process is a process of obtaining the recovery image data by restoring only an amplitude component of the original image data, or a process of obtaining the recovery image data by restoring the amplitude component and a phase component of the original image data, and the process control section should determine for which of the original image data before the gradation correction and the original image data after the gradation correction the restoration process is performed, based on the restoration process information acquired by the restoration process information acquisition section, in addition to the decision result by the ringing decision section.

According to this aspect, for which of the original image data before the gradation correction and the original image data after the gradation correction the restoration process is performed, based on the decision result by the ringing decision section and the restoration process information. Therefore, it is possible to determine for which of the original image data before the gradation correction and the original image data after the gradation correction the restoration process is performed, for example, in consideration of whether or not to involve the restoration of the phase component.

Preferably, the image information acquisition section should acquire the image information that contains the image analysis data, the image analysis data indicating whether or not pixel data having a saturated pixel value or pixel data having a pixel value greater than a threshold value are contained in the original image data.

According to this aspect, whether or not to meet the condition under which the ringing appears is decided based on whether or not the pixel data having a saturated pixel value or the pixel data having a pixel value greater than a threshold value are contained in the original image data.

Preferably, the image acquisition condition data should contain information about the optical system used in the image taking for acquiring the original image data.

According to this aspect, whether or not to meet the condition under which the ringing appears is decided based on the "information about the optical system", which can influence the appearance of the ringing.

Preferably, the information about the optical system should contain at least any one of a lens type, a diaphragm value and a zoom value of the optical system used in the image taking for acquiring the original image data.

According to this aspect, whether or not to meet the condition under which the ringing appears is decided based on "at least any one of the lens type, diaphragm value and zoom value of the optical system", which can influence the appearance of the ringing.

Preferably, the process control section should determine whether or not to execute the restoration process in the restoration processing section, based on the decision result by the ringing decision section.

According to this aspect, in the case where the decision result by the ringing decision section indicates "the image information meets the condition under which the ringing appears", the restoration process is not executed, and thereby, it is possible to prevent an image (image data) in which the image quality degradation such as the ringing appears, from being provided to a user.

Preferably, the process control section should determine the restoration filter to be used in the restoration process, based on the decision result by the ringing decision section.

According to this aspect, it is possible to use a restoration filter corresponding to the decision result by the ringing decision section, in the restoration process. In the case of indicating "the image information meets the condition under which the ringing appears", a restoration filter in which the ringing is prevented is used, and thereby, it is possible to prevent an image (image data) in which the image quality degradation such as the ringing appears, from being provided to a user.

Preferably, the image-processing device should include a gradation correction section to perform a gradation correction of the original image data. Further, preferably, the process control section should control the gradation correction in the gradation correction section, based on the decision result by the ringing decision section.

According to this aspect, it is possible to control the gradation correction depending on whether or not the image information meets the condition under which the ringing appears, and it is possible to prevent the side effect such as the ringing having appeared due to the restoration process, from being excessively emphasized by the gradation correction.

Preferably, the original image data should contain luminance data, and the restoration processing section should perform the restoration process for the luminance data of the original image data.

Preferably, the original image data should contain color data, and the restoration processing section should perform the restoration process for the color data of the original image data.

Preferably, the process control section should determine for which of luminance data and color data of the original image data the restoration process is performed, based on the decision result by the ringing decision section, and the restoration processing section should perform the restoration process for the data that are of the luminance data and color data of the original image data and that are determined by the process control section.

According to this aspect, for which of the luminance data and color data of the original image data the restoration process is performed is controlled depending on whether or not the image information meets the condition under which the ringing appears. Therefore, for example, in the case where the image information meets the condition under which the ringing appears, the restoration process may be performed for the luminance data of the original image data, from the standpoint of preventing the appearance of a flaw such as an unnecessary coloring. Further, in the case where the image information does not meet the condition under which the ringing appears, the restoration process may be performed for the color data of the original image data, from the standpoint of giving priority to a highly accurate color reproducibility.

Preferably, the optical system should include a lens section to extend a depth of field by modulating a phase.

According to this aspect, also for original image data to be obtained through a so-called EDoF (Extended Depth of Field (Focus)) optical system, it is possible to control the image process or the restoration process, depending on whether or not the image information meets the condition under which the ringing appears. Here, the technique (optical phase modulation means) for modulating the phase in the lens section is not particularly limited, and it is possible that a phase modulation section is provided between lenses or a phase modulation function is given to a lens itself (for example, the incident surface/output surface of the lens).

Preferably, the process control section should control the image process or the restoration process, on an original image data basis.

Preferably, the process control section should control the image process or the restoration process, on a pixel data basis, the pixel data composing the original image data.

The image process or the restoration process may be controlled on an original image data basis, or may be controlled on a pixel data basis. In the case where the image process or the restoration process is controlled on an original image data basis, it is possible to simplify the process, and in the case where the image process or the restoration process is controlled on a pixel data basis, it is possible to apply the process to only a necessary spot in an image.

Another aspect of the present invention relates to an image-capturing device including: the above image-processing device; and the image-capturing element to output the original image data by the image taking using the optical system.

Another aspect of the present invention relates to an image-processing method including: an image information acquisition step of acquiring image information that contains at least any one of image analysis data and image acquisition condition data, the image analysis data being acquired by an analysis of original image data that are acquired from an image-capturing element by an image taking using an optical system, the image acquisition condition data indicating an acquisition condition of the original image data; a restoration processing step of obtaining recovery image data by performing a restoration process for the original image data, the restoration process using a restoration filter that is based on a point spread function for the optical system; and a ringing decision step of deciding whether or not the image information meets a condition under which a ringing appears in the recovery image data due to the restoration process, in which an image process is controlled based on a decision result in the ringing decision step, and the restoration process is performed for the original image data after a gradation correction.

Another aspect of the present invention relates to an image-processing method including: an image information acquisition step of acquiring image information that contains at least any one of image analysis data and image acquisition condition data, the image analysis data being acquired by an analysis of original image data that are acquired from an image-capturing element by an image taking using an optical system, the image acquisition condition data indicating an acquisition condition of the original image data; a restoration processing step of obtaining recovery image data by performing a restoration process for the original image data, the restoration process using a restoration filter that is based on a point spread function for the optical system; a gradation correction step of performing a gradation correction of the original image data; and a ringing decision step of deciding whether or not the image information meets a condition under which a ringing appears in the recovery image data due to the restoration process, in which the restoration process is controlled based on a decision result in the ringing decision step, and for which of the original image data before the gradation process and the original image data after the gradation process the restoration process is performed is determined based on the decision result in the ringing decision step.

Another aspect of the present invention relates to a program for making a computer execute: a procedure of acquiring image information that contains at least any one of image analysis data and image acquisition condition data, the image analysis data being acquired by an analysis of original image data that are acquired from an image-capturing element by an image taking using an optical system, the image acquisition condition data indicating an acquisition condition of the original image data; a procedure of obtaining recovery image data by performing a restoration process for the original image data, the restoration process using a restoration filter that is based on a point spread function for the optical system; and a procedure of deciding whether or not the image information meets a condition under which a ringing appears in the recovery image data due to the restoration process, in which an image process is controlled based on a decision result of whether or not the image information meets the condition under which the ringing appears, and the restoration process is performed for the original image data after a gradation correction.

Another aspect of the present invention relates to a program for making a computer execute: a procedure of acquiring image information that contains at least any one of image analysis data and image acquisition condition data, the image analysis data being acquired by an analysis of original image data that are acquired from an image-capturing element by an image taking using an optical system, the image acquisition condition data indicating an acquisition condition of the original image data; a procedure of obtaining recovery image data by performing a restoration process for the original image data, the restoration process using a restoration filter that is based on a point spread function for the optical system; a procedure of performing a gradation correction of the original image data; and a procedure of deciding whether or not the image information meets a condition under which a ringing appears in the recovery image data due to the restoration process, in which the restoration process is controlled based on a decision result of whether or not the image information meets the condition under which the ringing appears, and for which of the original image data before the gradation process and the original image data after the gradation process the restoration process is performed is determined based on the decision result of whether or not the image information meets the condition under which the ringing appears.

Another aspect of the present invention relates to a non-transitory recording medium having a code recorded therein, the code being a computer-readable code of the program according to the above-described aspects. As such a recording medium, it is possible to use various magneto-optical recording media and semiconductor recording media such as a CD (Compact Disk), a DVD (Digital Versatile Disk), an HD (Hard Disk), an SSD (Solid State Drive) and an USB memory.

According to an aspect of the present invention, the image process is controlled based on whether or not image information (image analysis data and/or image acquisition condition data) meets a condition under which the ringing appears in recovery image data. Therefore, it is possible to perform a restoration process corresponding to the property of an object image, and to suppress the image quality degradation in a recovery image.

According to another aspect of the present invention, it is possible to control the restoration process itself, based on such image information, and to effectively remove the image quality degradation in the recovery image, by performing the restoration process corresponding to the image information.

BRIEF DESCRIPTION OF THE DRAWINGS

FIG. 3 is a diagram showing an outline from an image taking to a point-image restoration process.

FIG. 4 is a block diagram showing an outline of an example of the point-image restoration process.

FIG. 5 is a diagram showing an example of the contrast change at an edge portion in an object image when an ideal point-image restoration process (no pixel value saturation and no clipping) is performed, in which (a) part shows a primary contrast of the object image, (b) part shows a contrast in original image data before the point-image restoration process and (c) part shows a contrast in the recovery image data after the point-image restoration process.

FIG. 6 is a diagram showing an example of the contrast change at an edge portion in an object image, in an actual point-image restoration process (there are a pixel value saturation and a clipping), in which (a) part shows a primary contrast of the object image, (b) part shows a contrast in original image data before the point-image restoration process, and (c) part shows a contrast in recovery image data after the point-image restoration process.

FIG. 7C is another block diagram exemplifying a flow of various image processes in the image-processing section (camera body controller).

FIG. 8 is a diagram showing a correlation between a "gradation correction process (gamma correction process)" and "color data/luminance data" in the point-image restoration process.

FIG. 9 is a diagram for explaining an appearance mechanism of an overshoot due to the point-image restoration process.

DETAILED DESCRIPTION OF THE EMBODIMENTS

Embodiments of the present invention are described with reference to the accompanying drawings. In the following description, an example in which the present invention is applied to a digital camera (image-capturing device) capable of being connected with a computer (PC: Personal Computer) is described as an example.

Figure 1:
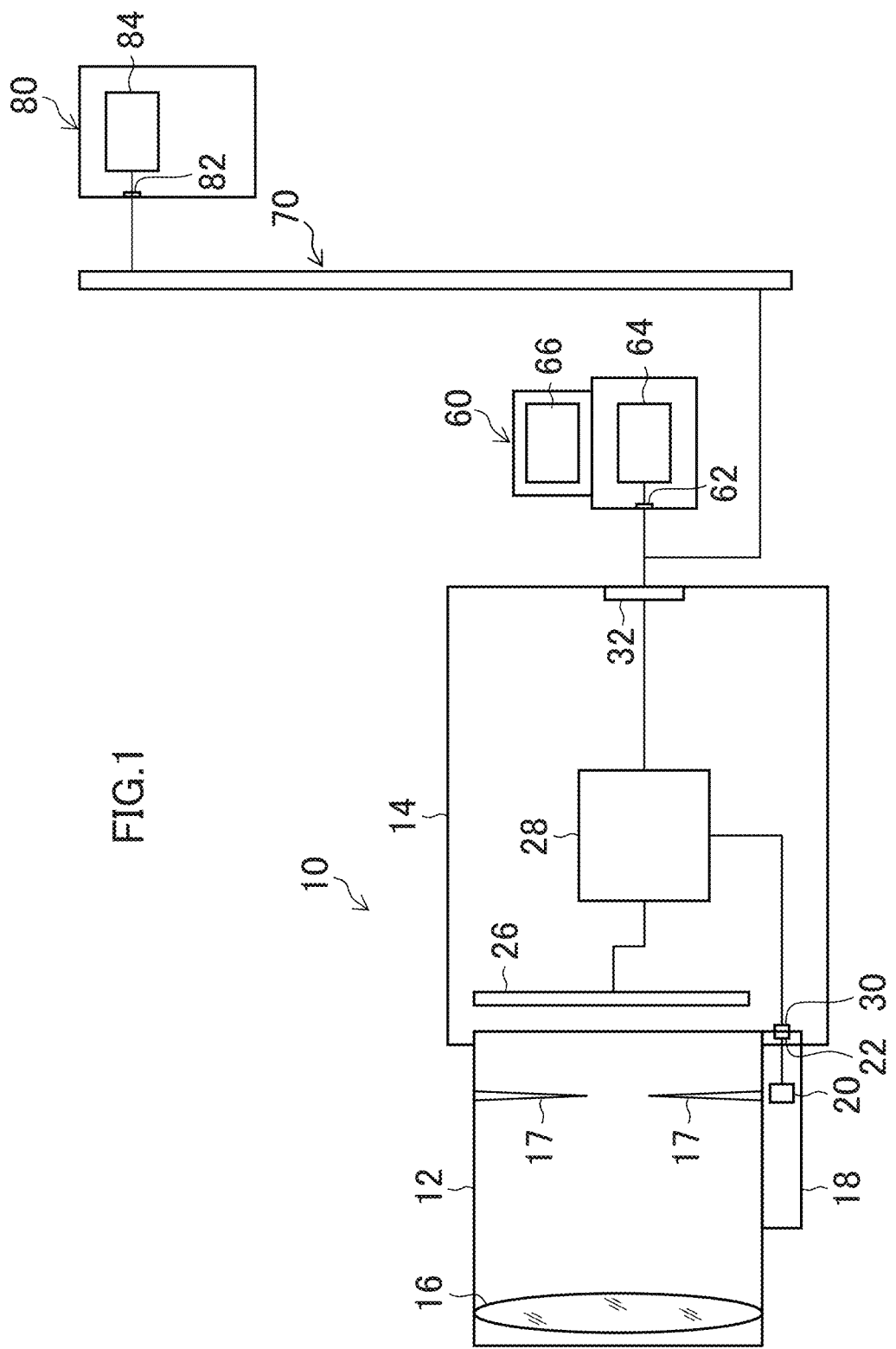
FIG. 1 is a block diagram showing an outline of a digital camera to be connected with a computer.

FIG. 1 is a block diagram showing an outline of a digital camera to be connected with a computer.

A digital camera 10 includes a camera body 14 that is provided with an interchangeable lens unit 12 and an image-capturing element 26, and the lens unit 12 and the camera body 14 are electrically connected through a lens unit input/ output section 22 of the lens unit 12 and a camera body input/output section 30 of the camera body 14.

The lens unit 12 is provided with an optical system such as a lens 16 and a diaphragm 17, and an optical system operation section 18 to control the optical system. The optical system operation section 18 includes a lens unit controller 20 to be connected with the lens unit input/output section 22, and an actuator (the illustration is omitted) to operate the optical system. The lens unit controller 20 controls the optical system through the actuator, based on a control signal to be sent from the camera body 14 through the lens unit input/output section 22, and for example, performs the focus control and zoom control by the lens movement, the diaphragm amount control of the diaphragm 17, and the like.

The image-capturing element 26 of the camera body 14 includes condensing micro-lenses, color filters of RGB or the like, and an image sensor (photodiode: a CMOS (Complementary Metal Oxide Semiconductor), a CCD (Charge Coupled Device), or the like), converts, into an electric signal, the light of an object image to be emitted through the optical system (the lens 16, the diaphragm 17 and the like) of the lens unit 12, and sends the image signal (original image data) to a camera body controller 28.

Thus, the image-capturing element 26 in the example outputs the original image data by the image taking of the object image using the optical system, and the original image data are sent to an image-processing device of the camera body controller 28.

Figure 2:
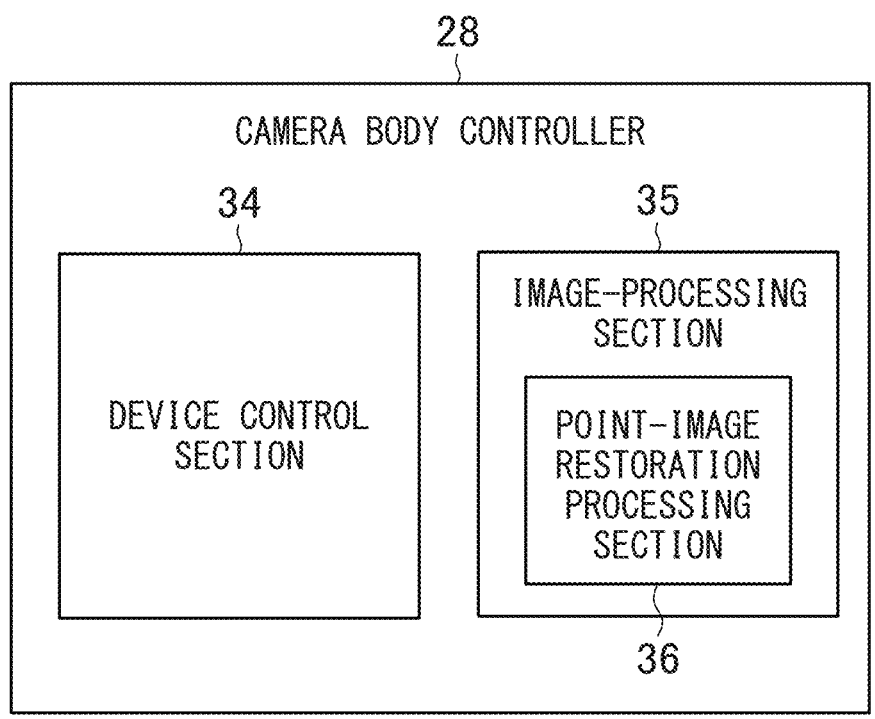
FIG. 2 is a block diagram showing a functional configuration example of a camera body controller.

The camera body controller 28 integrally controls the camera body 14, and includes a device control section 34 and an image-processing section (image-processing device) 35, as shown in FIG. 2. For example, the device control section 34 controls the output of the image signal (image data) from the image-capturing element 26, generates a control signal for controlling the lens unit 12 to send it to the lens unit 12 (the lens unit controller 20) through the camera body input/output section 30, and sends image data (RAW data, JPEG data and the like) before and after an image process, to external apparatuses (a computer 60 and the like) to be connected through an input/output interface 32. Further, the device control section 34 appropriately controls various devices provided in the digital camera 10, such as a display section (EVF: Electronic View Finder, back-surface liquid crystal display section) not shown in the figure.

Meanwhile, the image-processing section 35 can perform an arbitrary image process as necessary, for the image signal from the image-capturing element 26. For example, the image-processing section 35 appropriately performs various image processes such as a sensor correction process, a demosaic (synchronization) process, a pixel interpolation process, a color correction process (an offset correction process, a white balance process, a color matrix process, a gamma conversion process and the like), an RGB image process (a sharpness process, a tone correction process, an exposure correction process, a contour correction process and the like), an RGB/YCrCb conversion process, and an image compression process. In addition, the image-processing section 35 in the example includes a point-image restoration processing section 36 to perform a so-called point-image restoration process for the image signal (original image data). The detail of the point-image restoration process is described later.

As shown in FIG. 1, the image data after the image process by the camera body controller 28 are sent to the computer 60 connected with the input/output interface 32, or the like. The format of the image data to be sent from the digital camera 10 (the camera body controller 28) to the computer 60 or the like, without being not particularly limited, can be an arbitrary format such as RAW, JPEG and TIFF. Therefore, the camera body controller 28 may compose a single image file, as the so-called Exif (Exchangeable Image File Format), by performing the mutual mapping of multiple sets of associated data such as the header information (the image-taking information (the image-taking date and time, the model, the pixel number, the diaphragm value and the like) and the like), main image data and thumbnail image data, and may send the image file to the computer 60.

The computer 60 is connected with the digital camera 10 through the input/output interface 32 of the camera body 14 and a computer input/output section 62, and receives data such as the image data to be sent from the camera body 14. A computer controller 64, which integrally controls the computer 60, performs an image process of the image data from the digital camera 10, and performs the communication control with a server 80 and the like to be connected with the computer input/output section 62 through a network line such as the internet 70. The computer 60 includes a display 66, and a processing content in the computer controller 64 and the like are displayed on the display 66, as necessary. By operating input means (the illustration is omitted) such as a keyboard while checking the displaying of the display 66, a user can input data and commands to the computer controller 64, can control the computer 60, and can control apparatuses (the digital camera 10 and the server 80) to be connected with the computer 60.

The server 80 includes a server input/output section 82 and a server controller 84. The server input/output section 82 constitutes a sending/receiving connection section with external apparatuses such as the computer 60, and is connected with the computer input/output section 62 of the computer 60 through the network line such as the internet 70. The server controller 84, which cooperates with the computer controller 64 in response to a control instruction signal from the computer 60, performs the sending and receiving of data with the computer controller 64 as necessary, downloads data to the computer 60, and performs a computation process to send the computation result to the computer 60.

Here, each controller (the lens unit controller 20, the camera body controller 28, the computer controller 64 and the server controller 84) includes circuits necessary for the control process, and, for example, is provided with a computation processing circuit (a CPU or the like), a memory and the like. Further, the communication among the digital camera 10, the computer 60 and the server 80 may be by wire, or may be by wireless. Further, the computer 60 and the server 80 may be configured in an integrated manner, or the computer 60 and/or the server 80 may be omitted. Further, the digital camera 10 may have a communication function with the server 80, and the sending and receiving of data may be performed directly between the digital camera 10 and the server 80.

Here, a program according to an embodiment of the present invention can be used by being recorded in a non-transitory recording medium such as various magneto-optical recording media and semiconductor recording media that is included in the image-processing section 35, the computer 60 or a storage section 250 of a smart phone 201 described later.

Next, a point-image restoration process of the image-capturing data (image data) of the object image to be obtained through the image-capturing element 26 is described.

In the example, an example in which the point-image restoration process is performed in the camera body 14 (the camera body controller 28) is described. However, a whole or a part of the point-image restoration process can be performed in another controller (the lens unit controller 20, the computer controller 64, the server controller 84, or the like).

The point-image restoration process is a process of acquiring recovery image data, by performing a restoration process using a restoration filter that is based on a point spread function for the optical system, for the original image data acquired from the image-capturing element 26 by the image taking using the optical system (the lens 16, the diaphragm 17 and the like).

FIG. 3 is a diagram showing an outline from the image taking to the point-image restoration process. When a point-image is taken as an object, an object image is light-received by the image-capturing element 26 (image sensor) through the optical system (the lens 16, the diaphragm 17 and the like), and original image data Do are output from the image-capturing element 26. The original image data Do are image data in a state in which the primary object image is blurred by the point spread phenomenon derived from the property of the optical system.

For restoring the primary object image (point-image) from the original image data Do of the blurred image, a point-image restoration process P10 using a restoration filter F is performed for the original image data Do, and thereby, recovery image data Dr indicating an image (recovery image) closer to the primary object image (point-image) are obtained.

The restoration filter F to be used in the point-image restoration process P10 is obtained from the point-image information (point spread function) for the optical system corresponding to image-taking conditions at the time of the acquisition of the original image data Do, by a restoration filter calculation algorithm P20. The point-image information (point spread function) for the optical system can vary depending on not only the type of the lens 16 but also various image-taking conditions such as the diaphragm amount, the focal distance, the zoom amount, the image height, the recording pixel number and the pixel pitch. Therefore, for the calculation of the restoration filter F, these image-taking conditions are acquired.

FIG. 4 is a block diagram showing an outline of an example of the point-image restoration process.

As described above, the point-image restoration process P10 is a process of creating the recovery image data Dr from the original image data Do by a filtering process using the restoration filter F, and the restoration filter F in a real space, which is configured, for example, by N×M taps (N and M are integers of two or more), is applied to the process-target image data. Thereby, the weighted average computation (deconvolution computation) of filter coefficients assigned to the respective taps and the corresponding pixel data (process-target pixel data and adjacent pixel data of the original image data Do) is performed, and thereby, it is possible to calculate the pixel data after the point-image restoration process (the recovery image data Dr). The weighted average process using the restoration filter F is applied to all the pixel data composing the image data while the target pixel is changed in order, and thereby, it is possible to perform the point-image restoration process.

Here, it is possible to derive the restoration filter in the real space configured by the N×M taps, by performing the inverse Fourier transform of a restoration filter in a frequency space. Therefore, it is possible to appropriately calculate the restoration filter in the real space, by specifying the restoration filter in the frequency space that is a basis and designating the number of taps configuring the restoration filter in the real space.

Next, an adverse effect for the image quality that can appear by the point-image restoration process is described.

Each of FIG. 5 and FIG. 6 is a diagram showing an example of the image quality change at an edge portion (image boundary portion) in the object image. FIG. 5 shows a case where an ideal point-image restoration process (there is no pixel value saturation and no clipping) is performed, and FIG. 6 shows an example of an actual point-image restoration process (there are a pixel value saturation and a clipping).

Each of (a) part of FIG. 5 and (a) part of FIG. 6 shows a primary contrast of the object image, each of (b) part of FIG. 5 and (b) part of FIG. 6 shows a contrast in the original image data Do before the point-image restoration process, and each of (c) part of FIG. 5 and (c) part of FIG. 6 shows a contrast in the recovery image data Dr after the point-image restoration process. Here, the horizontal direction (X-direction) of FIG. 5 and FIG. 6 indicates the position (one-dimensional position) in the object image, and the vertical direction (Y-direction) indicates the strength of the contrast.

At the "edge portion having a contrast difference" (see (a) part of FIG. 5 and (a) part of FIG. 6) in the object image, as described above, an image blur appears in the taken image (the original image data Do), by the point spread phenomenon of the optical system at the time of image taking (see (b) part of FIG. 5 and (b) part of FIG. 6), and the recovery image data Dr are obtained by the point-image restoration process (see (c) part of FIG. 5 and (c) part of FIG. 6).

In the point-image restoration process, when the "actual image degradation property (image blur property)" and the "point spread function (the PSF or the like) that is a basis for the restoration filter to be used" match, the image is properly restored, and the recovery image data Dr in which the edge portion and the like have been properly restored can be obtained (see FIG. 5).

However, the original image data containing a pixel (saturated pixel) in which the pixel value is saturated are put into a state in which they are clipped at the saturated pixel portion (see FIG. 6). Especially, the original image data at the edge portion containing the saturated pixel have a waveform close to a step signal (see (b) part of FIG. 6), and therefore, the contrast change is relatively clear, resulting in data having a relatively low degradation (image blur). Thus, in the original image data containing the saturated pixel, the deviation from the primary image data (object image) appears due to the clipping of the pixel data. When the restoration process using an ordinary restoration filter is performed for the original image data in which such a data deviation appears, the ringing is likely to appear and the ringing to appear is likely to be complicated (see (c) part of FIG. 6). Further, the high-frequency component increases, and the folding noise is likely to be emphasized.

Hence, the image process or the restoration process is controlled depending on "whether or not the image information meets a condition under which the ringing appears in the recovery image data due to the restoration process", and thereby, it is possible to effectively suppress the ringing in the recovery image data.

Here, when the point-image restoration process is actually designed as a part of an image-processing flow, a wide variety of image-processing flows are possible.

Figure 7A:
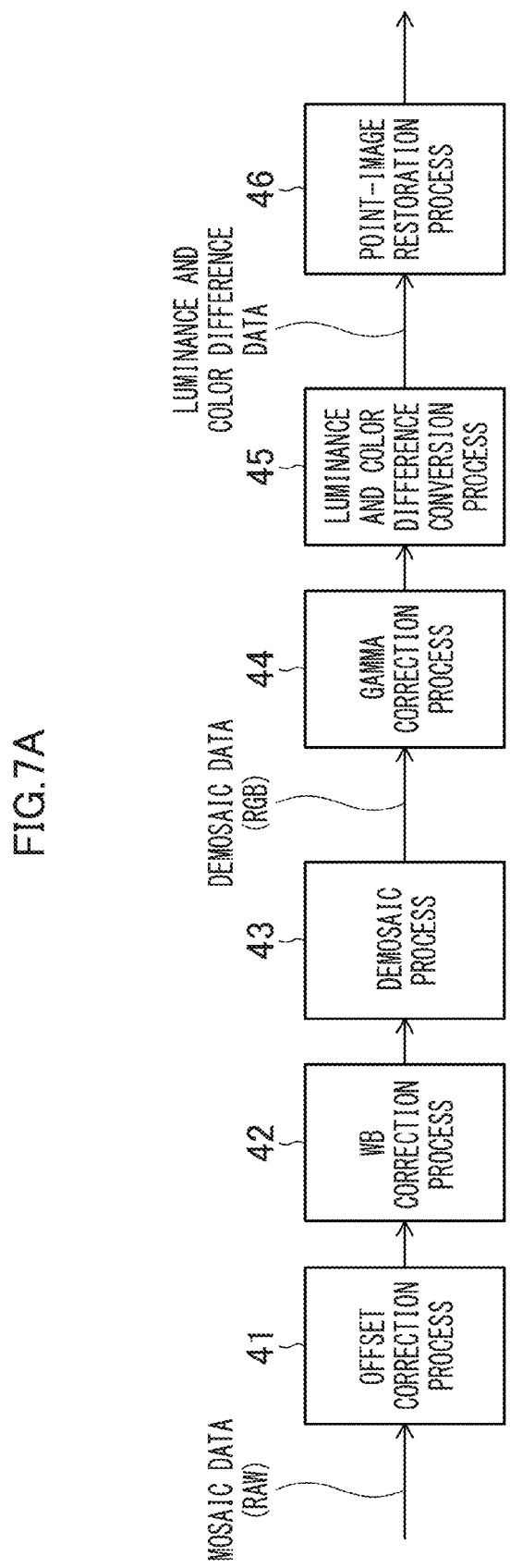
FIG. 7A is a block diagram exemplifying a flow of various image processes in an image-processing section (camera body controller).
Figure 7B:
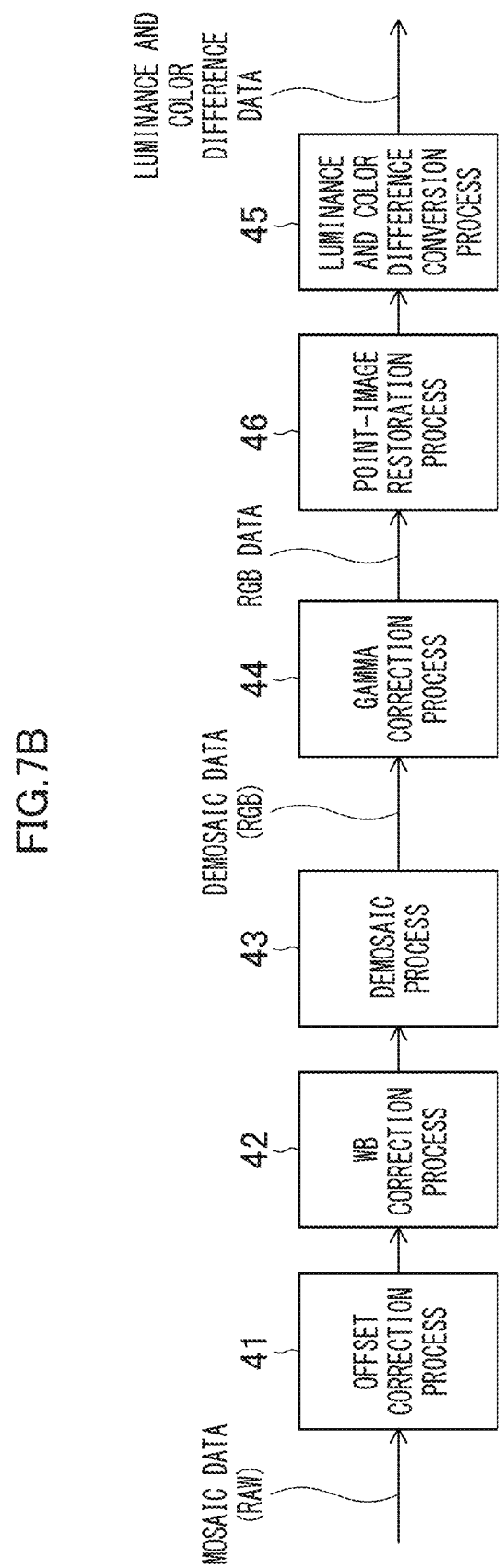
FIG. 7B is another block diagram exemplifying a flow of various image processes in the image-processing section (camera body controller).
Figure 7D:
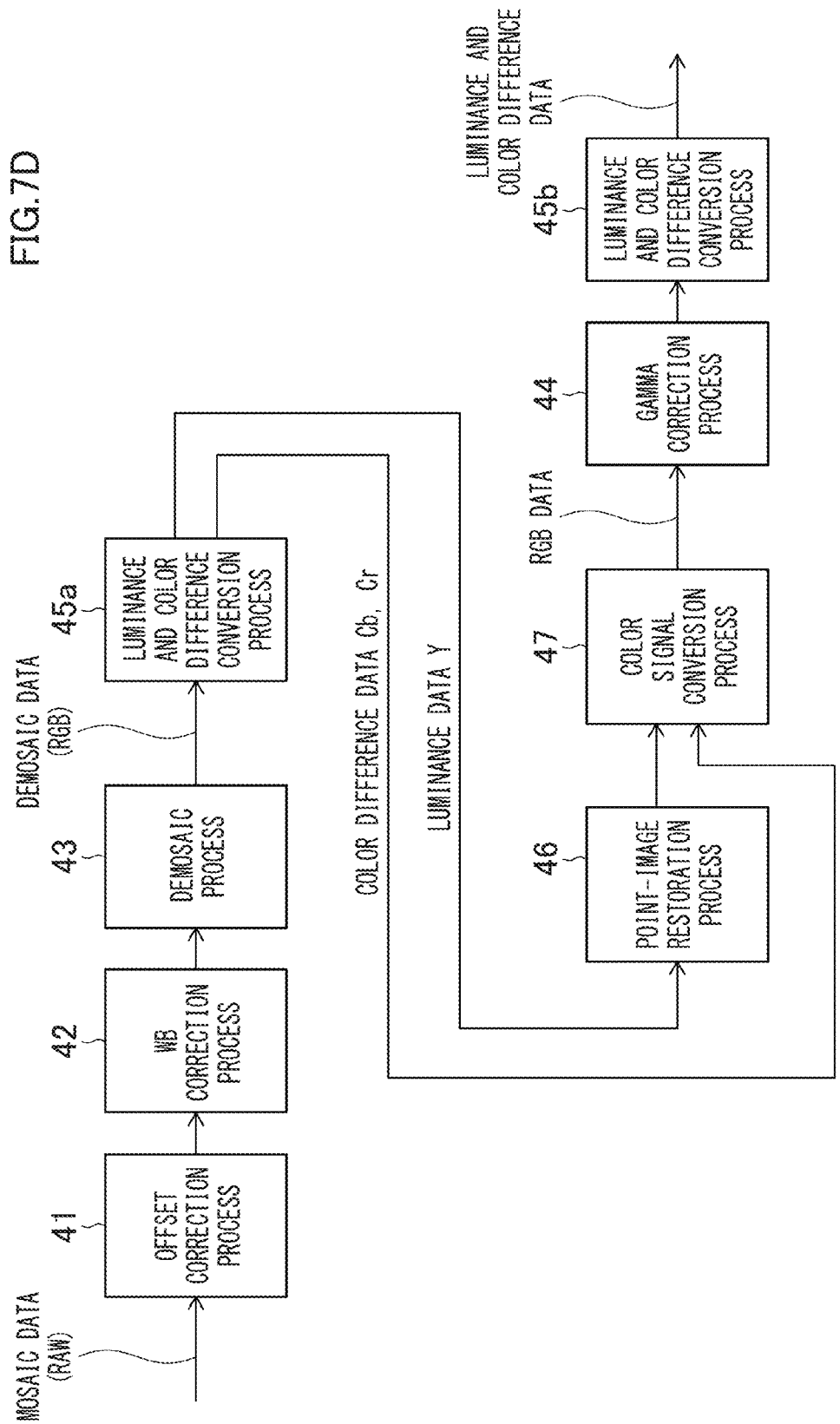
FIG. 7D is another block diagram exemplifying a flow of various image processes in the image-processing section (camera body controller).

FIGS. 7A to 7D are block diagrams exemplifying various image-processing flows in the image-processing section 35 (the camera body controller 28). FIG. 7A shows an example in which the point-image restoration process is performed for luminance data (Y) after the gamma correction process (the gradation correction process), and FIG. 7B shows an example in which the point-image restoration process is performed for RGB color data after the gamma correction process. Further, FIG. 7C shows an example in which the point-image restoration process is performed for the RGB color data before the gamma correction process, and FIG. 7D shows an example in which the point-image restoration process is performed for the luminance data (Y) before the gamma correction process.

In the example of FIG. 7A, when mosaic data (RAW image data; original image data) are input, the image-processing section 35 sequentially performs an "offset correction process 41 of adjusting the brightness of the image", a "WB correction process 42 of adjusting the white balance (WB) of the image", a "demosaic process 43 of acquiring color data of each color of RGB for all pixels by the pixel interpolation process", a "gamma correction process (gradation correction step; gradation correction section) 44 of adjusting the gradation of pixel data by performing the gradation correction by the logarithmic process", a "luminance and color difference conversion process 45 of calculating luminance data (Y) and color difference data (Cb/Cr) from the RGB color data", and a "point-image restoration process (restoration processing step) 46 of performing a point-image restoration process using a restoration filter that is based on the point spread function for the optical system used in the image taking, for the image data (luminance data)". Here, the color data correspond to the color types of the color filters included in the image-capturing element 26 that performs the image taking and acquisition of the mosaic data (original image data), and the luminance data and the color difference data can be calculated from the color data by a known calculation formula.

Meanwhile, in the example of FIG. 7B, the processing order of the luminance and color difference conversion process 45 and the point-image restoration process 46 is interchanged relative to the image-processing example of FIG. 7A. Therefore, although the point-image restoration process 46 is performed for the luminance data of the original image data after the gamma correction process (gradation correction) 44 in the example of FIG. 7A, the point-image restoration process 46 for the RGB color data of the original image data after the gamma correction process (gradation correction) 44 is performed in the point-image restoration processing section 36, and thereafter, the luminance data and the color difference data are calculated, in the example of FIG. 7B.

Further, in the example of FIG. 7C, the processing order of the gamma correction process 44 and the point-image restoration process 46 is interchanged relative to the image-processing example of FIG. 7B. Therefore, although the point-image restoration process 46 is performed after the gamma correction process 44 in the example of FIG. 7B, the point-image restoration process 46 is performed before the gamma correction process 44 in the example of FIG. 7C.

Further, in the example of FIG. 7D, the offset correction process 41, the WB correction process 42 and the demosaic process 43 are the same as the examples of FIGS. 7A to 7D. However, a luminance and color difference conversion process 45a is performed after the demosaic process 43, and a color signal conversion process 47 of calculating the RGB color data from the luminance data and the color difference data is performed after the point-image restoration process 46 is performed for the luminance data. Then, the gamma correction process 44 and a luminance and color difference conversion process 45b are sequentially performed for the RGB color data, and thereby, the luminance data and the color difference data are acquired.

Here, each of FIGS. 7A to 7D shows just an example of the processing flow. Another process may be performed at an arbitrary stage as necessary, or a part of the processes shown in FIGS. 7A to 7D may be omitted.

Thus, a series of image-processing flows has many variations. Conventionally, there has not been discussed what difference appears in the effect of the point-image restoration process among various image-processing flows, from the standpoint of, for example, "which of before and after the gradation correction (gamma correction process) is preferable as the order of the point-image restoration process", "whether the point-image restoration process for the color data of RGB and the like is preferable or the point-image restoration process for the luminance data (Y) is preferable", and the like.

The inventors have focused attention on the difference in the point-image restoration process effect among various image-processing flows and had diligently performed the study, and as a result, have obtained new insight about the correlation of "the gradation correction process (gamma correction process), the ringing phenomenon, the point-image restoration process and the like".

FIG. 8 is a diagram showing a correlation between the "gradation correction process (gamma correction process)" and the "color data/luminance data" in the point-image restoration process.

In FIG. 8, the column shown as "Antilogarithm (Before Gradation Correction)" indicates the image property when the point-image restoration process was performed for the image data (antilogarithm image data) before the gradation correction process (gamma correction process) (see FIGS. 7C and 7D), and the column shown as "Logarithm (After Gradation Correction)" indicates the image property when the point-image restoration process was performed for the image data (logarithm image data) after the gradation correction process (gamma correction process) (see FIGS. 7A and 7B). Further, in FIG. 8, the column shown as "Color Data (RGB)" indicates the image property when the point-image restoration process was performed for the color data (RGB data) (see FIGS. 7B and 7C), and the column shown as "Luminance Data (Y)" indicates the image property when the point-image restoration process was performed for the luminance data (see FIGS. 7A and 7D).

Comparing the antilogarithm image data and the logarithm image data, in an ideal system, the point-image restoration of the antilogarithm image data (the image data before the gradation correction) is more excellent in image restorability than the point-image of the logarithm image data (the image data after the gradation correction) (see "Restorability in Ideal System" in FIG. 8).

The ideal system described herein means an ideal system that sufficiently satisfies conditions for performing a proper point-image restoration process such as "the number of filter taps of the restoration filter to be used in the point-image restoration process is sufficiently great", "the number of arithmetic bits is sufficiently great", "the actual blur property of the optical system and the optical system blur property data held by the image-processing section 35 coincide", and "the input image data (original image data) do not contain saturated pixel data in which the pixel value is saturated".

On the other hand, the inventor confirmed, by multiple-time experiments, that, in an actual processing system deviated from the ideal system, the point-image restoration of the logarithm image data (the image data after the gradation correction) is lower in the appearance degree of a side effect such as the ringing in the point-image restoration image (recovery image), than the point-image restoration of the antilogarithm image data (the image data before the gradation correction) (see "Luminance System Toughness in System Deviated from Ideal System (Ringing Degree and the like)" in FIG. 8).

One reason why, in the real processing system different from the ideal system, the "point-image restoration process of the logarithm image data (the image data in the logarithm space)" is lower in the appearance of a side effect such as the ringing than the "point-image restoration process for the antilogarithm image data (the image data in the antilogarithm space)" is that the gradation at a low-luminance portion is emphasized (enhanced) and the gradation at a high-luminance portion is not emphasized. Also, one reason why the image degradation such as the ringing is conspicuous is that an overshoot (undershoot) appears at an edge (boundary portion) by the point-image restoration process and such an overshoot (undershoot) is emphasized by the gradation correction.

FIG. 9 is a diagram for explaining an appearance mechanism of an overshoot due to the point-image restoration process. In FIG. 9, the horizontal direction (X-direction) indicates the position (one-dimensional position) in an image, and the vertical direction (Y-direction) indicates the pixel value.

An image edge portion (see (a) part of FIG. 9) where the image quality is degraded (blurred) because of the point spread phenomenon by the optical system comes close to the primary image quality (contrast), by the point-image restoration process, but a so-called overshoot (undershoot) sometimes appears (see (b) part of FIG. 9). When the overshoot itself appearing by the point-image restoration process is small, it is not particularly conspicuous visually. However, when the gradation correction process (gamma correction process) is subsequently performed, the overshoot is sometimes emphasized more than necessary (see "E1" and "E2" in (c) part of FIG. 9). Particularly, a shadow-side overshoot (undershoot) portion, to which a great gain (amplification factor) is applied by the subsequent gamma correction process, configures a portion where the pixel value is greatly biased to the black side in the image edge portion (see "E2" in (c) part of FIG. 9). Here, this phenomenon is not unique to the point-image restoration process, and is the same also for the case where the contour correction process is performed for image data in an antilogarithm space, and as a result, an overshoot appears in an edge portion.

Further, if the color data (color signal) of each color of RGB are input to the point-image restoration processing section 36 as expected (as the held degradation information (the point spread function information about the optical system)), the "point-image restoration process for the color data (RGB data)" allows for an effective color data correction, and makes it possible to effectively reduce the chromatic aberration and the like, compared to the "point-image restoration process for the luminance data (Y data)" (see "Restorability in Ideal System" and "Color System Correction Capability" in FIG. 8). However, when the actual input signal does not behave as expected, the point-image restoration process for the color data (RGB data) sometimes causes a side effect such as the conspicuousness of an unnatural color shade by an increase in spots where unnecessary coloring appears (see "Color System Toughness in System Deviated from Ideal System (Coloring Degree, Bleeding Degree, and the like)" in FIG. 8).

Also, in the processing scale (when the processing system is hardware, the scale of the processing circuit), there is a difference shown in FIG. 8. That is, relative to the antilogarithm image data (the image data in the antilogarithm space), the point-image restoration process for the logarithm image data (the image data in the logarithm space) makes the computation process easier, and therefore, reduces the processing scale and has an advantage. Further, although the point-image restoration process for the color data (RGB data) requires a processing system having three channels (3 ch), the point-image restoration process for the luminance data (Y data) only requires a processing system having one channel (1 ch). Therefore, the point-image restoration process for the luminance data makes the computation process easier, allowing for the compacting of the processing scale.

Therefore, in the actual image-processing system, it is preferable to construct a proper system corresponding to user's needs in light of the above-described various properties shown in FIG. 8. For example, in the case where the processing condition is deviated from the ideal processing system, such as "various types are input as the image signal (image data) to be input", "when the processing system is made as hardware, the scale is reduced as much as possible", or "there is no guarantee that the actual image degradation information and the image degradation information held in the processing system coincide completely", the point-image restoration process for the logarithm image data is more excellent in image toughness (image non-breakdown property) than the point-image restoration process for the antilogarithm image data. Therefore, in the actual image processing system, from the standpoint of the improvement of the image toughness, it is preferable to perform the point-image restoration process in a subsequent stage of the gradation correction process (gamma correction process). Further, in the case of giving weight to the suppression of a side effect due to the image process or the downsizing of the processing system, the image-processing system to perform the point-image restoration process for the luminance data rather than the color data is preferable, but in the case of giving weight to the color reproducibility, the image processing system to perform the point-image restoration process for the color data rather than the luminance data is preferable.

Further, in the case of performing the gradation correction by the logarithmic process (gamma correction process), the restoration filter itself may have a filter coefficient corresponding to the image data before the logarithmic process, or may have a filter coefficient corresponding to the image data after the logarithmic process.

In the case of performing the recovery process (point-image restoration process) by purposely applying the "restoration filter that has a filter coefficient corresponding to the pixel value (antilogarithm pixel data) before the gradation correction (before the logarithmic process)" to the "pixel value (logarithm pixel data) of the image data after the gradation correction (after the logarithmic process)", it is possible to improve the toughness against the image quality degradation (the ringing or the like) to appear in the recovery image (restoration image), and to make the ringing inconspicuous in the recovery image. This is because in the pixel data (image data) after the logarithmic process, the gradation at a low-luminance portion is emphasized (enhanced) and the gradation at a high-luminance portion is not emphasized.

Figure 10:
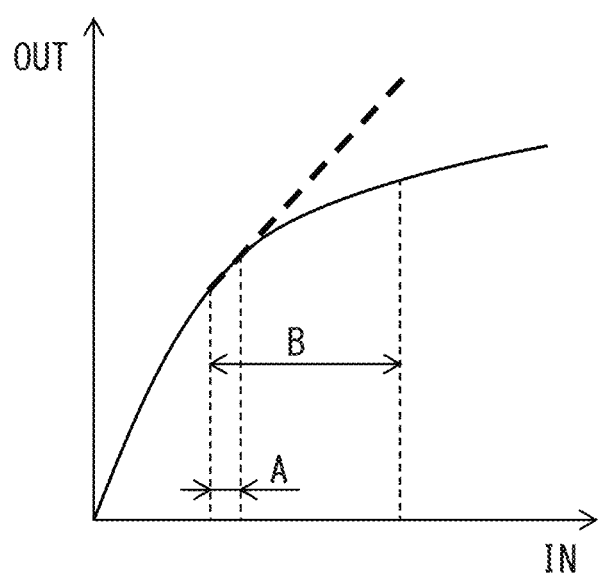
FIG. 10 is a diagram showing an example of the relation between before-processing data and after-processing data by the gamma process (logarithmic process).

FIG. 10 is a diagram (graph) showing an example of the relation between before-processing data and after-processing data by the gamma process (logarithmic process). In FIG. 10, the horizontal axis indicates the before-processing data (gamma-process input data "IN"), the vertical axis indicates the after-processing data (gamma-process output data "OUT"), and the solid line in the graph indicates a gamma-process gradation curve.

In the point-image restoration process for general image data, a region where the effect of the point-image restoration process is visually recognized easily is a low-contrast region, and a "region where the level difference in the pixel value is relatively small", at which the gamma-process gradation curve can be approximated by a straight line (see "A" in FIG.

10). On the other hand, at a high-contrast region, that is, a "region where the level difference in the pixel value is relatively large", which configures a curved line portion in the gamma-process gradation curve, the intrinsic contrast is high and the blur is hard to recognize (see "B" in FIG. 10).

Furthermore, when the point-image restoration process is performed for the pixel data in which the pixel value is an antilogarithm (the pixel data before the gradation correction) at a region containing a saturated pixel in the high-contrast region, and thereafter the gradation process (the gamma correction process, the logarithmic process) is performed, the undershoot/overshoot (ringing) is easily conspicuous. On the other hand, when the point-image restoration process is performed for the pixel data after the logarithmic process, the high contrast is shrunk by the logarithmic process, and the strength of the ringing by the point-image restoration process is decreased.

That is, the recovery process (point-image restoration process) is performed for the pixel data after the logarithmic process, using the restoration filter that has the filter coefficient corresponding to the pixel data in which the pixel value is an antilogarithm, and thereby, it is possible to equivalently perform the point-image restoration process for a low-contrast region where the visual recognition is generally easy, while it is possible to decrease the emphasis degree of the ringing for a high-contrast region where the ringing easily occurs by the point-image restoration process.

Particularly, in the case where the image-processing device (the image-capturing device or the like) can execute multiple types of gradation corrections (gamma correction processes) and holds data of multiple types of gamma-process gradation curves, the conventional art (see PTL 3) requires that the limiting value of the variation in the pixel signal value is calculated for each of the multiple types of gradation corrections. However, according to the scheme, since the point-image restoration process is applied to the pixel data after the gradation correction, it is unnecessary to switch the process depending on the type of the gradation process.

Further, generally, the PSF (point spread function) is on the premise that the input is linear, and the restoration filter based on this premise is generated more easily when it has a "linear coefficient", that is, a "filter coefficient corresponding to the antilogarithm pixel data".

Thus, the scheme is practically very effective and useful.

Meanwhile, when the recovery process (point-image restoration process) is performed for the pixel value (logarithm pixel data) after the gradation correction (after the logarithmic process) using the restoration filter that has the filter coefficient corresponding to the pixel value (logarithm pixel data) after the logarithmic process, it is possible to improve the toughness against the image quality degradation by the ringing appearing in the point-image restoration process, and to make the appearing ringing inconspicuous in the image.

That is, in the case where the pixel data are the pixel value (logarithm pixel data) after the gradation correction (logarithmic process), it is possible to exactly perform the point-image restoration process itself, by performing the point-image restoration process using the restoration filter that has the filter coefficient corresponding to the pixel value (logarithm pixel data) after the logarithmic process. In this case, by adopting the target image data in the point-image restoration process as the "original image data after the gradation correction", it is possible to shrink a high contrast by the gradation correction (logarithmic process), and to decrease the strength of the appearing ringing by the point-image restoration process.

Here, the restoration filter to be used in the point-image restoration process may be generated in advance, or may be calculated and generated every time the point-image restoration process is executed. From the standpoint of the decrease in the computation amount at the time of the point-image restoration process, it is preferable that the restoration filter be generated in advance. Further, from the standpoint of the use of a restoration filter that is excellent in adaptability, it is preferable that the restoration filter be calculated every time the point-image restoration process is executed.

In the case where the restoration filter is generated in advance, the filter coefficient of the restoration filter may be determined by a computation based on a pixel value to be determined by the logarithmic process (gamma correction process) for the input pixel value (input image data). The pixel value to be used in the generation of the restoration filter may be the luminance value, or may be the pixel value (for example, a pixel value of G) with respect to one channel that is representatively selected from RGB color data. Further, the pixel value to be used in the generation of the restoration filter may be a pixel value of a main object image, or may be a pixel value that is determined from the average value of the whole screen.

Here, the point-image restoration process may be a process of restoring only the amplitude component of the original image data to obtain the recovery image data, or may be a process of restoring the amplitude component and phase component of the original image data to obtain the recovery image data. That is, it is possible to calculate the restoration filter based on at least either one of an MTF (Modulation Transfer Function) and PTF (Phase Transfer Function) for the optical system. Here, the blur property of the optical system can be expressed by a so-called optical transfer function (OTF), and a function to be obtained by the inverse Fourier transform of the OTF is referred to also as a point-image distribution function (PSF: Point Spread Function). The MTF is the absolute value component of the OTF, and the PTF is the phase deviation expressed as a function with respect to the spatial frequency. Therefore, the restoration filter to be used in the point-image restoration process can be appropriately designed based on the OTF (MTF/PTF) or PSF for the optical system.

In the case of a "point-image restoration process that does not involve the restoration of the phase component", the ringing is likely to appear in the recovery image data. Therefore, it is preferable that such a "point-image restoration process that does not involve the restoration of the phase component" be performed for the image data (original image data) after the gradation correction. Further, even when the point-image restoration process that does not involve the restoration of the phase component is performed for the image data (original image data) after the gradation correction, it is preferable to control the image process (the point-image restoration process, or the like) after deciding whether or not to be in a situation in which the ringing appears.

On the other hand, in the case of a "point-image restoration process that involves the restoration of the phase component", it is possible to reduce the ringing in the recovery image data. By performing such a "point-image restoration process that involves the restoration of the phase component" for the image data (original image data) after the gradation correction, it is possible to further improve the image toughness. Then, even when the point-image restoration process that involves the restoration of the phase component is performed for the image data (original image data) after the gradation correction, it is preferable to control the image process (the point-image restoration process, or the like) after deciding whether or not to be in a situation in which the ringing appears.

Here, which of the "image data before the gradation correction" and the "image data after the gradation correction" is the target of the point-image restoration process may be determined in consideration of whether or not the point-image restoration process involves the restoration of the phase component.

In light of the above-described new insight, preferable embodiments of the present invention are exemplified below.

First Embodiment

In the embodiment, depending on the "image information relevant to an image (original image data) that is the target of the point-image restoration process" meets the "condition under which the ringing appears in the recovery image data due to the point-image restoration process", the image process is controlled in units of the "image", and whether or not to execute the point-image restoration process is determined.

Figure 11:
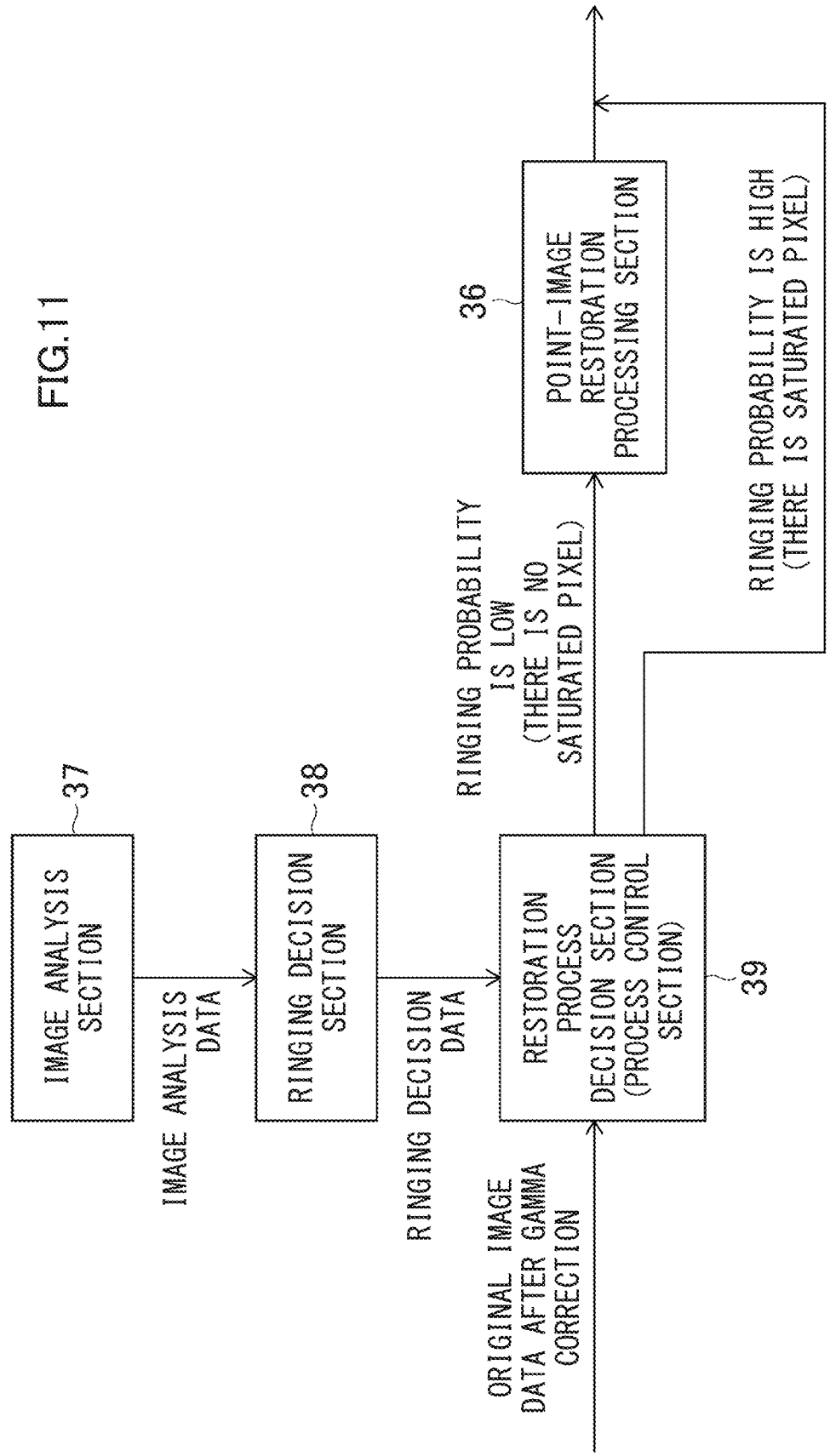
FIG. 11 is a diagram showing image-processing blocks according to a first embodiment.

FIG. 11 is a diagram showing image-processing blocks according to the first embodiment.

An image-processing section 35 (see FIG. 2) according to the embodiment includes an image analysis section 37, a ringing decision section 38 and a restoration process decision section (process control section) 39, in addition to the point-image restoration processing section (restoration processing section) 36. Here, the image-processing blocks in the figure do not always need to be separately provided, and the multiple image-processing blocks may be actualized as hardware/software that is configured in an integrated manner.

The image analysis section 37 analyzes the original image data acquired from the image-capturing element by the image taking using the optical system, and acquires image analysis data (image information). In the example, whether or not the original image data contain a saturated pixel is acquired by the analysis of the original image data in the image analysis section 37. The image analysis result by the image analysis section 37 is sent as the image analysis data, to the ringing decision section 38.

The ringing decision section 38 decides whether or not the image analysis data sent from the image analysis section 37 meet the "condition (ringing appearance condition) under which the ringing appears in the recovery image data due to the point-image restoration process". Specifically, in the case where the image analysis data indicate that the original image data contain the saturated pixel, the ringing decision section 38 decides "the image analysis data meet the ringing appearance condition". On the other hand, in the case where the image analysis data indicate that the original image data do not contain the saturated pixel, the ringing decision section 38 decides "the image analysis data do not meet the ringing appearance condition". Thus, the ringing decision section 38 decides the appearance probability of the ringing in the recovery image data. The case of "the image analysis data meet the ringing appearance condition" is the case of "the appearance probability of the ringing in the recovery image data is high", and the case of "the image analysis data do not meet the ringing appearance condition" is the case of "the appearance probability of the ringing in the recovery image data is not high (is low)". The appearance probability of the ringing described herein may mean not only "whether or not the ringing appears", but also "whether or not a visually conspicuous ringing appears". Therefore, for example, the case where the ringing does not appear at all, or the case where the visually conspicuous ringing does not appear may be decided as "the appearance probability of the ringing is not high (is low)", and the case where the ringing appears, or the case where the visually conspicuous ringing appears may be decided as "the appearance probability of the ringing is high". The decision result in the ringing decision section 38 is sent as ringing decision data, to the restoration process decision section 39.

The restoration process decision section 39 controls the image process based on the decision result by the ringing decision section 38, and determines whether or not to execute the point-image restoration process in the point-image restoration processing section 36.

Specifically, in the case of deciding "the probability that the ringing appears in the recovery image data is not high (is low) (that is, "the image analysis data do not meet the ringing appearance condition" or "the original image data do not contain the saturated pixel")" from the ringing decision data, the restoration process decision section 39 sends the original image data to the point-image restoration processing section 36. On the other hand, in the case of deciding "the probability that the ringing appears in the recovery image data is high (that is, "the image analysis data meet the ringing appearance condition" or "the original image data contain the saturated pixel")" from the ringing decision data, the restoration process decision section 39 skips the point-image restoration processing section 36, and sends the original image data to a processing section at the subsequent stage. Thus, the restoration process decision section 39 in the example controls the point-image restoration process (image process), on an original image data basis.

The point-image restoration processing section 36 performs, for the original image data, a restoration process using a restoration filter that is based on the point spread function for the optical system, and obtains the recovery image data.

Here, the restoration process decision section 39 and the point-image restoration processing section 36 are provided at the subsequent stage of the gamma correction processing section (see the gamma correction process 44 in FIGS. 7A to 7D), and the point-image restoration process in the point-image restoration processing section 36 is performed for the original image data after the gamma correction process (after the gradation correction) (see FIGS. 7A and 7B).

Meanwhile, to the image analysis section 37, the original image data before the gamma correction process may be input, or the original image data after the gamma correction process may be input. The image analysis data may be generated from any of the original image data before and the original image data after the gamma correction process.

Figure 12:
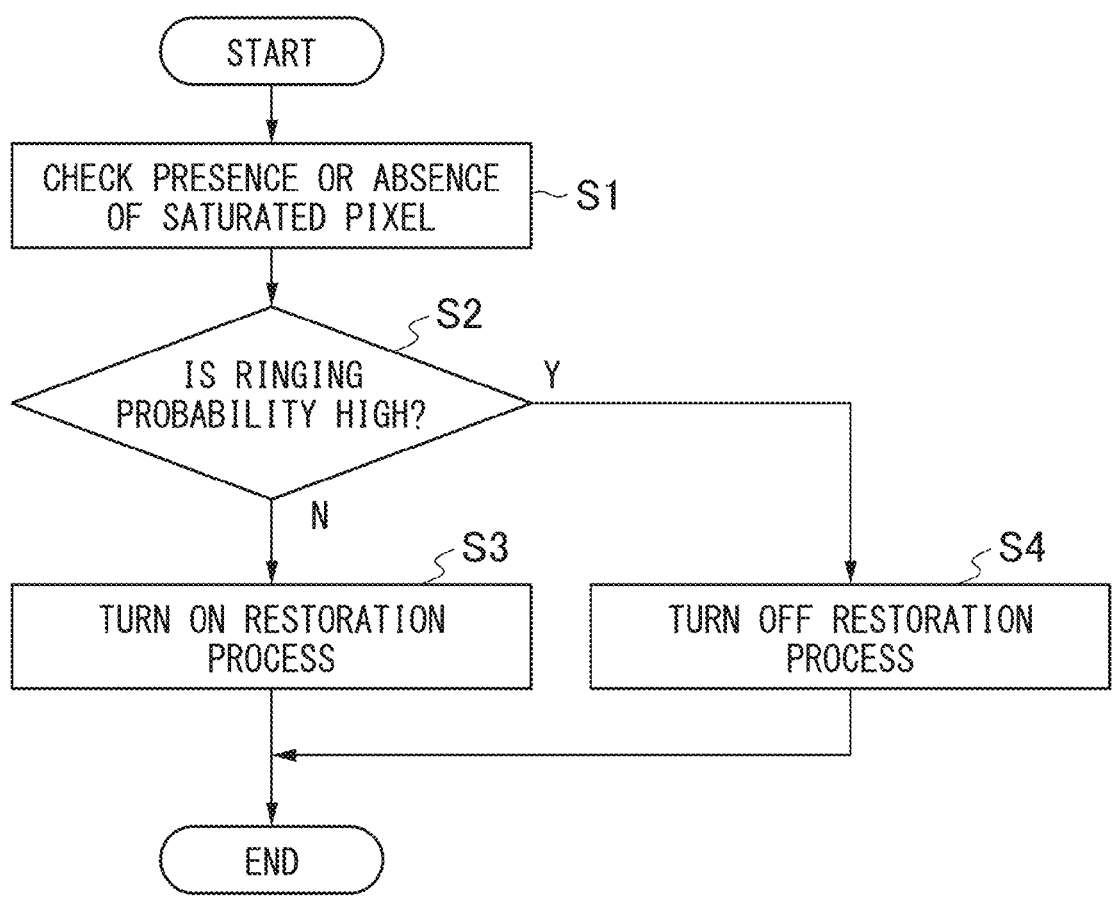
FIG. 12 is a diagram showing a point-image restoration process flow by the image-processing blocks shown in FIG. 11.

FIG. 12 is a diagram showing a point-image restoration process flow by the image-processing blocks shown in FIG. 11.

First, the image analysis section 37 analyzes the original image data, and examines whether or not the original image data contain the saturated pixel (S1 in FIG. 12; an image information acquisition step).

In the case where the original image data do not contain the saturated pixel, the ringing decision section 38 decides that the probability that the ringing appears in the recovery image data is not high (is low) (N in S2; a ringing decision step). In this case, the original image data are sent from the restoration process decision section 39 to the point-image restoration processing section 36, and the point-image restoration process is performed in the point-image restoration processing section 36, so that the recovery image data are acquired (S3). The recovery image data are sent to a processing section at the subsequent stage.

On the other hand, in the case where the original image data contain the saturated pixel, the ringing decision section 38 decides that the probability that the ringing appears in the recovery image data is high (Y in S2). The restoration process decision section 39 skips the point-image restoration process (the point-image restoration processing section 36) (S4), and sends the original image data to the processing section at the subsequent stage.

Thus, the presence or absence of the saturated pixel in the image (original image data) is checked, and then, in the case where the saturated pixel is present, the point-image restoration process is not performed for the image. Thereby, it is possible to prevent the appearance and emphasis of the ringing in the image data, and to make the image degradation such as the ringing inconspicuous in the image data (image) to be sent to the subsequent stage.

Here, in the above-described example, the execution of the point-image restoration process is determined depending on whether or not the original image data contain the saturated pixel, but is not limited to this. For example, the image analysis section 37 may create image analysis data indicating whether or not the original image data contain pixel data having a pixel value greater than a threshold value (for example, 90% of a saturated pixel value (the maximum allowable pixel value for the constituent pixel of the image-capturing element 26)). In this case, when the original image data contain the "pixel data having a pixel value greater than a threshold value", the ringing decision section 38 decides that the probability of the ringing is high, and the restoration process decision section 39 skips the point-image restoration process (the point-image restoration processing section 36) and sends the original image data to the processing section at the subsequent stage. On the other hand, when the original image data do not contain the "pixel data having a pixel value greater than a threshold value", the ringing decision section 38 decides that the probability of the ringing is not high (is low), the restoration process decision section 39 sends the original image data to the point-image restoration processing section 36, and the point-image restoration processing section 36 performs the point-image restoration process of the original image data.

Further, the ringing decision section 38 may decide the appearance probability of the ringing, based on whether or not the original image data contain a predetermined pixel number or more of the pixel data in which the pixel value is saturated or the pixel data having a pixel value greater than a threshold value.

Here, in the above-described example shown in FIG. 11, the "image analysis data to be acquired by the analysis of the original image data" are used as the image information that is a basis for the ringing decision. However, it is also possible that "image acquisition condition data indicating an acquisition condition of the original image data" are used as the image information.

Figure 13:
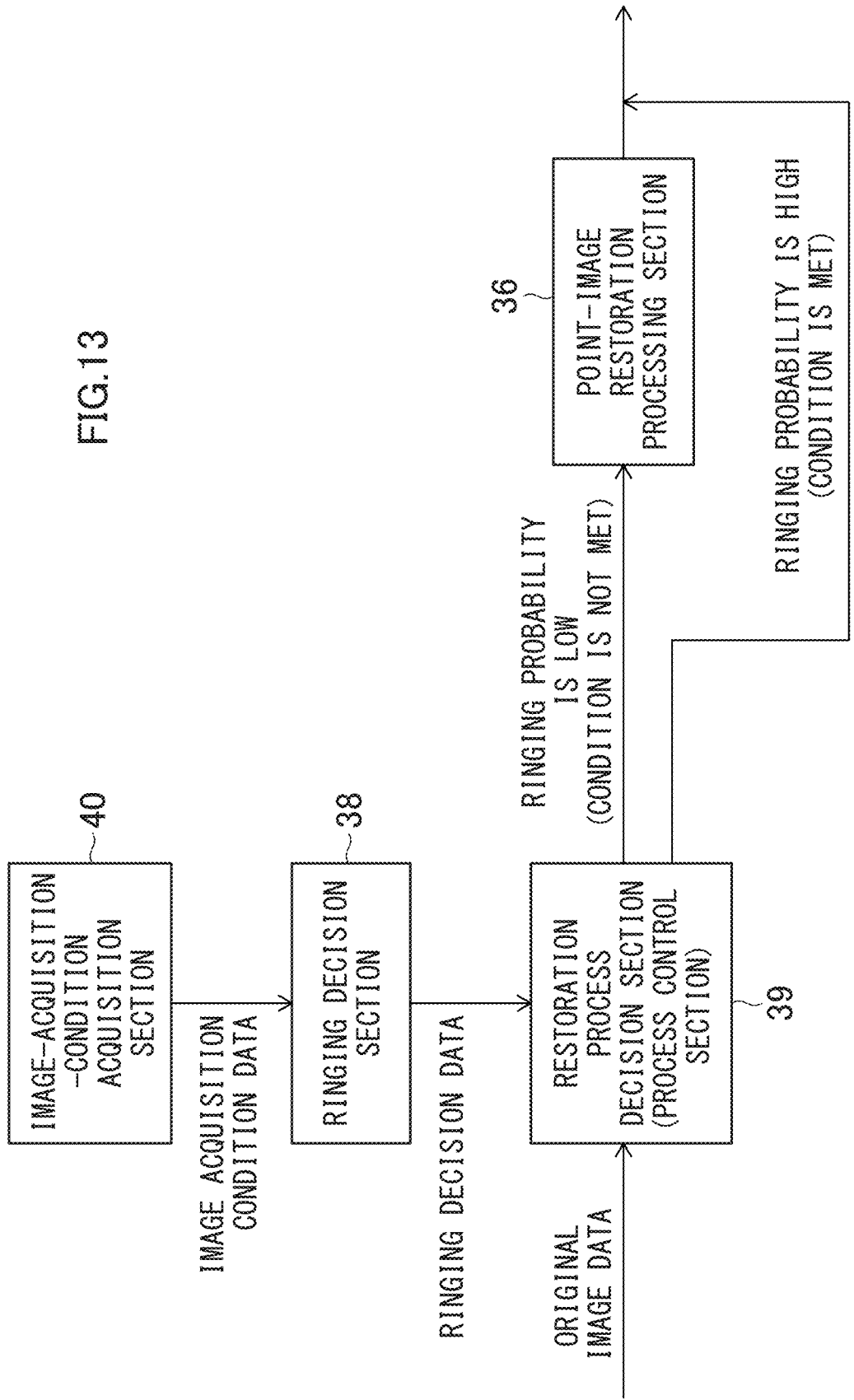
FIG. 13 is a diagram showing image-processing blocks according to a modification of the first embodiment.

FIG. 13 is a diagram showing image-processing blocks according to a modification of the first embodiment. An image-processing section 35 (see FIG. 2) in the modification includes an image-acquisition-condition acquisition section 40, instead of the image analysis section 37 in FIG. 11.

The image-acquisition-condition acquisition section 40 acquires the acquisition condition of the original image data, and sends image acquisition condition data indicating the original image data acquisition condition, to the ringing decision section 38. The ringing decision section 38 decides whether or not the image acquisition condition data meet the condition under which the ringing appears in the recovery image data due to the restoration process.

Here, similarly to the example shown in FIG. 11, whether or not to execute the point-image restoration process (the restoration process decision section 39, the point-image restoration processing section 36) is determined based on the decision result in the ringing decision section 38.

The "acquisition condition (image acquisition condition data) of the original image data" to be acquired by the image-acquisition-condition acquisition section 40 in the modification contains the information about the optical system used in the image taking for acquiring the original image data, and the "acquisition condition (image acquisition condition data) of the original image data" can contain various elements that can influence the restoration accuracy of the point-image restoration process and the side effect (the ringing or the like) of the restoration process. For example, the information about the optical system described herein contains at least any one of the lens type, diaphragm value and zoom value of the optical system used in the image taking for acquiring the original image data.

In the modification, in the case where the original image data are acquired under the "condition under which the probability that the ringing appears in the recovery image data is high" (in the case where the condition is met), it is possible to prevent the image data (recovery image data) in which the ringing appears or is conspicuous, from being sent to the subsequent stage, by skipping the point-image restoration process.

Here, the "acquisition technique for the image acquisition condition data in the image analysis section 37" and the "decision technique for the ringing in the ringing decision section 38" are not particularly limited.

For example, the "condition under which the appearance probability of the ringing in the recovery image data is high" may be defined in advance to be held by the ringing decision section 38, and then, the appearance probability of the ringing may be decided depending on whether or not the image acquisition condition data meet the held condition. Further, the appearance probability of the ringing can vary depending on the optical system (the lens and the like) to be actually used, and therefore, the "condition under which the appearance probability of the ringing is high" may be defined for each type (the lens model number and the like) of the optical system. Further, in the case where the image acquisition condition data are added to the original image data (for example, Exif and the like), the image-acquisition-condition acquisition section 40 may acquire the image acquisition condition data together with the original image data. Further, in the case where the image acquisition condition data of the original image data that is the process target are stored in a memory or the like, the image-acquisition-condition acquisition section 40 may access the memory to acquire the image acquisition condition data.

Figure 14:
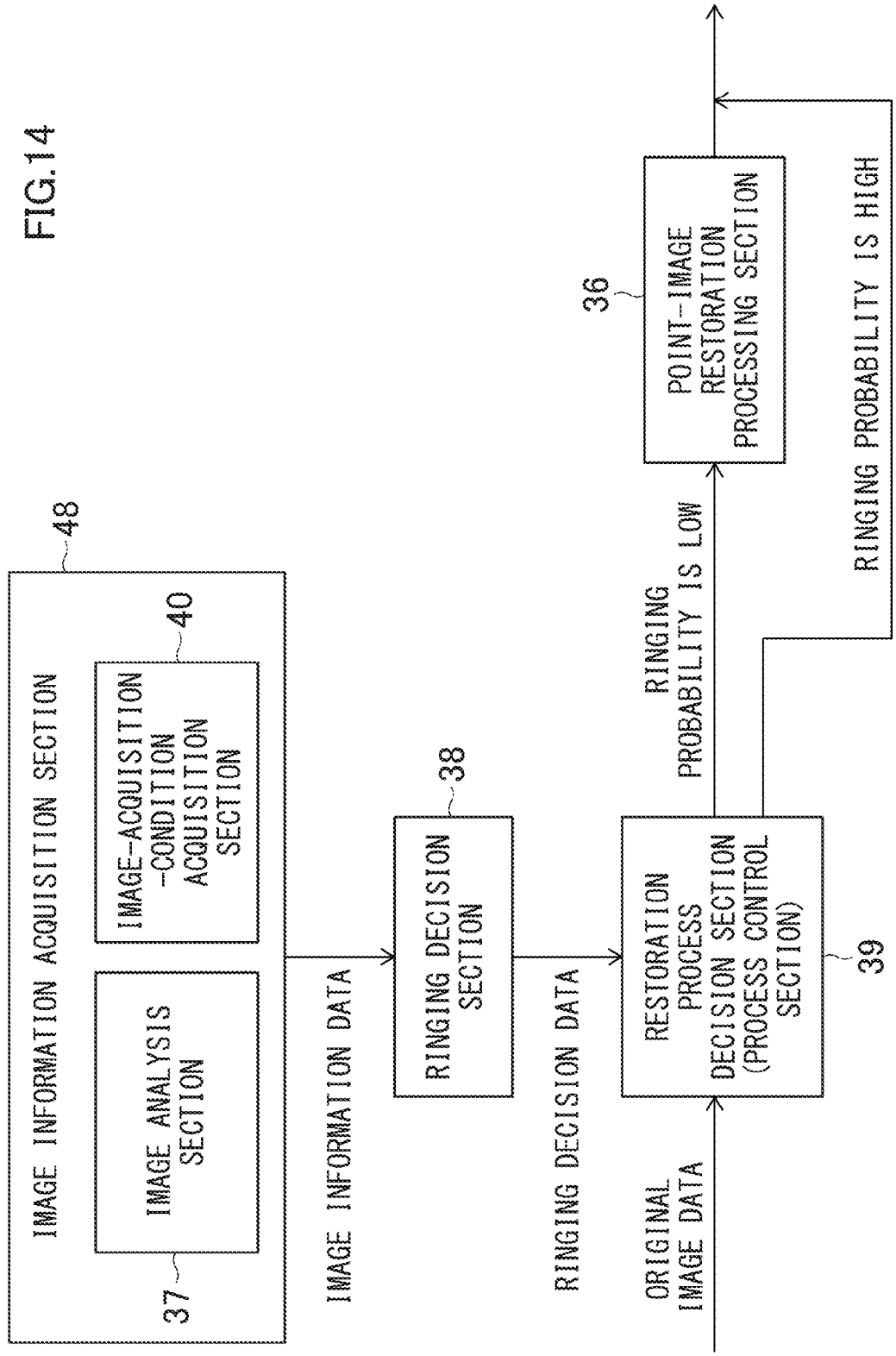
FIG. 14 is a diagram showing image-processing blocks according to another modification of the first embodiment.

FIG. 14 is a diagram showing image-processing blocks according to another modification of the first embodiment. An image-processing section 35 (see FIG. 2) in the modification includes an image information acquisition section 48 including the image analysis section 37 in FIG. 11 and the image-acquisition-condition acquisition section 40 in FIG. 13.

The image information acquisition section 48 including the image analysis section 37 and the image-acquisition-condition acquisition section 40 acquires the image information containing at least any one of the above-described image analysis data and image acquisition condition data. The image information is sent, as image information data, from the image information acquisition section 48 to the ringing decision section 38. Based on the image information data, the ringing decision section 38 decides whether or not the image information meets the condition under which the ringing appears in the recovery image data due to the restoration process. Here, the restoration process decision section 39 and point-image restoration processing section 36 in this modification are the same as the above-described embodiment (see FIG. 11 and FIG. 12) and modification (see FIG. 13).

In the modification, it is possible to accurately estimate the appearance probability of the ringing, from the comprehensive decision based on the image analysis data and the image acquisition condition data. Further, even when the image information acquisition section 48 cannot acquire any one of the image analysis data and the image acquisition condition data, it is possible to estimate the appearance probability of the ringing, based on data that can be acquired.

As described above, according to the above-described embodiment and modifications, it is possible to perform the point-image restoration process for only an image that requires the point-image restoration. That is, the point-image restoration process is performed for an image (image data) in which the image quality improvement by the application of the point-image restoration process can be expected. On the other hand, the point-image restoration process is not performed for an image that is predicted to be high in the likelihood that the image quality degradation such as the ringing becomes conspicuous due to the point-image restoration process. By performing the point-image restoration process corresponding to the property (characteristic) of the object image in this way, it is possible to avoid the image data containing the ringing or the like, from being sent to the subsequent stage, and to prevent the taken image (image data) in which the image quality is degraded, from being provided to a user.

Second Embodiment

In the embodiment, for the same configuration and action as the above-described first embodiment, the descriptions are omitted.

In the embodiment, the image process is controlled in units of the "pixel", depending on whether or not the "image information relevant to the image (original image data) that is the target of the point-image restoration process" meets the "condition under which the ringing appears in the recovery image data due to point-image restoration process"

That is, although the first embodiment shows the example in which the point-image restoration process is controlled in units of the "image" on an original image data basis, the point-image restoration process, in the embodiment, is controlled in units of the "pixel" on a pixel data basis.

Figure 15:
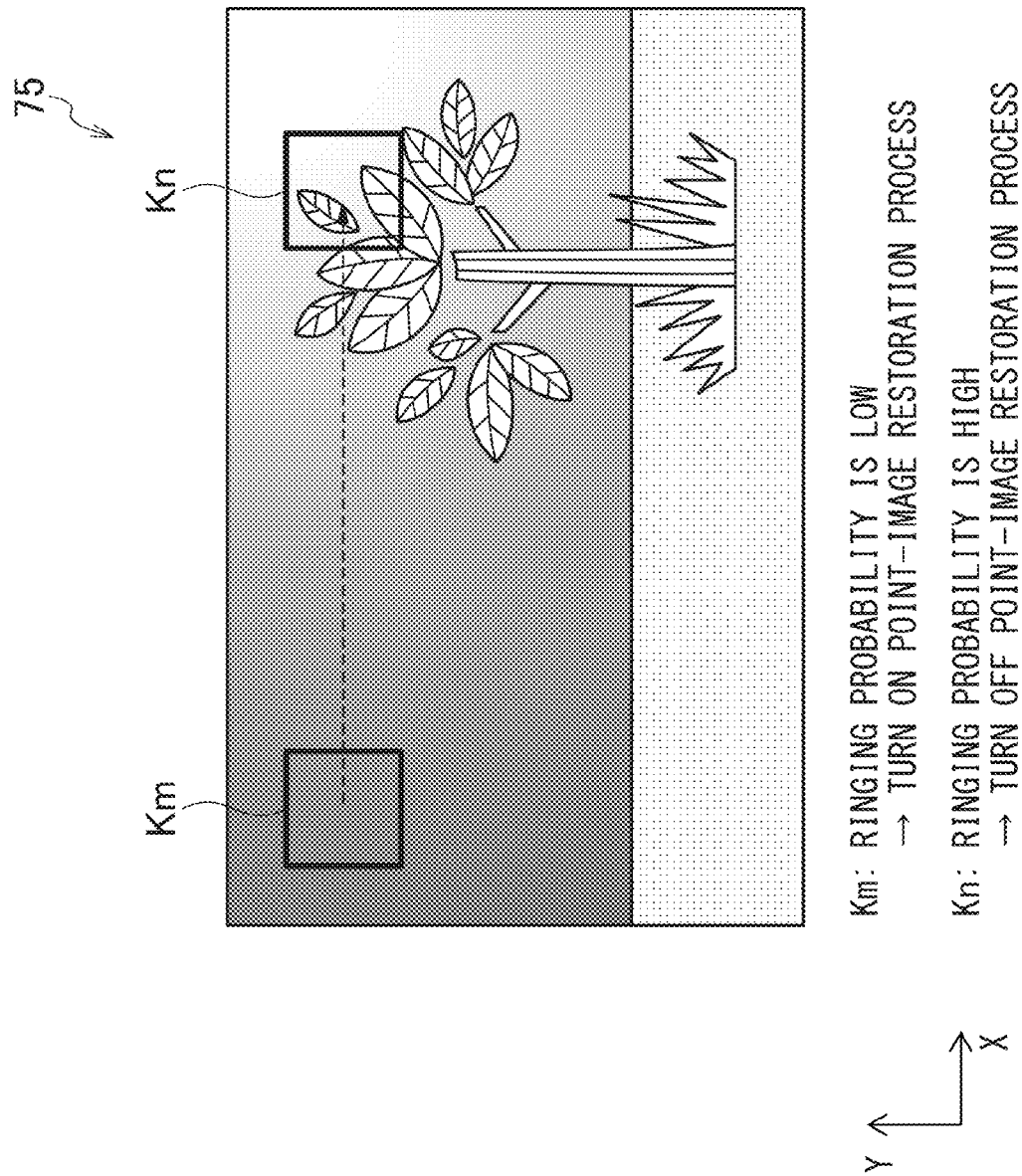
FIG. 15 is a diagram showing an exemplary image (original image data) for explaining an example in which whether or not to perform the point-image restoration process is decided on a pixel data basis, and shows an example in which the decision is performed based on image analysis data (image information) of a pixel of interest and the peripheral pixels in a kernel (Km, Kn).

FIG. 15 is a diagram showing an exemplary image (original image data) for explaining an example in which whether or not to perform the point-image restoration process is decided on a pixel data basis, and shows an example in which the decision is performed based on the image analysis data (image information) of a pixel of interest and the peripheral pixels in a kernel (Km, Kn).

An image-processing section 35 (see FIG. 2) in the example includes the same image-processing blocks as the image-processing blocks shown in FIG. 11, and the image analysis section 37 analyzes the original image data, and acquires the image analysis data (image information) indicating whether or not the original image data contain saturated pixel data or pixel data having a pixel value greater than a threshold value.

The ringing decision section 38, which decides the appearance probability of the ringing based on the image analysis data sent from the image analysis section 37, performs the decision in units of the pixel data of the original image data. Based on image analysis data (image information) relevant to a pixel of interest of the original image data and peripheral pixels of the pixel of interest, the ringing decision section 38 decides whether or not the probability that the ringing appears due to the point-image restoration process for the pixel of interest is high, in units of the pixel data composing the original image data.

In the example, the ringing decision section 38 decides whether or not the pixel data of at least some of a pixel of interest arranged at the center and peripheral pixels arranged at the periphery within a kernel having a predetermined size (for example, a kernel of about 9 pixels (X-direction)×9 pixels (Y-direction) (see "Km" and "Kn" in FIG. 15)) are the pixel data (saturated pixel data) in which the pixel value is saturated or the pixel data having a pixel value greater than a threshold value.

Here, preferably, the size of kernel, which is not particularly limited, should be determined based on the size of the restoration filter (the restoration filter in the real space) to be used in the point-image restoration process (see the "N taps" and "M taps" of the "real space filter" in FIG. 4), and preferably, the kernel size should be set to a size that is equal to or less than the size of the real space filter to be used in the point-image restoration process.

In the case of deciding that the pixel data in the kernel contain "the saturated pixel data or the pixel data having a pixel value greater than a threshold value" (see "Kn" in FIG. 12), the ringing decision section 38 decides that the appearance probability of the ringing due to the point-image restoration process for the pixel of interest is high. On the other hand, in the case of deciding that the pixel data in the kernel do not contain "the saturated pixel data or the pixel data having a pixel value greater than a threshold value" (see "Km" in FIG. 12), the ringing decision section 38 decides that the appearance probability of the ringing due to the point-image restoration process for the pixel of interest is not high (is low).

The "decision result of the appearance probability of the ringing" to be obtained in units of the pixel data of the original image data in this way is sent, as the ringing decision data, from the ringing decision section 38 to the restoration process decision section 39.

The restoration process decision section (process control section) 39 controls the point-image restoration process, in units of the pixel data composing the original image data. That is, based on the ringing decision data, the restoration process decision section 39 cooperates with the point-image restoration processing section 36, and executes or does not execute the point-image restoration process on a pixel data basis, while changing the pixel of interest within the original image data. That is, the restoration process decision section 39 controls the point-image restoration processing section 36 such that the point-image restoration process is performed for the "pixel data decided as being not high (being low) in the appearance probability of the ringing" while the point-image restoration process is not performed for the "pixel data decided as being high in the appearance probability of the ringing".

Figure 16:
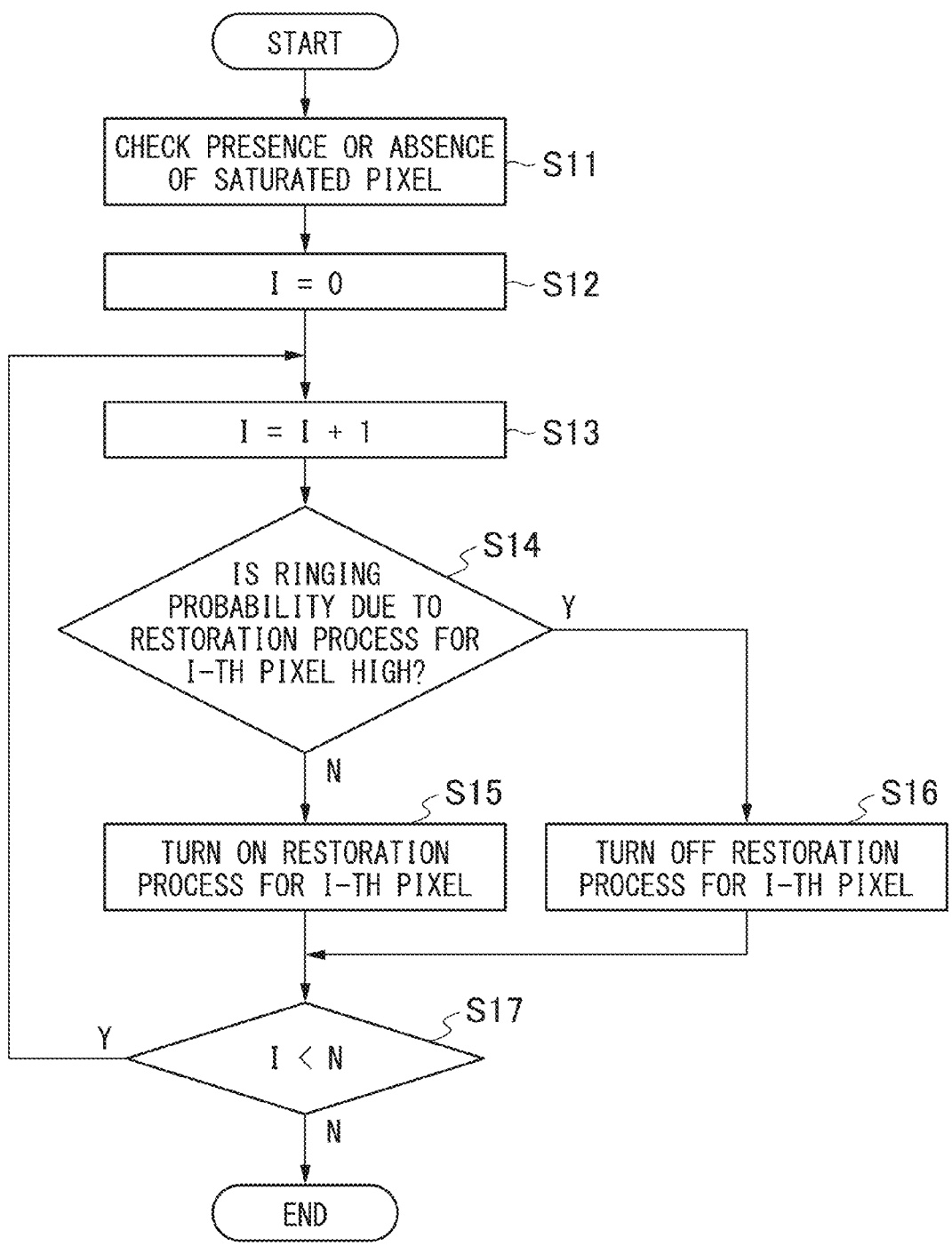
FIG. 16 is a diagram showing an example of a point-image restoration process flow according to a second embodiment.

FIG. 16 is a diagram showing an example of a point-image restoration process flow according to the second embodiment. Here, FIG. 16 shows an example in which whether or not to execute the point-image restoration process (the appearance probability of the ringing) is decided based on the presence or absence of the saturated pixel data.

First, the original image data are analyzed, and the image analysis section 37 acquires the image analysis data (image information) indicating whether or not the original image data contain the saturated pixel data (S11 in FIG. 16). The image analysis data are sent to the ringing decision section 38. Then, the ringing decision section 38 decides "whether or not the probability that the ringing appears in the recovery image data due to the point-image restoration process is high", in units of the pixel data composing the original image data, and sends the ringing decision data to the restoration process decision section 39.

Then, the restoration process decision section 39 determines whether or not to execute the point-image restoration process, in units of the pixel data of the original image data. That is, first, for resetting the target pixel, "I=0" is set (S12), and thereafter, for sequentially changing the target pixel, "I=I+1" is set (S13).

Then, the restoration process decision section 39 decides whether or not the appearance probability of the ringing due to the point-image restoration process for an I-th pixel (pixel of interest) is high, based on the ringing decision data (S14). In the case of deciding that the appearance probability of the ringing is not high (is low) (N in S14), the restoration process decision section 39 determines that the point-image restoration process for the I-th pixel is performed (S15). On the other hand, in the case of deciding that the appearance probability of the ringing is high (Y in S14), the restoration process decision section 39 determines that the point-image restoration process for the I-th pixel is not performed (S16).

Then, the restoration process decision section 39 decides whether or not the pixel of interest (the I-th pixel) is the final pixel (the N-th pixel) composing the original image data. That is, whether or not the target pixel (pixel of interest) reaches the final pixel of the original image data is decided depending on whether or not "I<N" is satisfied (S17). In the case where "I<N" is satisfied (Y in S17), the target pixel (pixel of interest) does not reach the final pixel. Therefore, the process is returned to the above-described step S13, the target pixel (pixel of interest) is changed to the next pixel by "I=I+1", and the above-described steps S14 to S17 are repeated.

On the other hand, in the case where "I<N" is not satisfied (N in S17), the target pixel (pixel of interest) has reached the final pixel, and in this state, whether or not to execute the point-image restoration process has been determined for all the pixels composing the original image data. Therefore, based on the determination result, the point-image restoration processing section 36 executes or does not execute the point-image restoration process, in units of the pixel data of the original image data.

As described above, according to the embodiment, the point-image restoration process is performed for the pixel (pixel data) in which the image quality improvement by the application of the point-image restoration process can be expected, and the point-image restoration process is not performed for the pixel (pixel data) in which the side effect such as the ringing is likely to be conspicuous. Thus, whether or not to execute the point-image restoration process is switched in units of the pixel, and it is possible to perform the point-image restoration process for only the pixel (pixel data) in which the image quality improvement by the point-image restoration process can be expected, allowing for the image quality improvement in units of the pixel.

Here, in the embodiment, the "pixel for which the point-image restoration process is performed" and the "pixel for which the point-image restoration process is not performed" are mixedly present in a single recovery image (recovery image data). The inventors confirmed by experiments that the restoration reproducibility between both pixels is sufficiently balanced for the visual sensation of a user and the image has a good image quality as a whole, even when the "pixel for which the point-image restoration process is performed" and the "pixel for which the point-image restoration process is not performed" are mixedly present in the recovery image.

The example in which whether or not to execute the point-image restoration process is decided based on the "image analysis data" has been described above. Similarly to the above-described first embodiment, in the embodiment, whether or not to execute the point-image restoration process may be decided on a pixel data basis, based on the "image acquisition condition data" (FIG. 13), or whether or not to execute the point-image restoration process may be decided on a pixel data basis, based on the "image information containing at least any one of the image analysis data and the image acquisition condition data" (FIG. 14). Further, the example in which whether or not to execute the point-image restoration process is decided on a "pixel data" basis has been described above. However, the original image data (object image) may be segmented into multiple division regions, and whether or not to execute the point-image restoration process may be decided on a "division region" basis.

Third Embodiment

In the embodiment, for the same configuration and action as the above-described embodiments, the descriptions are omitted.

In the embodiment, the restoration filter to be used in the point-image restoration process is switched/selected based on at least any one of the image analysis data and the image acquisition condition data.

In the following, an example in which the restoration filter is switched in units of the image (original image data), based on the information (image analysis data) about whether or not the original image data contain the saturated pixel.

Figure 17:
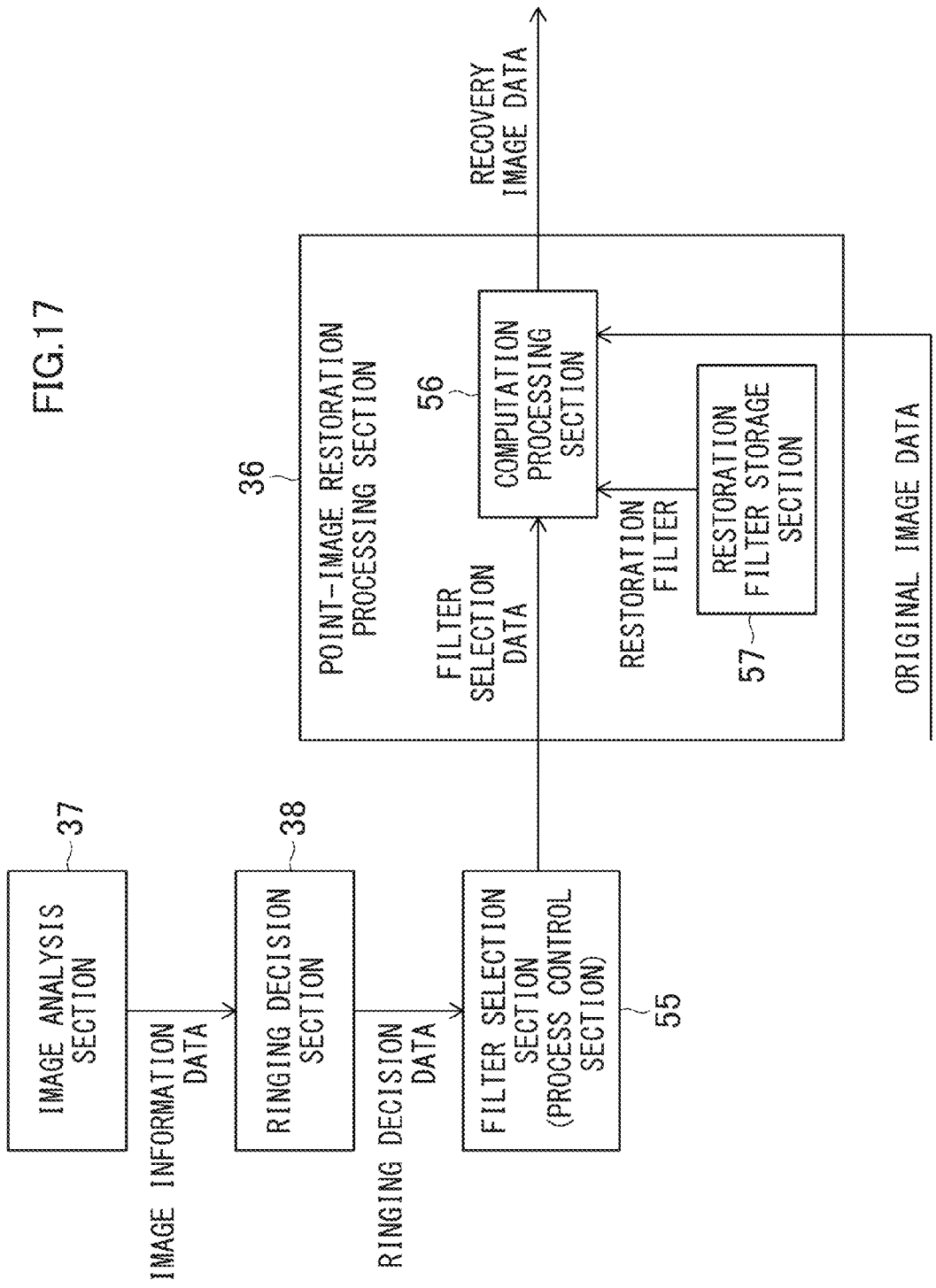
FIG. 17 is a diagram showing an example of image-processing blocks according to a third embodiment.

FIG. 17 is a diagram showing an example of image-processing blocks according to a third embodiment.

An image-processing section 35 (see FIG. 2) according to the embodiment includes an image analysis section 37, a ringing decision section 38, a filter selection section (process control section) 55 and a point-image restoration processing section 36.

The image analysis section 37 and the ringing decision section 38 are the same as the above-described embodiments. That is, the image analysis section 37 analyzes the original image data to acquire the image analysis data, and the ringing decision section 38 decides the appearance probability of the ringing. Here, in the example, the image analysis section 37 analyzes whether or not the original image data contain the saturated pixel, and the ringing decision section 38 decides the appearance probability of the ringing in units of the image on an original image data basis.

The filter selection section 55 determines a restoration filter to be used in the point-image restoration process by the point-image restoration processing section 36, based on the decision result (ringing decision data) by the ringing decision section 38. That is, the filter selection section 55 selects an ordinary restoration filter, for the image (original image data) that is decided as being not high (being low) in the appearance probability of the ringing. On the other hand, the filter selection section 55 selects not the ordinary restoration filter but a restoration filter (ringing-countermeasure restoration filter) that suppresses the appearance of the ringing or does not emphasize the ringing, for the image (original image data) that is decided as being high in the appearance probability of the ringing.

Figure 18A:
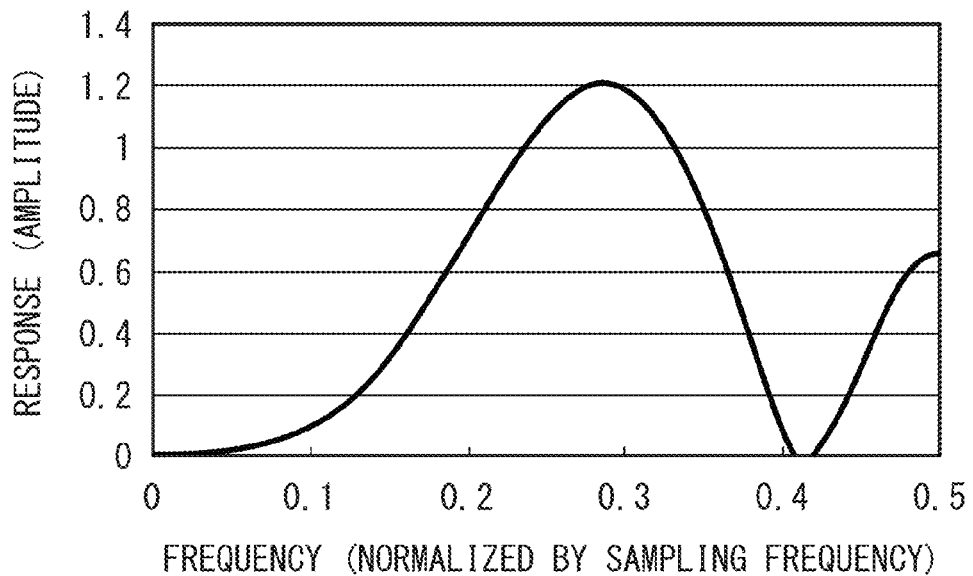
FIG. 18A is a graph exemplifying a "spatial frequency-amplitude" relation of a restoration filter, and showing an example of the property of a filter (filter A) to be used in an ordinary point-image restoration process.
Figure 18B:
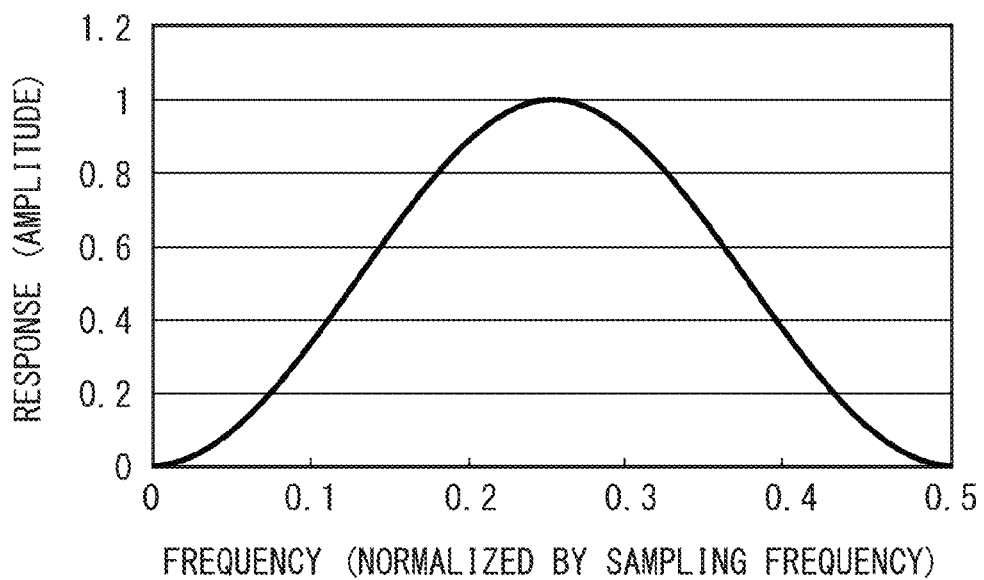
FIG. 18B is a graph exemplifying a "spatial frequency-amplitude" relation of a restoration filter, and showing an example of the property of a ringing-countermeasure restoration filter (filter B).

FIGS. 18A and 18B are graphs exemplifying "spatial frequency-amplitude" relations of the restoration filters. FIG. 18A shows an example of the property of a filter (filter A) to be used in an ordinary point-image restoration process, and FIG. 18B shows an example of the property of a ringing-countermeasure restoration filter (filter B). Here, to facilitate understanding, FIGS. 18A and 18B exemplify one-dimensional frequency properties. Further, the vertical axis for each filter shown in FIGS. 18A and 18B indicates the response (amplitude), and the horizontal axis indicates the frequency. The horizontal axis is on the basis of numerical values normalized by a sampling frequency.

The filter selection section 55 (see FIG. 17) selects an "ordinary restoration filter in which the response (amplitude) at a high-frequency area changes relatively sharply" as shown in FIG. 18A, for the image (original image data) that is decided as being not high (being low) in the appearance probability of the ringing. The filter selection section 55 selects a "restoration filter for the ringing countermeasure in which the response (amplitude) component at a frequency band with a conspicuous ringing (herein, a high-frequency side is assumed) is small and changes relatively gradually" as shown in FIG. 18B, for the image (original image data) that is decided as being high in the appearance probability of the ringing.

The filter selection section 55 holds the information about restoration filters that are stored by a restoration filter storage section 57, and selects an optimal restoration filter from the restoration filters that are stored by the restoration filter storage section 57, based on the ringing decision data. Here, the restoration filters shown in FIGS. 18A and 18B each are just an example, and the filter selection section 55 can select an arbitrary restoration filter corresponding to the purpose. For example, multiple types of correction filters to be used in the contour correction may be adopted as base filters, and a restoration filter to be configured by the linear sum of these base filters may be selected as the restoration filter for the ringing countermeasure.

The information about the restoration filter selected on an image (original image data) basis by the filter selection section 55 is sent as filter selection data, to the point-image restoration processing section 36.

The point-image restoration processing section 36 includes the restoration filter storage section 57 that holds the multiple restoration filters (filter coefficient group), and a computation processing section 56 that applies, to the original image data, the restoration filter to be read from the restoration filter storage section 57 and calculates the recovery image data. To the computation processing section 56, the original image data, and the filter selection data from the filter selection section 55 are input. The computation processing section 56 reads a restoration filter corresponding to the input filter selection data, from the restoration filter storage section 57, and applies it to the input original image data.

Figure 19:
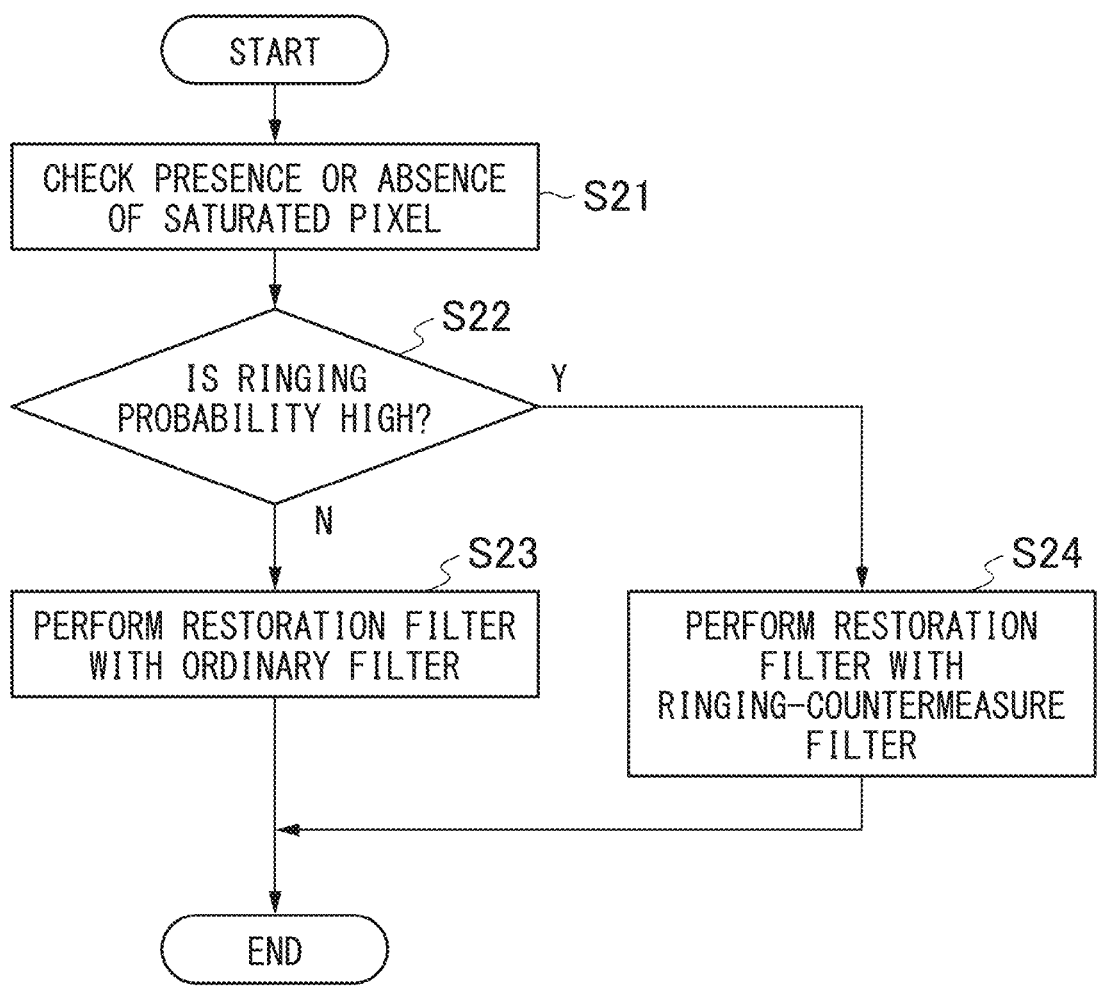
FIG. 19 is a diagram showing a point-image restoration process flow by the image-processing blocks shown in FIG. 17.

FIG. 19 is a diagram showing a point-image restoration process flow by the image-processing blocks shown in FIG. 17.

First, the image analysis section 37 analyzes the original image data, and examines whether or not the original image data contain the saturated pixel (S21 in FIG. 19). Then, the ringing decision section 38 decides that the probability that the ringing appears in the recovery image data is high, in the case where the original image data contain the saturated pixel, and decides that the probability that the ringing appears in the recovery image data is not high (is low), in the case where the original image data do not contain the saturated pixel.

Then, in the case of deciding that the probability that the ringing appears due to the point-image restoration process is not high (is low) (N in S22), the filter selection section 55 selects the ordinary restoration filter (see FIG. 18A), and the point-image restoration processing section 36 performs the point-image restoration process using the ordinary restoration filter, for the original image data (S23). On the other hand, in the case of deciding that the probability that the ringing appears due to the point-image restoration process is high (Y in S22), the filter selection section 55 selects the ringing-countermeasure restoration filter (see FIG. 18B), and the point-image restoration processing section 36 performs the point-image restoration process using the ringing-countermeasure restoration filter, for the original image data (S24).

Thus, the property of the restoration filter to be used in the point-image restoration process may be altered depending on whether or not the original image data contain the saturated pixel. For example, it is possible that the ordinary restoration filter is used if the original image data do not contain the saturated pixel and the restoration filter in which the component at a frequency band with a conspicuous ringing is reduced is used if the original image data contain the saturated pixel. Thus, by checking the presence or absence of the saturated pixel in the image (original image data) and appropriately altering the property of the restoration filter to be used in the point-image restoration process, it is possible to effectively prevent the appearance and emphasis of the ringing in the recovery image data.

Here, the example in which the restoration filter is selected on an "image (original image data)" basis, based on the "image analysis data" has been described above. However, without being limited to this, in the embodiment, similarly to the above-described first embodiment, for example, the appearance probability of the ringing may be decided based on the "image acquisition condition data" (see FIG. 13), or the appearance probability of the ringing may be decided based on the "image information containing at least any one of the image analysis data and the image acquisition condition data" (see FIG. 14). Further, similarly to the above-described second embodiment (see FIG. 15 and FIG. 16), the restoration filter may be selected in units of the "pixel (pixel data)"/ "division region" of the image (original image data), and then, the point-image restoration process may be performed.

Fourth Embodiment

In the embodiment, for the same configuration and action as the above-described embodiments, the descriptions are omitted.

In the embodiment, for which of the original image data before the gradation correction (gamma correction process) and the original image data after the gradation correction the point-image restoration process is performed is determined based on at least any one of the image analysis data and the image acquisition condition data.

In the following, an example in which the point-image restoration process is controlled in units of the image (original image data) based on the information (image analysis data) about whether or not the original image data contain the saturated pixel is described.

Figure 20:
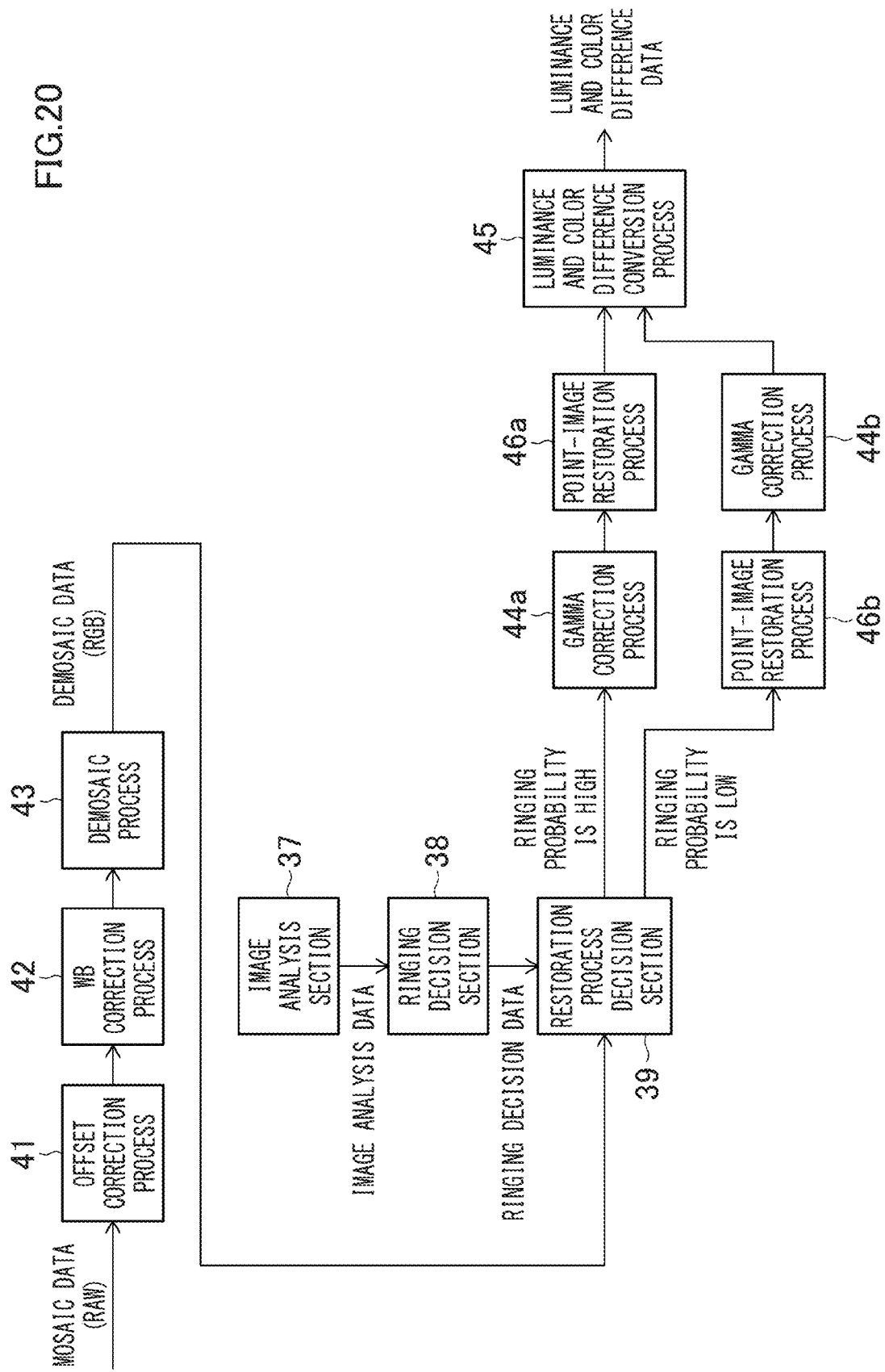
FIG. 20 is a diagram showing an example of image-processing blocks according to a fourth embodiment.

FIG. 20 is a diagram showing an example of image-processing blocks according to a fourth embodiment.

An image-processing section 35 (see FIG. 2) according to the embodiment substantially selects, based on the appearance probability of the ringing, an optimal processing system of the processing system shown in FIG. 7B, in which the point-image restoration process is performed after the gamma correction process, and the processing system shown in FIG. 7C, in which the point-image restoration process is performed before the gamma correction process.

In a processing system in the example shown in FIG. 20, an offset correction process 41, a WB correction process 42 and a demosaic process 43 are the same as the above-described FIGS. 7B and 7C, but a restoration process decision section (process control section) 39 is provided at the subsequent stage of the demosaic process 43.

The restoration process decision section 39 in the example controls the point-image restoration process and the gradation correction, based on the decision result (ringing decision data) by a ringing decision section 38, and determines for which of the original image data before the gradation correction and the original image data after the gradation correction the restoration process is performed. That is, the restoration process decision section 39 selects either one of a "processing system in which a point-image restoration process 46a is performed at the subsequent stage of a gamma correction process (gradation correction section) 44a for the gradation correction of the original image data" and a "processing system in which a point-image restoration process 46b is performed at the prior stage of a gamma correction process 44b", based on the ringing decision data from the ringing decision section 38. Here, whichever processing system is selected, the image data (RGB color data) subjected to the "gamma correction process" and the "point-image restoration process" are subjected to the conversion process into the luminance data and the color difference data, in the luminance and color difference conversion process 45 at the subsequent stage.

Figure 21:
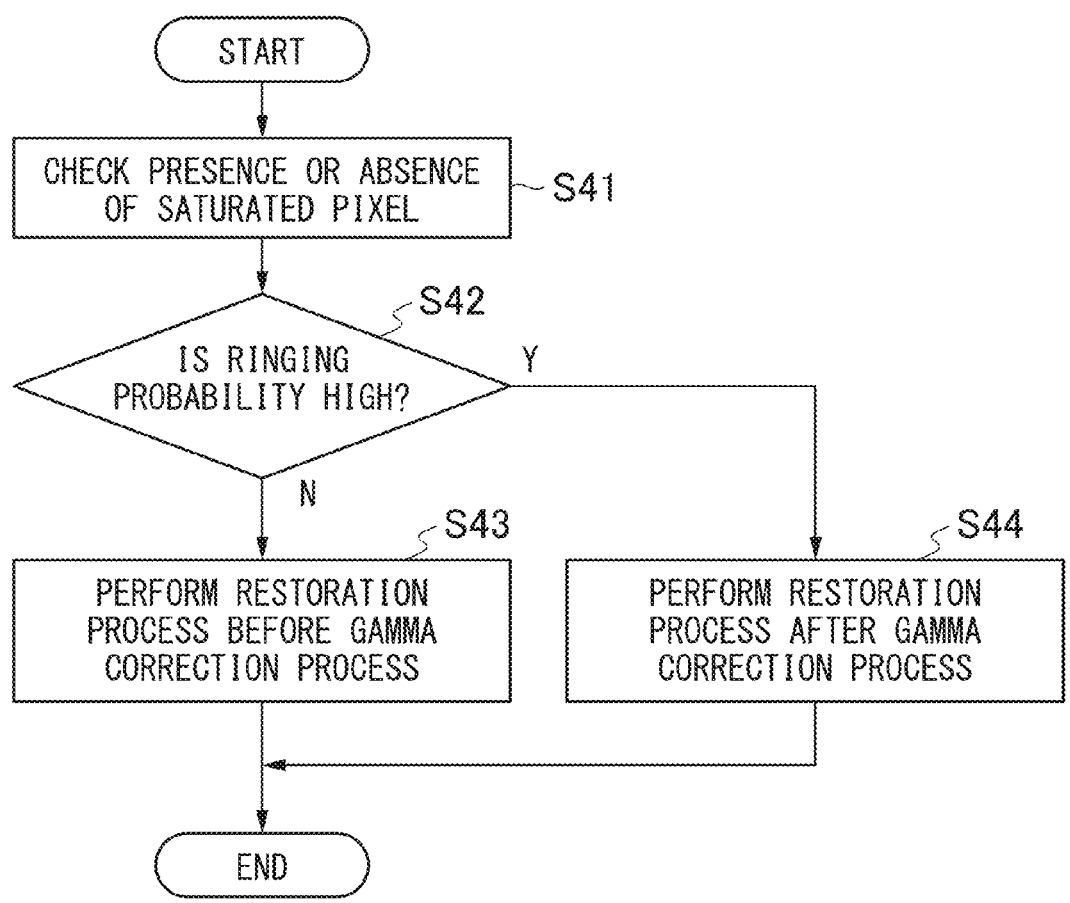
FIG. 21 is a diagram showing a point-image restoration process flow by the image-processing blocks shown in FIG. 20.

FIG. 21 is a diagram showing a point-image restoration process flow by the image-processing blocks shown in FIG. 20.

In the example, the image analysis section 37 analyzes the original image data and examines whether or not the original image data contain the saturated pixel (S41 in FIG. 21). Then, the ringing decision section 38 decides that the probability that the ringing appears in the recovery image data is high, in the case where the original image data contain the saturated pixel, and decides that the probability that the ringing appears in the recovery image data is not high (is low), in the case where the original image data do not contain the saturated pixel.

Then, in the case of deciding that the probability that the ringing appears is not high (is low) (for example, in the case where there is no saturated pixel in the original image data) (N in S42), the restoration process decision section 39 sends the RGB color data (demosaic data) to the "processing system in which the point-image restoration process 46b is performed at the prior stage of the gamma correction process 44b" (S43). On the other hand, in the case of deciding that the probability that the ringing appears due to the point-image restoration process is high (for example, in the case where there is a saturated pixel in the original image data) (Y in S42), the restoration process decision section 39 sends the RGB color data (demosaic data) to the "processing system in which the point-image restoration process 46a is performed at the subsequent stage of the gamma correction process 44a" (S44).

Under a processing environment in which there is no hardware configuration restriction, similarly to the embodiment, the image-processing section 35 may have both the processing system in which the point-image restoration process is performed before the gamma correction process and the processing system in which the point-image restoration process is performed after the gamma correction process, and may properly use both processing systems depending on the situation (depending on the appearance situation of the ringing). Thereby, the accurate correction (point-image restoration process) is actively performed for the image in which the side effect such as the ringing that can be caused by the point-image restoration process seems to be inconspicuous, and the processing system having an excellent toughness is utilized for the image in which the side effect is likely to be conspicuous. Thereby, it is possible to actualize both of the correction effect and the side effect suppression at a high level.

Here, in the above-described example, the selection between the processing systems different in the processing order of the gamma correction process and the point-image restoration process is performed based on the ringing decision data, but the selection between the processing systems may be performed depending on the restoration component by the point-image restoration process.

Figure 22:
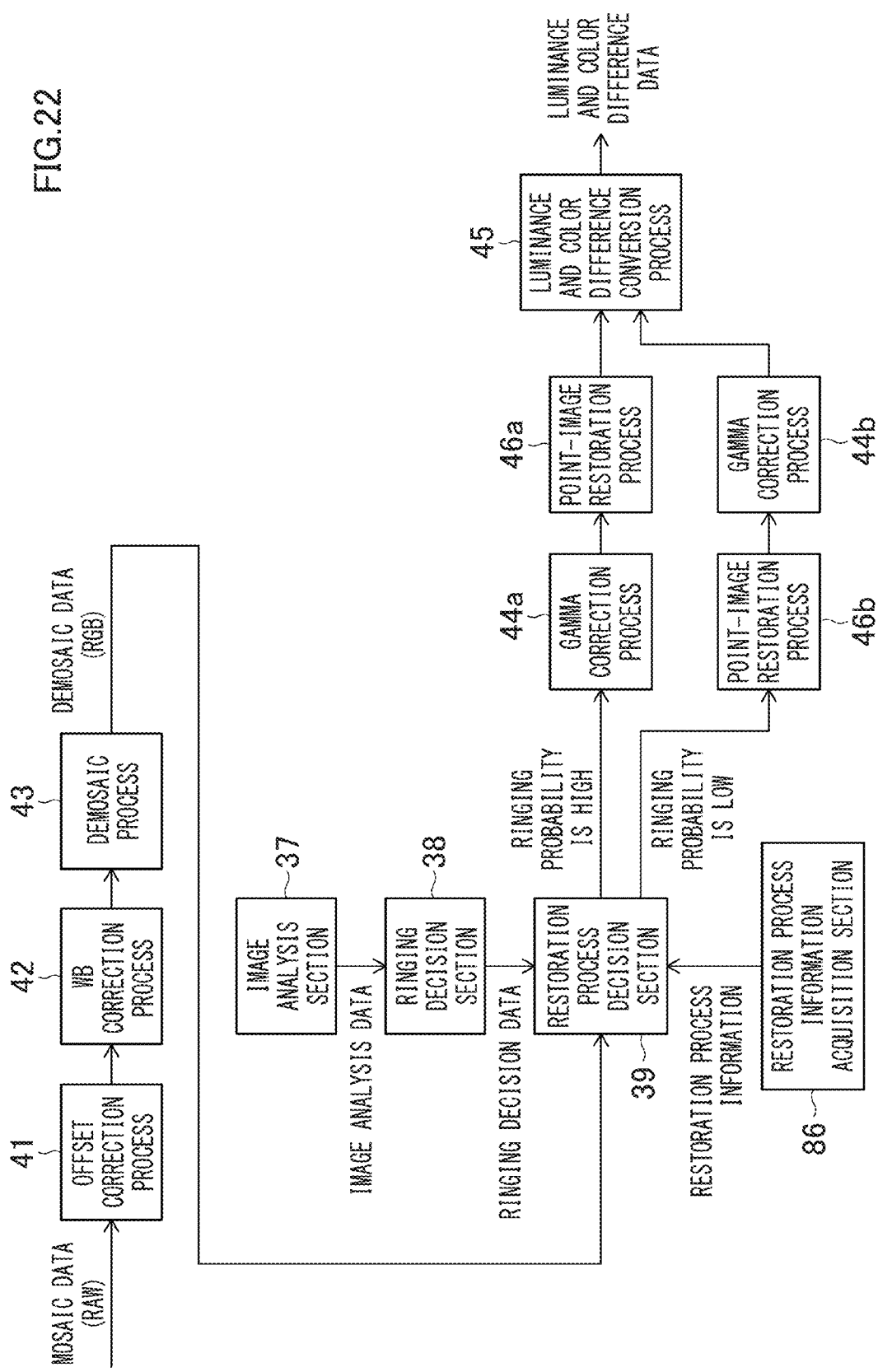
FIG. 22 is a diagram showing a modification of the image-processing blocks according to the fourth embodiment.

FIG. 22 is a diagram showing a modification of the image-processing blocks according to the fourth embodiment.

An image-processing section 35 (see FIG. 2) according to the modification includes a restoration process information acquisition section 86. The restoration process information acquisition section 86 acquires the restoration process information about whether the point-image restoration process 46a or 46b is a process of obtaining the recovery image data by restoring only the amplitude component of the original image data or a process of obtaining the recovery image data by restoring the amplitude component and phase component of the original image data.

The restoration process decision section (process control section) 39 determines for which of the original image data before the gamma correction process (gradation correction) and the original image data after the gamma correction process the restoration process is performed, based on the restoration process information acquired by the restoration process information acquisition section 86, in addition to the decision result by the ringing decision section 38. For example, in the case where the restoration process information indicates "the point-image restoration process 46a or 46b is the process of obtaining the recovery image data by restoring only the amplitude component of the original image data", the restoration process decision section 39 may control the image process such that the RGB color data (demosaic data) are sent to the "processing system in which the point-image restoration process 46a is performed at the subsequent stage of the gamma correction process 44a". Further, in the case where the restoration process information indicates "the point-image restoration process 46a or 46b is the process of obtaining the recovery image data by restoring the amplitude component and phase component of the original image data", the restoration process decision section 39 may control the image process such that the RGB color data (demosaic data) are sent to the "processing system in which the point-image restoration process 46b is performed at the prior stage of the gamma correction process 44b".

Generally, in the case of the "point-image restoration process that does not involve the restoration of the phase component", the ringing is likely to appear in the recovery image data, and in the case of the "point-image restoration process that involves the restoration of the phase component", the ringing can be reduced in the recovery image data. Therefore, as shown in the embodiment, in the case of performing the "point-image restoration process 46a or 46b of obtaining the recovery image data by restoring only the amplitude component of the original image data", that is, the "point-image restoration process that does not involve the restoration of the phase component", the point-image restoration process is performed "after the gamma correction process". Thereby, it is possible to effectively prevent the adverse effect of "the ringing having appeared due to the point-image restoration process is emphasized by the gamma correction process".

Here, the example in which the order of the gamma correction process and the point-image restoration process is controlled on an image (original image data) basis, based on the "image analysis data" has been described above. However, without being limited to this, in the embodiment, similarly to the above-described first embodiment, for example, the order of the gamma correction process and the point-image restoration process may be controlled based on the "image acquisition condition data" (see FIG. 13), or the order of the gamma correction process and the point-image restoration process may be controlled based on the "image information containing at least any one of the image analysis data and the image acquisition condition data" (see FIG. 14). Further, in the above-described example, the "gamma correction process" and the "point-image restoration process" are performed for the RGB color data. However, the embodiment and the modification can be applied to an image-processing system in which the "gamma correction process" and the "point-image restoration process" are performed for the luminance data (Y).

Fifth Embodiment

In the embodiment, for the same configuration and action as the above-described embodiments, the descriptions are omitted.

In the embodiment, for which of the color data (RGB data) and the luminance data (Y) the point-image restoration process is performed is determined based on at least any one of the image analysis data and the image acquisition condition data.

In the following, an example in which the point-image restoration process is controlled in units of the image (original image data) based on the information (image analysis data) about whether or not the original image data contain the saturated pixel is described.

Figure 23:
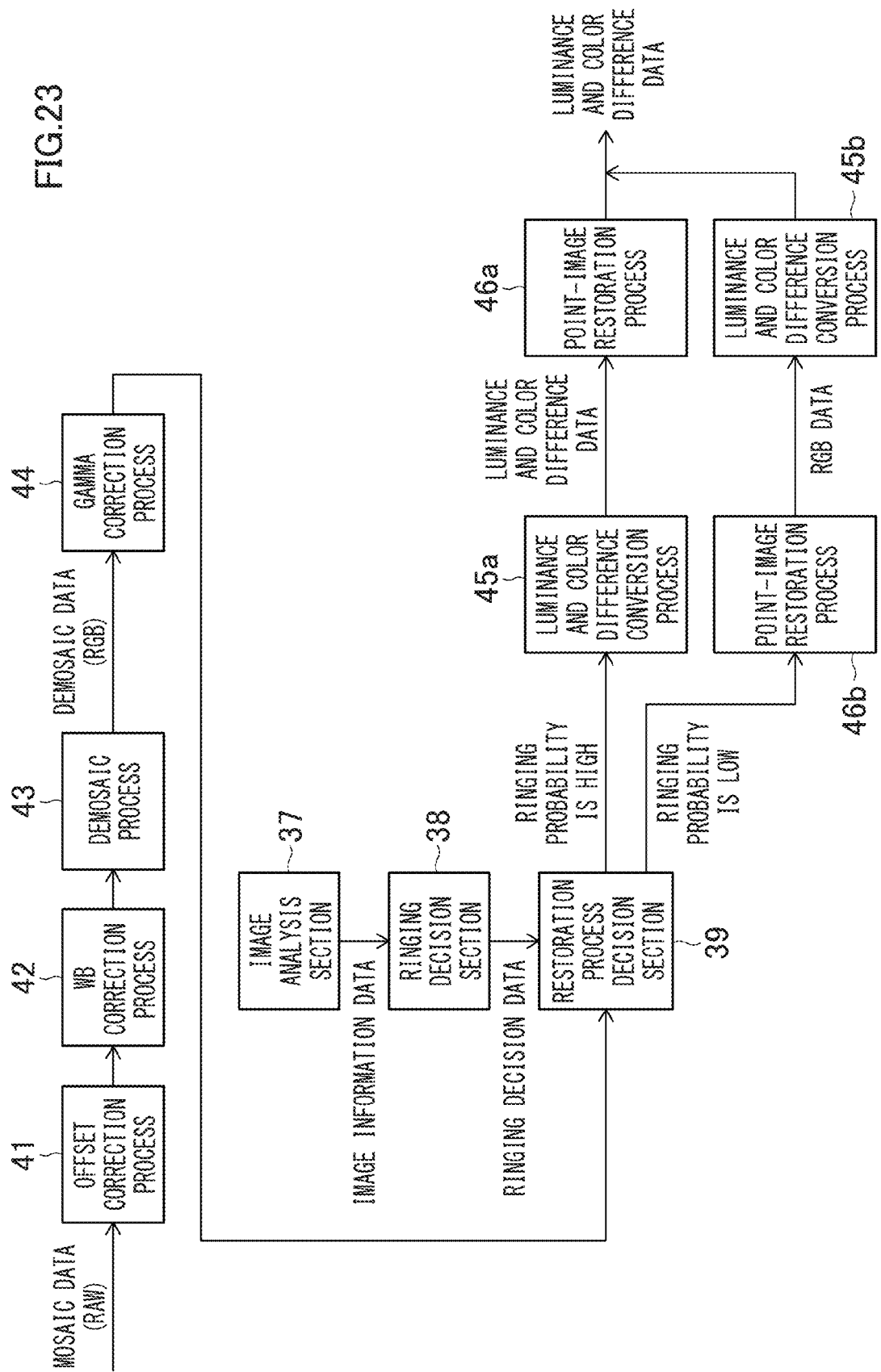
FIG. 23 is a diagram showing an example of image-processing blocks according to a fifth embodiment.

FIG. 23 is a diagram showing an example of image-processing blocks according to a fifth embodiment.

An image-processing section 35 (see FIG. 2) according to the embodiment substantially selects, based on the appearance probability of the ringing, an optimal processing system of the processing system shown in FIG. 7A, in which the point-image restoration process is performed after the gamma correction process, and the processing system shown in FIG. 7B, in which the point-image restoration process is performed after the gamma correction process.

In a processing system in the example shown in FIG. 23, an offset correction process 41, a WB correction process 42, a demosaic process 43 and a gamma correction process 44 are the same as the above-described FIG. 7A and FIG. 7B, but a restoration process decision section (process control section) 39 is provided at the subsequent stage of the gamma correction process 44.

The restoration process decision section 39 in the example determines for which of the luminance data and color data of the original image data the restoration process is performed, based on the decision result (ringing decision data) by a ringing decision section 38. Then, in point-image restoration processes 46a, 46b, the point-image restoration process is performed for data that are of the luminance data and color data of the original image data and that are determined by the restoration process decision section 39. That is, based on the ringing decision data from the ringing decision section 38, the restoration process decision section 39 selects either one of a "processing system in which the point-image restoration process 46a is performed at the subsequent stage of a luminance and color difference conversion process 45a" and a "processing system in which a luminance and color difference conversion process 45b is performed at the subsequent stage of the point-image restoration process 46b".

In the case of selecting the "processing system in which the point-image restoration process 46a is performed at the subsequent stage of the luminance and color difference conversion process 45a", the original image data as the target of the point-image restoration process contain the luminance data (Y), and the point-image restoration processing section 36 performs the point-image restoration process 46a for the luminance data of the original image data. On the other hand, in the case of selecting the "processing system in which the luminance and color difference conversion process 45b is performed at the subsequent stage of the point-image restoration process 46b", the original image data as the target of the point-image restoration process contain the color data (RGB data), and the point-image restoration processing section 36 performs the point-image restoration process 46b for the color data of the original image data.

Here, whichever processing system is selected, the point-image restoration process 46a or 46b is performed for the image data after the gamma correction process (gradation correction process), because the offset correction process 41, the WB correction process 42, the demosaic process 43 and the gamma correction process 44 are performed before the point-image restoration process and the luminance and color difference conversion process.

Figure 24:
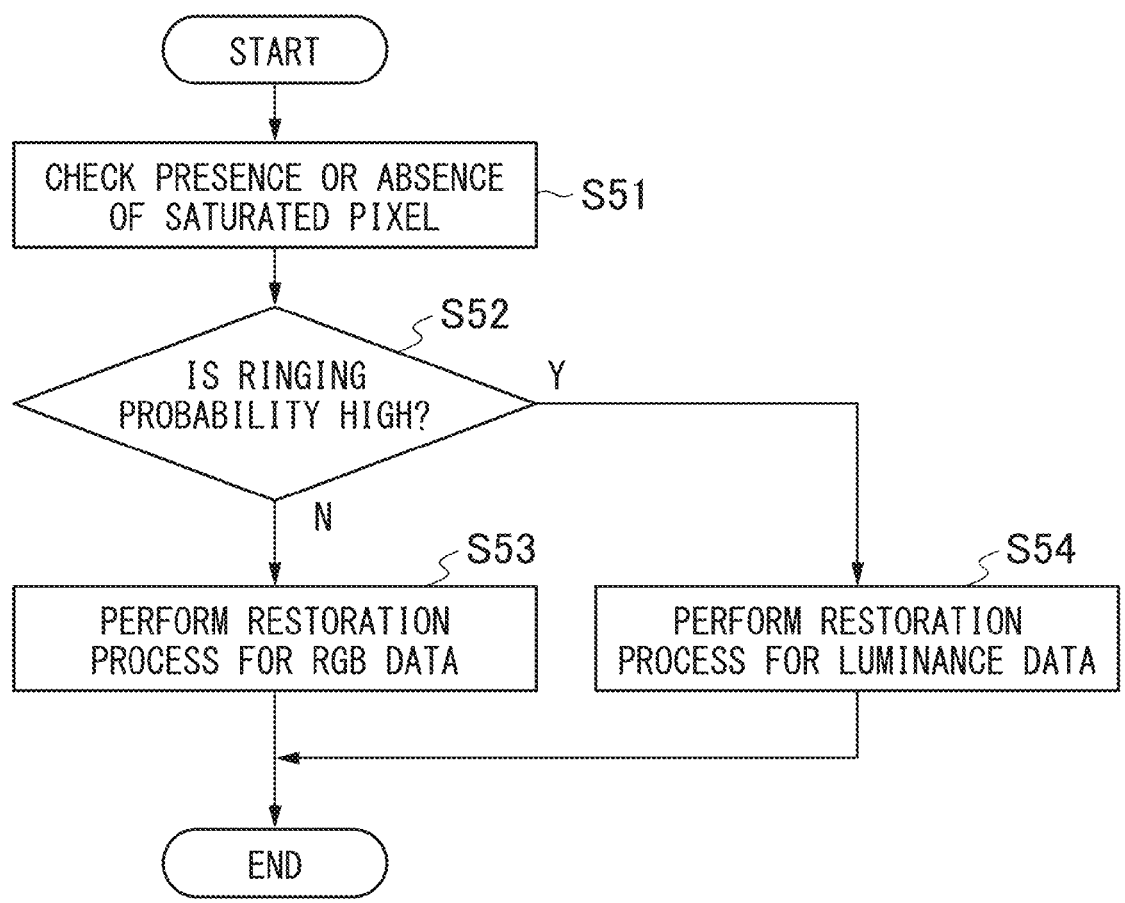
FIG. 24 is a diagram showing a point-image restoration process flow by the image-processing blocks shown in FIG. 23.

FIG. 24 is a diagram showing a point-image restoration process flow by the image-processing blocks shown in FIG. 23.

In the example, the image analysis section 37 analyzes the original image data, and examines whether or not the original image data contain the saturated pixel (S51 in FIG. 24). Then, the ringing decision section 38 decides "the probability that the ringing appears in the recovery image data is high", in the case where the original image data contain the saturated pixel, and decides "the probability that the ringing appears in the recovery image data is not high (is low)", in the case where the original image data do not contain the saturated pixel.

Then, in the case of deciding that the probability that the ringing appears due to the point-image restoration process is not high (is low) (for example, in the case where there is no saturated pixel in the original image data) (N in S52), the restoration process decision section 39 sends the RGB color data (demosaic data) to the "processing system in which the luminance and color difference conversion process 45b is performed at the subsequent stage of the point-image restoration process 46b", so that the point-image restoration process is performed for the color data (RGB data) of the original image data (S53). On the other hand, in the case of deciding that the probability that the ringing appears due to the point-image restoration process is high (for example, in the case where there is saturated pixel in the original image data) (Y in S52), the restoration process decision section 39 sends the RGB color data (demosaic data) to the "processing system in which the point-image restoration process 46a is performed at the subsequent stage of the luminance and color difference conversion process 45a", so that the point-image restoration process is performed for the luminance data (Y) of the original image data (S54).

Here, the example in which the order of the luminance and color difference conversion process and the point-image restoration process is controlled on an image (original image data) basis, based on the "image analysis data" has been described above. However, without being limited to this, in the embodiment, similarly to the above-described first embodiment, for example, the order of the luminance and color difference conversion process and the point-image restoration process may be controlled based on the "image acquisition condition data" (see FIG. 13), or the order of the luminance and color difference conversion process and the point-image restoration process may be controlled based on the "image information containing at least any one of the image analysis data and the image acquisition condition data" (see FIG. 14).

<Other Modifications>

The above-described digital camera 10 is just an example, and the present invention can be applied also to other configurations. Each functional configuration can be appropriately actualized by arbitrary hardware, software or the combination of the both. Therefore, the present invention can be applied also to, for example, a program that makes a computer execute the image-processing methods (image-processing procedures) in the above-described respective devices and processing sections (the camera body controller 28, the device control section 34, the image-processing section 35, the point-image restoration processing section 36, and the like), a computer-readable recording medium in which such a program is recorded, or a computer in which such a program can be installed.

<Application Example to EDoF System>

Although the restoration processes in the above-described embodiments are image processes of restoring a primary object image by recovering and modifying a point spread (point-image blur) depending on particular conditions (for example, the diaphragm value, the F-value, the focal distance, the lens type, and the like), the image restoration process to which the present invention can be applied is not limited to the restoration processes in the above-described embodiments. For example, the restoration process according to the present invention can be applied also to a restoration process for image data taken and acquired by an optical system (an image-taking lens and the like) having an extended depth of field (focus) (EDoF). The restoration process is performed for the image data of a blur image taken and acquired by the EDoF optical system in a state in which the depth of field (focal depth) is extended, and thereby, it is possible to restore and generate high-resolution image data in which a wide range is in focus. In this case, a restoration process using a restoration filter that is based on the point spread function (the PSF, the OTF, the MTF, the PTF or the like) for the EDoF optical system and that has a filter coefficient set such that a good image restoration can be performed in a range of the extended depth of field (focal depth) is performed.

In the following, an example of a system (EDoF system) relevant to the restoration of the image data taken and acquired through the EDoF optical system is described. Here, in the example shown in the following, an example in which the restoration process is performed for the luminance signal (Y data) obtained from the image data (RGB data) after the demosaic process is described. However, the timing of the restoration process is not particularly limited, and for example, the restoration process may be performed for the "image data (mosaic image data) before the demosaic process" or the "image data (demosaic image data) after the demosaic process and before the luminance signal conversion process".

Figure 25:
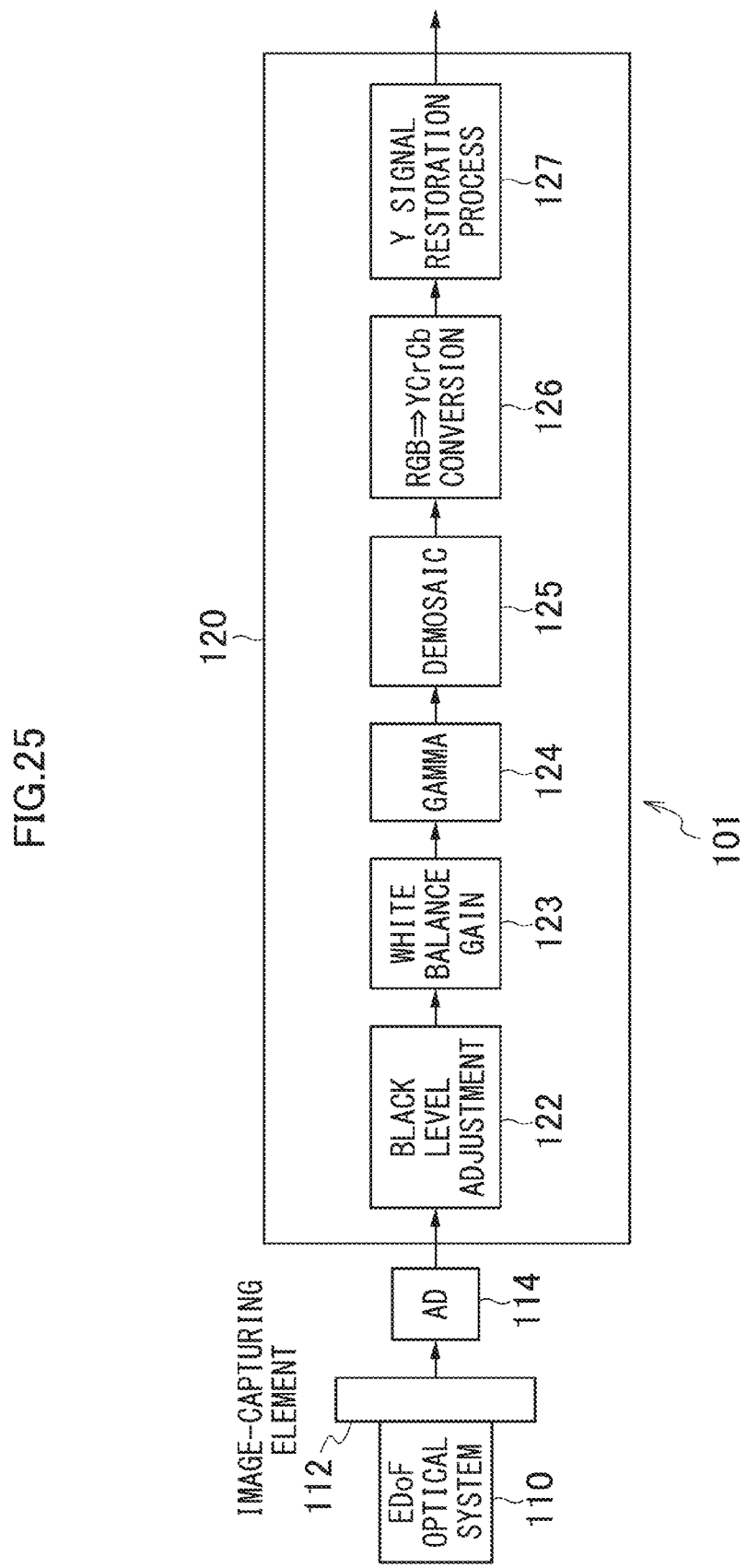
FIG. 25 is a block diagram showing a form of an image-capturing module including an EDoF optical system.

FIG. 25 is a block diagram showing a form of an image-capturing module 101 including an EDoF optical system. The image-capturing module (a digital camera or the like) 101 in the example includes an EDoF optical system (lens unit; optical system) 110, an image-capturing element 112, an AD conversion section 114 and a restoration processing block (image-processing section) 120.

Figure 26:
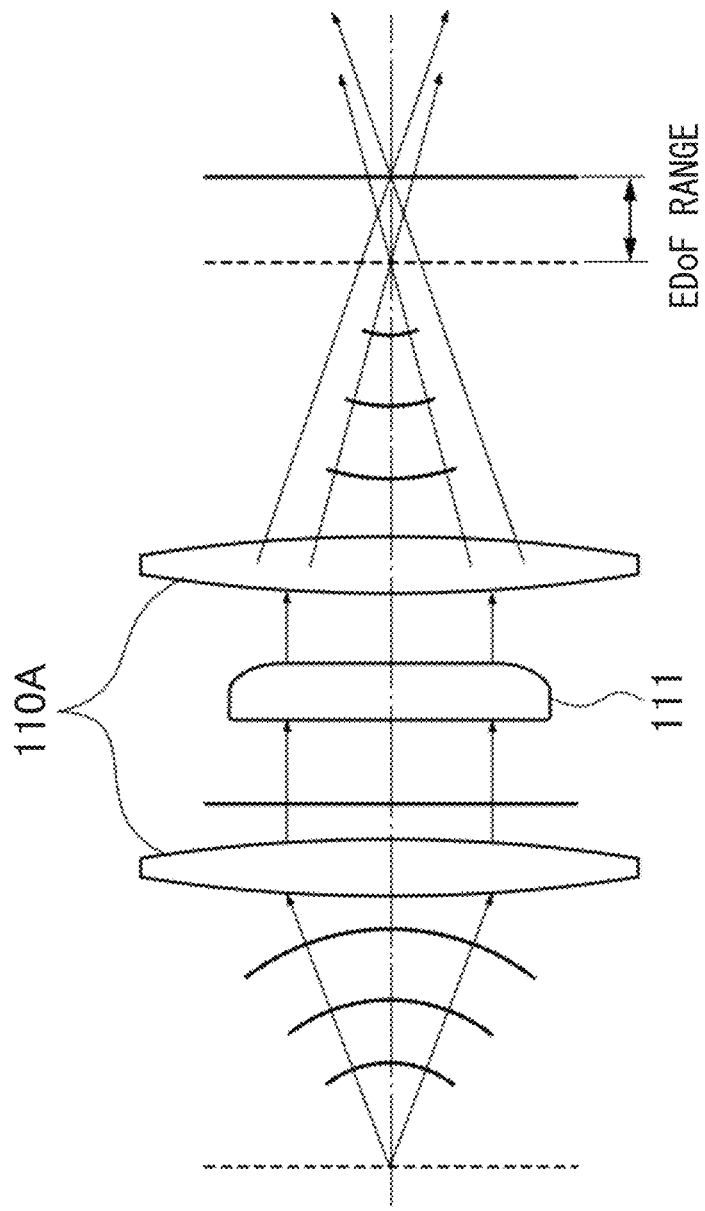
FIG. 26 is a diagram showing an example of the EDoF optical system.

FIG. 26 is a diagram showing an example of the EDoF optical system 110. The EDoF optical system 110 in the example includes a fixed single-focus image-taking lens 110A and an optical filter 111 arranged at a pupil position. The optical filter 111, which modulates the phase, makes a state in which the EDoF optical system 110 (the image-taking lens 110A) has an EDoF, so that the extended depth of field (focal depth) (EDoF) is obtained. Thus, the image-taking lens 110A and the optical filter 111 constitute a lens section that modulates the phase to extend the depth of field.

Here, the EDoF optical system 110 includes other constituent elements as necessary, and for example, a diaphragm (the illustration is omitted) is disposed at the vicinity of the optical filter 111. Further, the optical filter 111 may be a single filter, or may be a combination of multiple filters. Further, the optical filter 111 is just an example of optical phase modulation means, and the state in which the EDoF optical system 110 (the image-taking lens 110A) has an EDoF may be actualized by alternative means. For example, instead of providing the optical filter 111, the state in which the EDoF optical system 110 has an EDoF may be actualized by an image-taking lens 110A in which the lens is designed so as to have a function equivalent to the optical filter 111 in the example.

That is, the state in which the EDoF optical system 110 has an EDoF can be actualized by a variety of means for changing the wave-front of the image formation on the light receiving surface of the image-capturing element 112. For example, an "optical element whose thickness is changeable", an "optical element whose refractive index is changeable (a refractive-index distribution type wave-front modulation lens, or the like)", an "optical element whose thickness or refractive index is changeable by the coding on the lens surface, or the like (a wave-front modulation hybrid lens, an optical system to be formed on the lens surface as a phase plane, or the like)", and a "liquid crystal element capable of modulating the phase distribution of light (a liquid-crystal space-phase modulation element or the like)" can be employed as means for making the state in which the EDoF optical system 110 has an EDoF. Thus, the present invention can be applied to not only the case where a regularly dispersed image can be formed by a light wave-front modulation element (the optical filter 111 (phase plate)), but also the case where the same dispersed image as the case of using the light wave-front modulation element can be formed by the image-taking lens 110A itself without using the light wave-front modulation element.

Since a focus adjustment mechanism to mechanically perform a focus adjustment can be omitted, the EDoF optical system 110 shown in FIG. 26 allows for a downsizing, and can be suitably mounted in a camera-equipped mobile phone or a personal digital assistant.

An optical image after passing through the EDoF optical system 110 having an EDoF is formed on the image-capturing element 112 shown in FIG. 25, and here, is converted into an electrical signal.

The image-capturing element 112 is configured by multiple pixels that are arranged in a matrix having a pattern array (the Bayer array, the stripe-patterned G and completely checker-patterned R/B, the X-Trans array, the honeycomb array, or the like), and each pixel is configured to include a micro-lens, a color filter (in the example, an RGB color filter) and a photodiode. The optical image having entered the light receiving surface of the image-capturing element 112 through the EDoF optical system 110 is converted into a signal charge having a quantity corresponding to the incident light quantity, by each photodiode arrayed on the light receiving surface. Then, the R, G or B signal charge accumulated in each photodiode is sequentially output as a voltage signal (image signal) for each pixel.

The AD conversion section 114 converts the R, G or B image signal that is analog and that is output from the image-capturing element 112 for each pixel, into an RGB image signal that is digital. The digital image signal, which is a signal after the AD conversion section 114 performs the conversion into the image signal that is digital, is given to the restoration processing block 120.

The restoration processing block 120 includes, for example, a black level adjustment section 122, a white balance gain section 123, a gamma processing section 124, a demosaic processing section 125, an RGB/YCrCb conversion section 126 and a Y signal restoration processing section 127.

The black level adjustment section 122 performs a black level adjustment for the digital image signal output from the AD conversion section 114. As the black level adjustment, a known method can be employed. For example, in the case of focusing attention on an effective photoelectric conversion element, the average of dark current amount acquisition signals respectively corresponding to multiple OB photoelectric conversion elements contained in a photoelectric conversion element line containing the effective photoelectric conversion element is determined, and the average is subtracted from the dark current amount acquisition signal corresponding to the effective photoelectric conversion element. Thus, the black level adjustment is performed.

The white balance gain section 123 performs a gain adjustment corresponding to the white balance gain of each color signal of RGB contained in the digital image signal in which the black level data have been adjusted.

The gamma processing section 124 performs a gamma correction such as a half tone of the gradation correction such that the R, G or B image signal after the white balance adjustment has an intended gamma property.

The demosaic processing section 125 performs a demosaic process for the R, G or B image signal after the gamma correction. Specifically, the demosaic processing section 125 performs a color interpolation process for the R, G or B image signal, and thereby, generates a set of image signals (an R signal, a G signal and a B signal) to be output from each light receiving pixel of the image-capturing element 112. That is, before the color demosaic process, the pixel signal from each light receiving pixel is either of the R, G and B image signals, but after the color demosaic process, a set of three pixel signals of the R, G and B signals corresponding to each light receiving pixel is output.

The RGB/YCrCb conversion section 126 converts the R, G and B signals for each pixel after the demosaic process, into a luminance signal Y and color difference signals Cr, Cb, and the luminance signal Y and the color difference signals Cr, Cb for each pixel are output.

The Y signal restoration processing section 127 performs a restoration process for the luminance signal Y from the RGB/YCrCb conversion section 126, based on a restoration filter stored in advance. The restoration filter has, for example, a deconvolution kernel having a kernel size of 7×7 (corresponding to a tap number of M=7, N=7), and a computation coefficient (restoration gain data, corresponding to the filter coefficient) corresponding to the deconvolution kernel, and is used in a deconvolution process (deconvolution computation process) by the phase modulation amount of the optical filter 111. Here, the restoration filter corresponds to the optical filter 111, and is stored in a memory not shown in the figure (for example, a memory that is incidentally provided in the Y signal restoration processing section 127). Further, the kernel size of the deconvolution kernel is not limited to 7×7.

Figure 27:
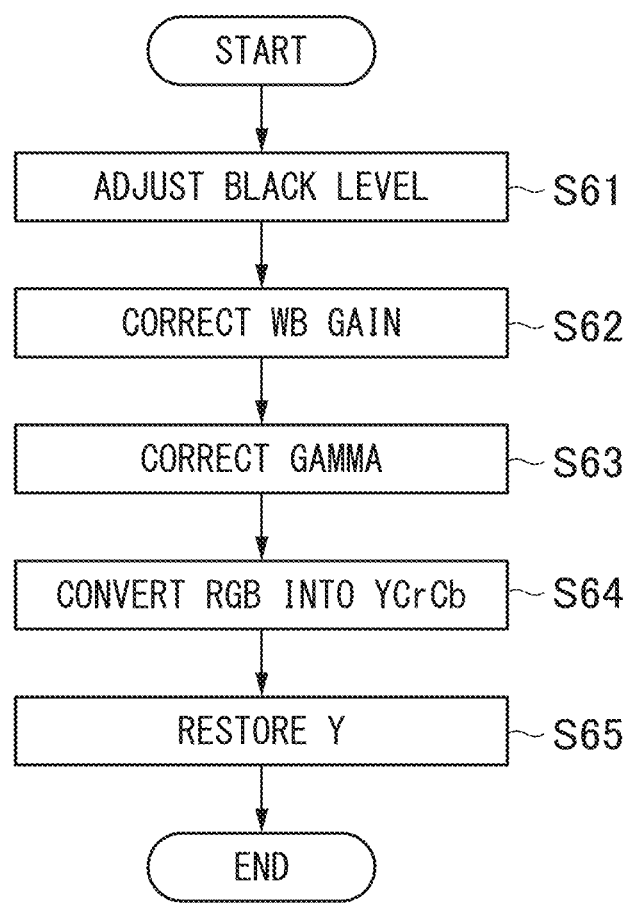
FIG. 27 is a diagram showing an example of a restoration process flow by the restoration process block shown in FIG. 25.

Next, the restoration process by the restoration processing block 120 is described. FIG. 27 is a diagram showing an example of a restoration process flow by the restoration processing block 120 shown in FIG. 25.

To one input of the black level adjustment section 122, the digital image signal is given from the AD conversion section 114, and to another input, the black level data are given. The black level adjustment section 122 subtracts the black level data from the digital image signal, and outputs the digital image signal after the subtraction of the black level data, to the white balance gain section 123 (S61). Thereby, the black level component is removed from the digital image signal, and the digital image signal indicating the black level becomes 0.

For the image data after the black level adjustment, the processes by the white balance gain section 123 and the gamma processing section 124 are sequentially performed (S62 and S63).

The R, G and B signals after the gamma process are converted into the luminance signal Y and chroma signals Cr, Cb in the RGB/YCrCb conversion section 126 (S64), after the demosaic process in the demosaic processing section 125.

The Y signal restoration processing section 127 performs a restoration process of applying, to the luminance signal Y, the deconvolution process by the phase modulation amount of the optical filter 111 of the EDoF optical system 110 (S65). That is, the Y signal restoration processing section 127 performs the deconvolution process (deconvolution computation process) between a luminance signal corresponding to a predetermined unit pixel group around an arbitrary process-target pixel (herein, a luminance signal for 7×7 pixels) and a restoration filter (a deconvolution kernel of 7×7 and the computation coefficient) that is stored in advance in the memory or the like. The Y signal restoration processing section 127 performs the restoration process of removing the image blurs of the whole image by repeating the deconvolution process for each of the predetermined unit pixel groups so as to cover the whole region of the image-capturing surface. The restoration filter is determined depending on the center position of the pixel group for which the deconvolution process is performed. That is, a common restoration filter is applied to adjacent pixel groups. For further simplifying the restoration process, it is preferable to apply a common restoration filter to all the pixel groups.

Figure 28:
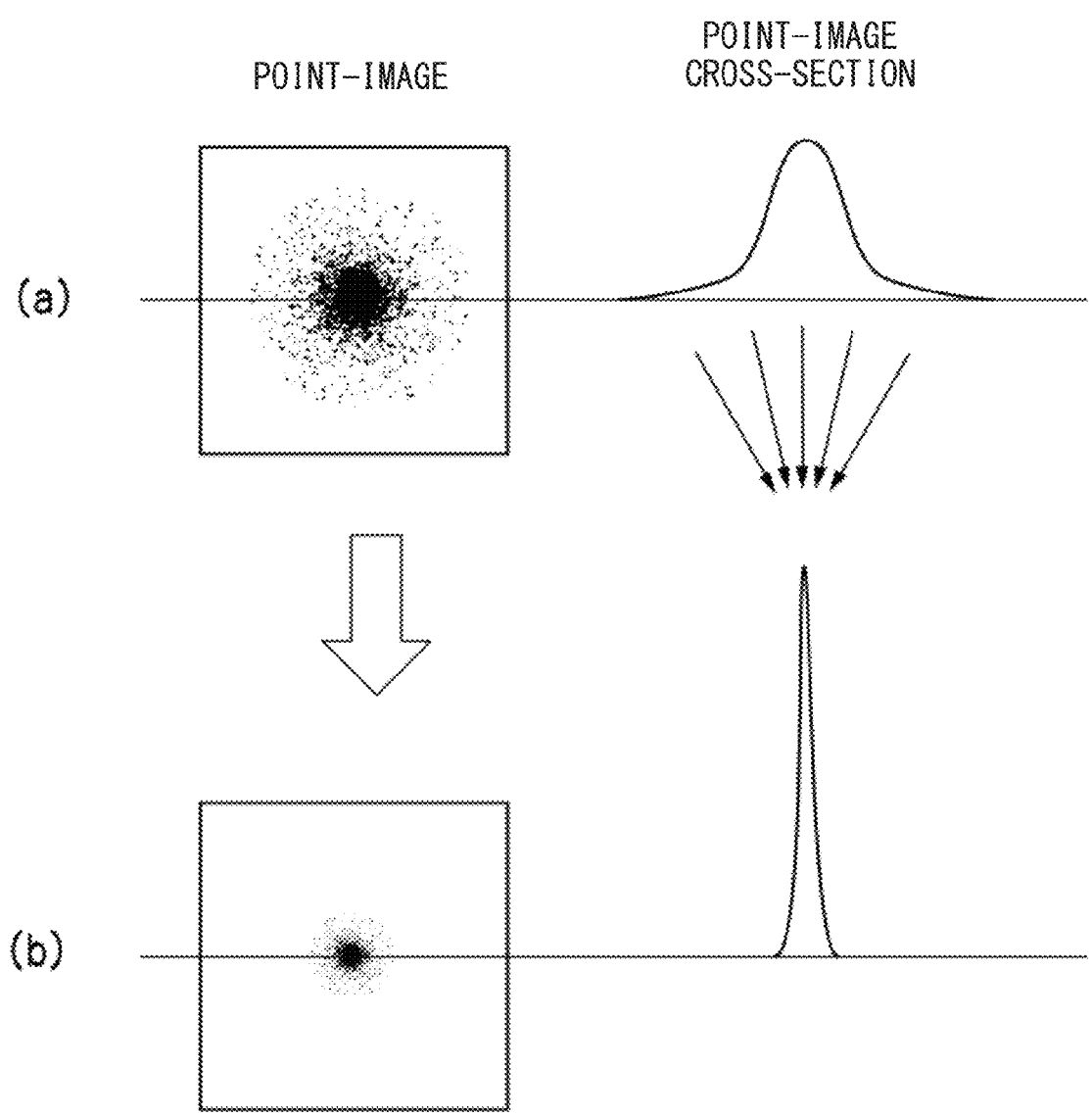
FIG. 28 is a diagram showing a restoration example for an image acquired through the EDoF optical system, in which (a) part shows a blurred image before the restoration process and (b) part shows a blur-cancelled image (point image) after the restoration process.

As shown in (a) part of FIG. 28, the point-image (optical image) of the luminance signal after passing through the EDoF optical system 110 is formed on the image-capturing element 112, as a large point-image (a blurred image). However, as shown in (b) part of FIG. 28, it is restored to a small point-image (a high-resolution image), by the deconvolution process in the Y signal restoration processing section 127.

As described above, by applying the restoration process to the luminance signal after the demosaic process, it is unnecessary to have the parameter of the restoration process for each of RGB, resulting in the speeding up of the restoration process. Instead of performing the deconvolution process by arranging, as one unit, each of the R, G and B image signals corresponding to R, G and B pixels that are positioned at intervals, the deconvolution process is performed by arranging the luminance signals of adjacent pixels as the predetermined unit and applying a common restoration filter to the unit. Therefore, the accuracy of the restoration process is improved. Here, as for the color difference signals Cr, Cb, even when the resolution is not increased by the restoration process, the image quality is allowable because of the property of the visual sensation of human eyes. Further, in the case where the image is recorded in a compression format such as JPEG, the color difference signal is compressed at a higher compressibility than the luminance signal. Therefore, it is less necessary to increase the resolution by the restoration process. Thus, it is possible to achieve both the improvement of the restoration accuracy and the simplification and speeding up of the process.

The point-image restoration processes according to the respective embodiments of the present invention can be applied also to the restoration process in the EDoF system described above, and particularly, the second to the fifth embodiments and the modifications thereof are suitable for the EDoF system.

Here, in each embodiment described above, an aspect in which the point-image restoration processing section 36 is provided in the camera body 14 (the camera body controller 28) of the digital camera 10 has been described. However, the point-image restoration processing section 36 may be provided in another device such as the computer 60 and the server 80.

For example, when the image data are processed in the computer 60, the point-image restoration process of the image data may be performed by the point-image restoration processing section provided in the computer 60. Further, in the case where the server 80 includes the point-image restoration processing section, the image data may be sent, for example, form the digital camera 10 or the computer 60 to the server 80, the point-image restoration process may be performed for the image data in the point-image restoration processing section of the server 80, and then, the image data (recovery image data) after the point-image restoration process may be sent and provided to the source.

Further, aspects to which the present invention can be applied are not limited to the digital camera 10, the computer 60 and the server 80, and besides cameras in which the image capturing is the main function, the application is possible to mobile apparatuses having another function (a telephone call function, a communication function and other computer functions) other than the image capturing, in addition to the image-capturing function. As another aspect to which the present invention can be applied, there are a mobile phone having a camera function, a smart phone, a PDA (Personal Digital Assistants) and a portable game machine, for example. In the following, an example of the smart phone to which the present invention can be applied is described.

<Configuration of Smart Phone>

Figure 29:
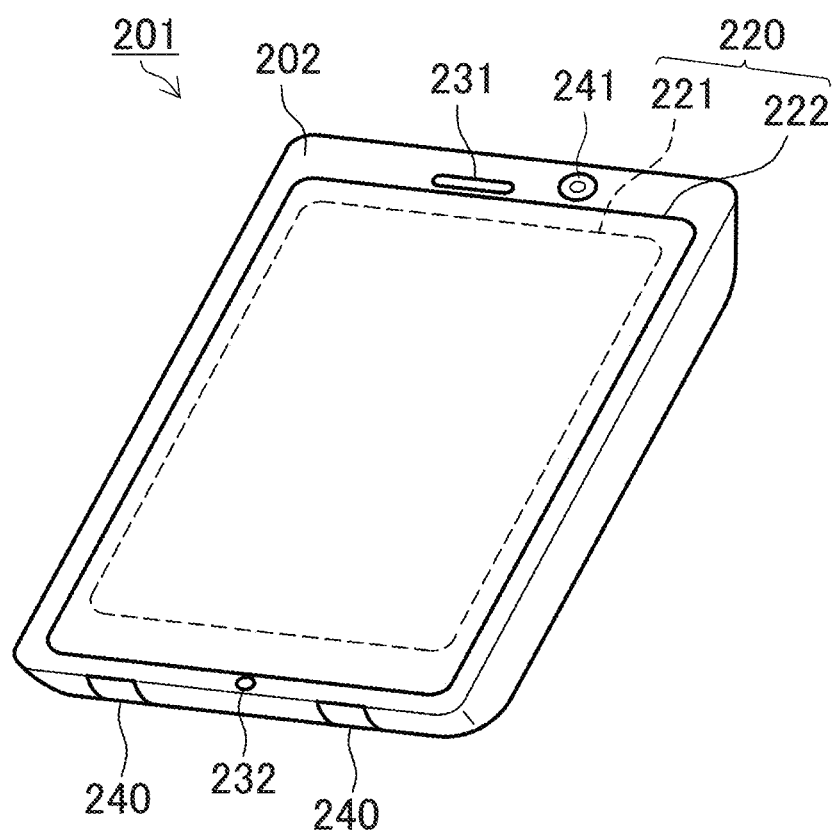
FIG. 29 is an external view of a smart phone.

FIG. 29 shows an external view of a smart phone 201 that is an embodiment of the image-taking device according to the present invention. The smart phone 201 shown in FIG. 29 has a case 202 in a flat plate shape, and includes, on one surface of the case 202, a display/input section 220 in which a display panel 221 as a display section and an operation panel 222 as an input section are united. Further, the case 202 includes a speaker 231, a microphone 232, an operation section 240 and a camera section 241. Here, the configuration of the case 202 is not limited to this. For example, a configuration in which the display section and the input section are separated can be employed, or a configuration of having a folding structure and a sliding mechanism can be employed.

Figure 30:
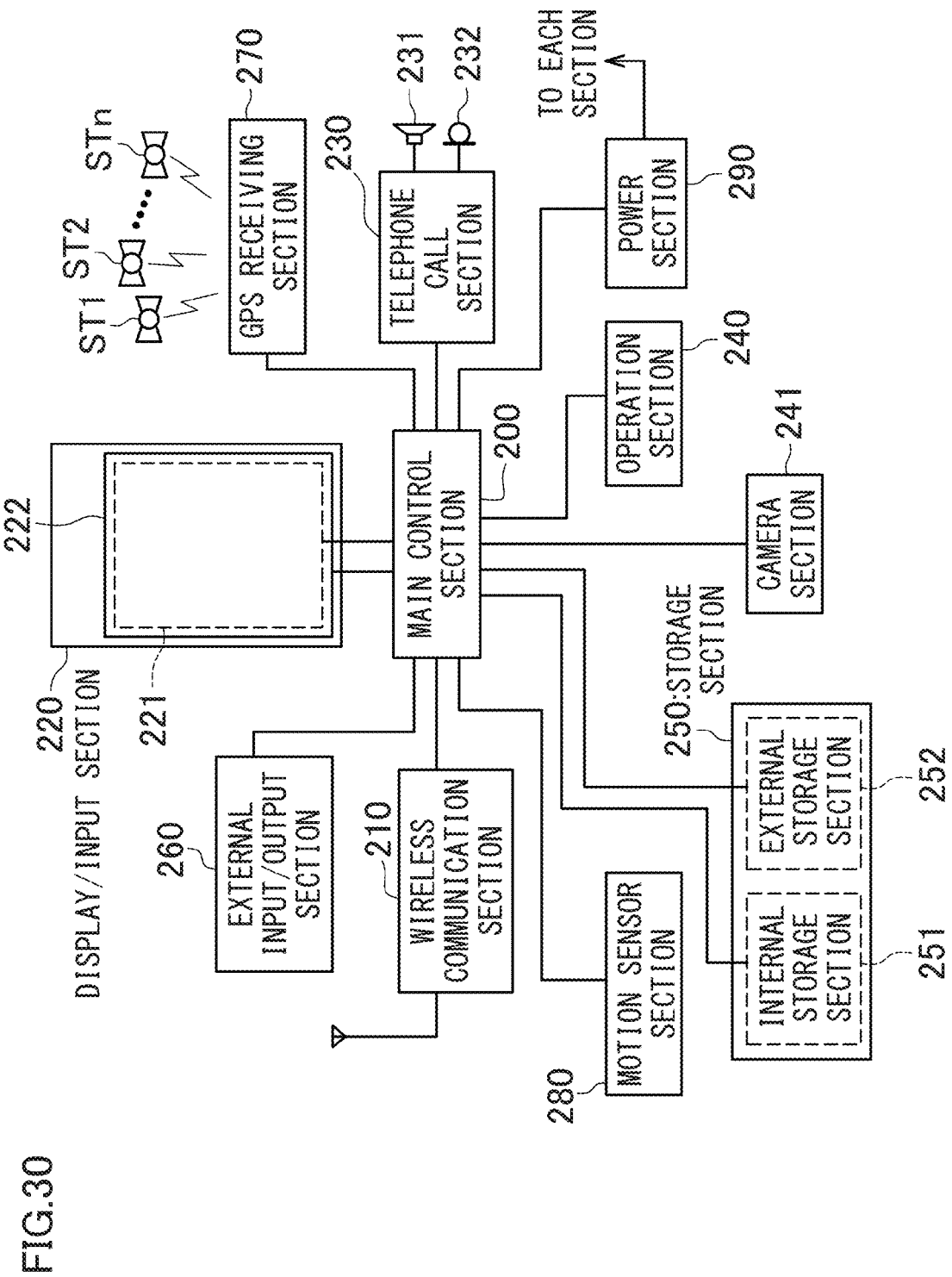
FIG. 30 is a block diagram showing the configuration of the smart phone shown in FIG. 29.

FIG. 30 is a block diagram showing the configuration of the smart phone 201 shown in FIG. 29. As shown in FIG. 30, the smart phone includes, as the main constituent elements, a wireless communication section 210, the display/input section 220, a telephone call section 230, the operation section 240, the camera section 241, a storage section 250, an external input/output section 260, a GPS (Global Positioning System) receiving section 270, a motion sensor section 280, a power section 290, and a main control section 200. Further, the smart phone 201 includes, as the main function, a wireless communication function to perform the mobile wireless communication through a base station device BS and a mobile communication network NW.

The wireless communication section 210 performs the wireless communication with a base station device BS contained in a mobile communication network NW, in accordance with an instruction of the main control section 200. Using the wireless communication, the sending and receiving of various file data such as audio data and image data, e-mail data or the like, and the receiving of Web data, streaming data or the like are performed.

The display/input section 220 is a so-called touch panel that, by the control from the main control section 200, displays an image (a still image and a moving image), character information or the like to visually transmit the information to a user, and detects the user operation to the displayed information, and includes the display panel 221 and the operation panel 222.

The display panel 221 is an LCD (Liquid Crystal Display), an OELD (Organic Electro-Luminescence Display) or the like that is used as a display device. The operation panel 222 is a device that is placed such that an image to be displayed on the display surface of the display panel 221 can be visually recognized and that detects a single or multiple coordinates to be operated by a finger of a user or a stylus. When this device is operated by a finger of a user or a stylus, a detection signal generated due to the operation is output to the main control section 200. Next, the main control section 200 detects the operation position (coordinate) on the display panel 221, based on the received detection signal.

As shown in FIG. 29, the display panel 221 and operation panel 222 of the smart phone 201 exemplified as an embodiment of the image-taking device according to the present invention are united to constitute the display/input section 220, and are arranged such that the operation panel 222 completely covers the display panel 221. In the case of employing this arrangement, the operation panel 222 may have the function to detect the user operation, also in the region outside the display panel 221. In other words, the operation panel 222 may include a detection region that is the superposition portion overlapping with the display panel 221 (hereinafter, referred to as a display region), and a detection region that is other than this and that is the outer edge portion not overlapping with the display panel 221 (hereinafter, referred to as a non-display region).

Here, the size of the display region and the size of the display panel 221 may accord completely, but the both do not always need to accord. Further, the operation panel 222 may include two sensitive regions: the outer edge portion and the inner portion that is other than this. Moreover, the width of the outer edge portion is appropriately designed depending on the size of the case 202 and the like. Furthermore, as the position detection scheme to be employed in the operation panel 222, there are a matrix switch scheme, a resistive film scheme, a surface acoustic wave scheme, an infrared ray scheme, an electromagnetic induction scheme, an electrostatic capacity scheme and the like, and any scheme can be employed.

The telephone call section 230, which includes the speaker 231 and the microphone 232, converts a user voice input through the microphone 232 into audio data capable of being processed in the main control section 200, to output them to the main control section 200, and decodes audio data received by the wireless communication section 210 or the external input/output section 260, to output them from the speaker 231. Further, as shown in FIG. 29, for example, the speaker 231 can be mounted on the same surface as a surface on which the display/input section 220 is provided, and the microphone 232 can be mounted on the side surface of the case 202.

The operation section 240 is a hardware key using a key switch or the like, and receives an instruction from a user. For example, as shown in FIG. 29, the operation section 240, which is mounted on the side surface of the case 202 of the smart phone 201, is a push-button switch that is turned on when being pushed by a finger or the like and that becomes the off state by the restoring force of a spring or the like when the finger is released.

The storage section 250 stores a control program and control data of the main control section 200, application software, address data associated with the name, telephone number and others of a communication partner, sent or received e-mail data, Web data downloaded by Web browsing, and downloaded content data, and further, temporarily stores streaming data or the like. Further, the storage section 250 is constituted by an internal storage section 251 built in the smart phone, and an external storage section 252 having a detachable external memory slot. Here, each of the internal storage section 251 and the external storage section 252 that constitute the storage section 250 is actualized by using a storing medium such as a flash memory type, a hard disk type memory, a multimedia card micro type, a card type memory (for example, a Micro SD (registered trademark) memory or the like), a RAM (Random Access Memory) and a ROM (Read Only Memory).

The external input/output section 260 plays a role as an interface with all external apparatuses that are linked with the smart phone 201, and is directly or indirectly connected with another external apparatus, through a communication or the like (for example, the universal serial bus (USB), IEEE1394 or the like), or a network (for example, the internet, a wireless LAN, Bluetooth (registered trademark), RFID (Radio Frequency Identification), the infrared communication (Infrared Data Association: IrDA) (registered trademark), UWB (Ultra Wideband) (registered trademark), ZigBee (registered trademark), or the like).

Examples of the external apparatus to be linked with the smart phone 201 include a wired or wireless headset, a wired or wireless external battery charger, a wired or wireless data port, a memory card or SIM (Subscriber Identity Module Card)/UIM (User Identity Module Card) card to be connected through a card socket, an external audio and video apparatus to be connected through an audio and video I/O (Input/Output) terminal, an external audio and video apparatus to be connected by wireless, a smart phone to be connected by wire or wireless, a personal computer to be connected by wire or wireless, a PDA to be connected by wire or wireless, an earphone, and the like. The external input/output section allows data transferred from such an external apparatus to be transmitted to each constituent element in the interior of the smart phone 201, and allows data in the interior of the smart phone 201 to be transferred to an external apparatus.

The GPS receiving section 270, in accordance with an instruction of the main control section 200, receives GPS signals sent from GPS satellites ST1 to STn, executes a positioning computation process based on the multiple GPS signals received, and detects the position of the smart phone 201, by the latitude, longitude and altitude. When the position information can be acquired from the wireless communication section 210 or the external input/output section 260 (for example, a wireless LAN), the GPS receiving section 270 can detect the position using the position information.

The motion sensor section 280 includes, for example, a three-axis acceleration sensor and the like, and detects the physical motion of the smart phone 201 in accordance with an instruction of the main control section 200. The detection of the physical motion of the smart phone 201 leads to the detection of the moving direction and acceleration of the smart phone 201. This detection result is output to the main control section 200.

The power section 290 supplies the electric power stored in a battery (not shown in the figure), to each section of the smart phone 201, in accordance with an instruction of the main control section 200.

The main control section 200, which includes a microprocessor, operates in accordance with the control program and control data stored in the storage section 250, and integrally controls each section of the smart phone 201. Further, the main control section 200 has a mobile communication control function to control each section of the communication system, and an application processing function, for performing a voice communication and a data communication through the wireless communication section 210.

The main control section 200 operates in accordance with the application software stored in the storage section 250, and thereby, the application processing function is actualized. Examples of the application processing function include an infrared communication function to perform the data communication with a facing apparatus by controlling the external input/output section 260, an e-mail function to perform the sending and receiving of an e-mail message, a Web browsing function to browse a Web page, and the like.

Further, the main control section 200 has an image-processing function such as the display of a picture to the display/input section 220, based on image data (still image or moving image data) such as received data or downloaded streaming data. The image-processing function is a function by which the main control section 200 decodes the above image data, performs an image process for the decoded result, and displays the image to the display/input section 220.

Moreover, the main control section 200 executes the display control to the display panel 221, and the operation detection control for detecting a user operation through the operation section 240 or the operation panel 222.

By the execution of the display control, the main control section 200 displays software keys such as an icon for activating application software and a scroll bar, or displays a window for creating an e-mail message. Here, the scroll bar is a software key for receiving an instruction to move the display portion of an image that is too large to fit inside the display region of the display panel 221, or the like.

Further, by the execution of the operation detection control, the main control section 200 detects a user operation through the operation section 240, receives an operation to the above icon and an input of a character string to an input box of the above window, through the operation panel 222, or receives a scroll request of the display image through the scroll bar.

Moreover, by the execution of the operation detection control, the main control section 200 has a touch panel control function to decide whether the operation position to the operation panel 222 is the superposition portion (display region) overlapping with the display panel 221, or the outer edge portion (non-display region) being other than this and not overlapping with the display panel 221, and to control the sensitive region of the operation panel 222 and the display position of the software keys.

Further, the main control section 200 can detect a gesture operation to the operation panel 222, and can execute a preset function in response to the detected gesture operation. The gesture operation means not a conventional simple touch operation, but an operation to draw a track from at least one of multiple positions by drawing the track by a finger or the like, by designating multiple positions simultaneously, or by combining them.

The camera section 241 is a digital camera that performs an electronic image-taking using an image-capturing element such as a CMOS (Complementary Metal Oxide Semiconductor) or a CCD (Charge-Coupled Device). Further, by the control from the main control section 200, the camera section 241 converts the image data obtained by the image capturing, into compressed image data such as JPEG (Joint Photographic coding Experts Group), for example, and can record them in the storage section 250, or can output them through the input/output section 260 or the wireless communication section 210. In the smart phone 201 shown in FIG. 29, the camera section 241 is mounted on the same surface as the display/input section 220. However, the mount position of the camera section 241 is not limited to this. It may be mounted on the back surface of the display/input section 220, or multiple camera sections 241 may be mounted. Here, in the case where the multiple camera sections 241 are mounted, it is possible to switch a camera section 241 for an image taking to perform the image taking independently, and to use the multiple camera sections 241 simultaneously to perform an image taking.

Further, the camera section 241 can be utilized for various functions of the smart phone 201. For example, an image acquired in the camera section 241 can be displayed on the display panel 221, and an image in the camera section 241 can be utilized as one operation input of the operation panel 222. Further, when the GPS receiving section 270 detects the position, it can detect the position by referring to an image from the camera section 241. Moreover, by referring to an image from the camera section 241, it is possible to decide the optical axis direction of the camera section 241 of the smart phone 201, and decide the current usage environment, without using the three-axis acceleration sensor or using the three-axis acceleration sensor together. Naturally, it is possible to utilize an image from the camera section 241 within the application software.

In addition, it is possible to add the position information acquired by the GPS receiving section 270, the voice information acquired by the microphone 232 (it may be the text information after the voice-text conversion by the main control section or the like), the attitude information acquired by the motion sensor section 280, or the like, to the image data of a still image or a moving image, to record them in the storage section 250, and to output them through the input/output section 260 or the wireless communication section 210.

In the above-described smart phone 201, each of the above-described processing sections associated with the point-image restoration process can be appropriately actualized, for example, by the main control section 200, the storage section 250 and the like.

Needless to say, the present invention is not limited to the above-described embodiments, and various modifications are possible in a range without departing from the spirit of the present invention.

What is claimed is:

1. An image-processing device comprising:
   an image information acquisition section to acquire image information that contains at least any one of image analysis data and image acquisition condition data, the image analysis data being acquired by an analysis of original image data that are acquired from an image-capturing element by an image taking using an optical system, the image acquisition condition data indicating an acquisition condition of the original image data;
   a restoration processing section to obtain recovery image data by performing a restoration process for the original image data, the restoration process using a restoration filter that is based on a point spread function for the optical system;
   a ringing decision section to decide whether or not the image information meets a condition under which a ringing appears in the recovery image data due to the restoration process; and
   a process control section to control an image process, based on a decision result by the ringing decision section,
   wherein the restoration process is performed for the original image data after a gradation correction,
   wherein the gradation correction is a gradation correction by a logarithmic process, and
   the restoration filter has a filter coefficient corresponding to image data before the logarithmic process.

2. The image-processing device according to claim 1, wherein the restoration process is a process of obtaining the recovery image data by restoring only an amplitude component of the original image data.

3. The image-processing device according to claim 1, wherein the restoration process is a process of obtaining the recovery image data by restoring an amplitude component and a phase component of the original image data.

4. The image-processing device according to claim 1, wherein the image information acquisition section acquires the image information that contains the image analysis data, the image analysis data indicating whether or not pixel data having a saturated pixel value or pixel data having a pixel value greater than a threshold value are contained in the original image data.

5. The image-processing device according to claim 1, wherein the image acquisition condition data contain information about the optical system used in the image taking for acquiring the original image data.

6. The image-processing device according to claim 1, wherein the process control section determines whether or not to execute the restoration process in the restoration processing section, based on the decision result by the ringing decision section.

7. The image-processing device according to claim 1, wherein the process control section determines the restoration filter to be used in the restoration process, based on the decision result by the ringing decision section.

8. The image-processing device according to claim 1, further comprising a gradation correction section to perform a gradation correction of the original image data,
wherein the process control section controls the gradation correction in the gradation correction section, based on the decision result by the ringing decision section.

9. The image-processing device according to claim 1, wherein the original image data contains luminance data, and the restoration processing section performs the restoration process for the luminance data of the original image data.

10. The image-processing device according to claim 1, wherein the original image data contains color data, and the restoration processing section performs the restoration process for the color data of the original image data.

11. The image-processing device according to claim 1,
wherein the process control section determines for which of luminance data and color data of the original image data the restoration process is performed based on the decision result by the ringing decision section, and the restoration processing section performs the restoration process for the data that are of the luminance data and color data of the original image data and that are determined by the process control section.

12. The image-processing device according to claim 1,
wherein the process control section controls the image process or the restoration process, on an original image data basis.

13. The image-processing device according to claim 1,
wherein the process control section controls the image process or the restoration process, on a pixel data basis, the pixel data composing the original image data.

14. An image-capturing device comprising:
the image-processing device according to claim 1; and
the image-capturing element to output the original image data by the image taking using the optical system.

15. An image-processing device comprising:
an image information acquisition section to acquire image information that contains at least any one of image analysis data and image acquisition condition data, the image analysis data being acquired by an analysis of original image data that are acquired from an image-capturing element by an image taking using an optical system, the image acquisition condition data indicating an acquisition condition of the original image data;

a restoration processing section to obtain recovery image data by performing a restoration process for the original image data, the restoration process using a restoration filter that is based on a point spread function for the optical system;

a gradation correction section to perform a gradation correction of the original image data;

a ringing decision section to decide whether or not the image information meets a condition under which a ringing appears in the recovery image data due to the restoration process; and a process control section to control the restoration process, based on a decision result by the ringing decision section, wherein the process control section determines for which of the original image data before the gradation process and the original image data after the gradation process the restoration process is performed, based on the decision result by the ringing decision section.

16. The image-processing device according to claim 15,
wherein the gradation correction is a gradation correction by a logarithmic process, and
the restoration filter has a filter coefficient corresponding to image data before the logarithmic process.

17. The image-processing device according to claim 15,
wherein the gradation correction is a gradation correction by a logarithmic process, and
the restoration filter has a filter coefficient corresponding to image data after the logarithmic process.

18. The image-processing device according to claim 15,
wherein the restoration process is a process of obtaining the recovery image data by restoring only an amplitude component of the original image data.

19. The image-processing device according to claim 15,
wherein the restoration process is a process of obtaining the recovery image data by restoring an amplitude component and a phase component of the original image data.

20. The image-processing device according to claim 15, further comprising,
a restoration process information acquisition section to acquire restoration process information about whether the restoration process is a process of obtaining the recovery image data by restoring only an amplitude component of the original image data, or a process of obtaining the recovery image data by restoring the amplitude component and a phase component of the original image data, wherein the process control section determines for which of the original image data before the gradation correction and the original image data after the gradation process the restoration process is performed, based on the restoration process information acquired by the restoration process information acquisition section, in addition to the decision result by the ringing decision section.

21. The image-processing device according to claim 15,
wherein the image information acquisition section acquires the image information that contains the image analysis data, the image analysis data indicating whether or not pixel data having a saturated pixel value or pixel data having a pixel value greater than a threshold value are contained in the original image data.

22. The image-processing device according to claim 15,
wherein the image acquisition condition data contain information about the optical system used in the image taking for acquiring the original image data.

23. The image-processing device according to claim 22,
wherein the information about the optical system contains at least any one of a lens type, a diaphragm value and a zoom value of the optical system used in the image taking for acquiring the original image data.

24. The image-processing device according to claim 15,
wherein the process control section determines whether or not to execute the restoration process in the restoration processing section, based on the decision result by the ringing decision section.

25. The image-processing device according to claim 15,
wherein the process control section determines the restoration filter to be used in the restoration process, based on the decision result by the ringing decision section.

26. The image-processing device according to claim 15,
wherein the process control section controls the gradation correction in the gradation correction section, based on the decision result by the ringing decision section.

27. The image-processing device according to claim 15,
wherein the original image data contains luminance data, and
the restoration processing section performs the restoration process for the luminance data of the original image data.

28. The image-processing device according to claim 15,
wherein the original image data contains color data, and
the restoration processing section performs the restoration process for the color data of the original image data.

29. The image-processing device according to claim 15,
wherein the process control section determines for which of luminance data and color data of the original image data the restoration process is performed based on the decision result by the ringing decision section, and the restoration processing section performs the restoration process for the data that are of the luminance data and color data of the original image data and that are determined by the process control section.

30. The image-processing device according to claim 15, wherein the optical system includes a lens section to extend a depth of field by modulating a phase.

31. The image-processing device according to claim 15, wherein the process control section controls the restoration process, on an original image data basis.

32. The image-processing device according to claim 15, wherein the process control section controls the restoration process, on a pixel data basis, the pixel data composing the original image data.

33. An image-capturing device comprising:
the image-processing device according to claim 15; and
the image-capturing element to output the original image data by the image taking using the optical system.

34. An image-processing method comprising:
an image information acquisition step of acquiring image information that contains at least any one of image analysis data and image acquisition condition data, the image analysis data being acquired by an analysis of original image data that are acquired from an image-capturing element by an image taking using an optical system, the image acquisition condition data indicating an acquisition condition of the original image data;
a restoration processing step of obtaining recovery image data by performing a restoration process for the original image data, the restoration process using a restoration filter that is based on a point spread function for the optical system; and
a ringing decision step of deciding whether or not the image information meets a condition under which a ringing appears in the recovery image data due to the restoration process,
wherein an image process is controlled based on a decision result in the ringing decision step, and
the restoration process is performed for the original image data after a gradation correction.

35. A non-transitory recording medium having a code recorded therein, the code being a computer-readable code of a program, wherein the program is a program for making a computer execute:
a procedure of acquiring image information that contains at least any one of image analysis data and image acquisition condition data, the image analysis data being acquired by an analysis of original image data that are acquired from an image-capturing element by an image taking using an optical system, the image acquisition condition data indicating an acquisition condition of the original image data;
a procedure of obtaining recovery image data by performing a restoration process for the original image data, the restoration process using a restoration filter that is based on a point spread function for the optical system; and
a procedure of deciding whether or not the image information meets a condition under which a ringing appears in the recovery image data due to the restoration process,
wherein an image process is controlled based on a decision result of whether or not the image information meets the condition under which the ringing appears, and
the restoration process is performed for the original image data after a gradation correction.

* * * * *